US008888492B2

(12) United States Patent
Riscalla

(10) Patent No.: US 8,888,492 B2
(45) Date of Patent: Nov. 18, 2014

(54) SYSTEMS AND METHODS FOR ORDERING PREPARED FOOD PRODUCTS

(76) Inventor: Daniel Riscalla, Orange, CA (US)

( * ) Notice: Subject to any disclaimer, the term of this patent is extended or adjusted under 35 U.S.C. 154(b) by 195 days.

(21) Appl. No.: 13/301,390

(22) Filed: Nov. 21, 2011

(65) Prior Publication Data

US 2013/0130208 A1    May 23, 2013

(51) Int. Cl.
*G06Q 50/12* (2012.01)
*G06Q 30/06* (2012.01)

(52) U.S. Cl.
CPC ............ *G06Q 50/12* (2013.01); *G06Q 30/0603* (2013.01); *G06Q 30/0643* (2013.01); *G06Q 30/0621* (2013.01)
USPC ........................................................ 434/127

(58) Field of Classification Search
CPC ................................................. G06Q 30/0643
USPC ........................... 434/127; 705/15, 26.1, 27.1
See application file for complete search history.

(56) References Cited

U.S. PATENT DOCUMENTS

| | | | |
|---|---|---|---|
| 4,638,312 A | 1/1987 | Quinn et al. | |
| 5,128,862 A | 7/1992 | Mueller | |
| 5,235,509 A | 8/1993 | Mueller et al. | |
| 5,774,871 A | 6/1998 | Ferro | |
| 5,845,263 A | 12/1998 | Camaisa et al. | |
| 5,907,275 A | 5/1999 | Battistini et al. | |
| 5,969,968 A | 10/1999 | Pentel | |
| 6,087,927 A | 7/2000 | Battistini et al. | |
| 6,425,524 B2 | 7/2002 | Pentel | |
| 6,435,406 B1 | 8/2002 | Pentel | |
| 6,801,228 B2 | 10/2004 | Kargman | |
| 6,873,970 B2 | 3/2005 | Showghi et al. | |
| 6,880,750 B2 | 4/2005 | Pentel | |
| 6,914,582 B2 | 7/2005 | Tanaka | |
| 6,920,431 B2 | 7/2005 | Showghi et al. | |
| 7,234,640 B2 | 6/2007 | Pentel | |
| 7,257,547 B1 | 8/2007 | Terase | |
| 7,328,171 B2 | 2/2008 | Helot et al. | |
| 7,454,370 B2 | 11/2008 | Baril et al. | |
| 7,657,457 B2 * | 2/2010 | Razumov ..................... | 705/27.2 |

(Continued)

FOREIGN PATENT DOCUMENTS

KR     20100121076 A     11/2010

OTHER PUBLICATIONS

PCT International Search Report and Written Opinion for PCT/US2012/066401, Applicant: Riscalla, Daniel, Forms PCT/ISA/220, PCT/ISA/210, and PCT/ISA/237; dated Mar. 15, 2013, 12 pages.

*Primary Examiner* — Bruk Gebremichael
(74) *Attorney, Agent, or Firm* — William A. English; Vista IP Law Group LLP

(57) ABSTRACT

Systems and methods are provided for ordering prepared food products via a network using an electronic device. A menu of available prepared food products may be presented on a display, and one of the prepared food products may be selected using an interface of the device. A menu of bread items available may be presented including visual representations of each available bread item. One of the bread items may be selected, whereupon a visual representation of the selected bread may be presented. One or more ingredients may be selected using the interface, whereupon visual representations of the ingredients are superimposed on the visual representation of the selected bread item. The systems and methods may provide an enhanced visual experience similar to ordering the product in person and watching the product being made.

22 Claims, 72 Drawing Sheets

(56) References Cited

U.S. PATENT DOCUMENTS

| | | |
|---|---|---|
| 7,776,372 B2 | 8/2010 | Hrudka |
| 7,792,706 B2 | 9/2010 | Tirumalareddy et al. |
| 7,831,475 B2 | 11/2010 | Baril et al. |
| 7,835,946 B2 | 11/2010 | Goren et al. |
| 7,945,477 B2 | 5/2011 | Werbitt |
| 8,190,483 B2 * | 5/2012 | Woycik et al. ............... 705/26.1 |
| 8,500,536 B2 * | 8/2013 | Watkins et al. ................. 463/16 |
| 2002/0004749 A1 * | 1/2002 | Froseth et al. .................. 705/16 |
| 2002/0049652 A1 * | 4/2002 | Moore et al. ................... 705/29 |
| 2002/0107747 A1 * | 8/2002 | Gerogianni ..................... 705/26 |
| 2003/0210277 A1 | 11/2003 | Harada |
| 2004/0054592 A1 | 3/2004 | Hernblad |
| 2004/0111321 A1 | 6/2004 | Kargman |
| 2004/0158499 A1 | 8/2004 | Dev et al. |
| 2005/0049922 A1 * | 3/2005 | Kargman ........................ 705/15 |
| 2005/0107158 A1 | 5/2005 | Kanisawa et al. |
| 2005/0192869 A1 * | 9/2005 | Maeda et al. ................... 705/26 |
| 2006/0178951 A1 * | 8/2006 | Rund, III ........................ 705/27 |
| 2006/0218040 A1 | 9/2006 | Sabapathypillai |
| 2007/0239565 A1 | 10/2007 | Pentel |
| 2007/0265935 A1 | 11/2007 | Woycik et al. |
| 2007/0294129 A1 | 12/2007 | Froseth et al. |
| 2008/0140448 A1 | 6/2008 | Hernandez et al. |
| 2009/0192898 A1 | 7/2009 | Baril |
| 2010/0106607 A1 | 4/2010 | Riddiford et al. |
| 2010/0293202 A1 * | 11/2010 | Kim et al. ...................... 707/803 |
| 2011/0029866 A1 | 2/2011 | Watanabe |
| 2011/0208619 A1 * | 8/2011 | Siounis et al. ............... 705/27.2 |
| 2011/0231266 A1 | 9/2011 | Baril |
| 2011/0258134 A1 * | 10/2011 | Mendez ........................ 705/332 |

* cited by examiner

Fig. 6B (1)
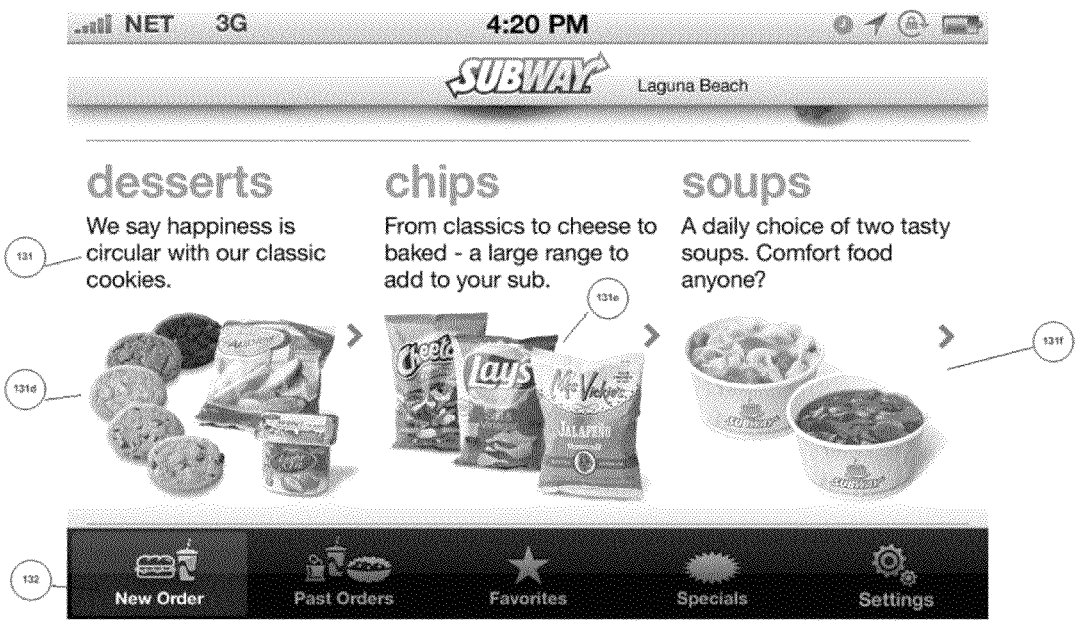
Fig. 6B (2)

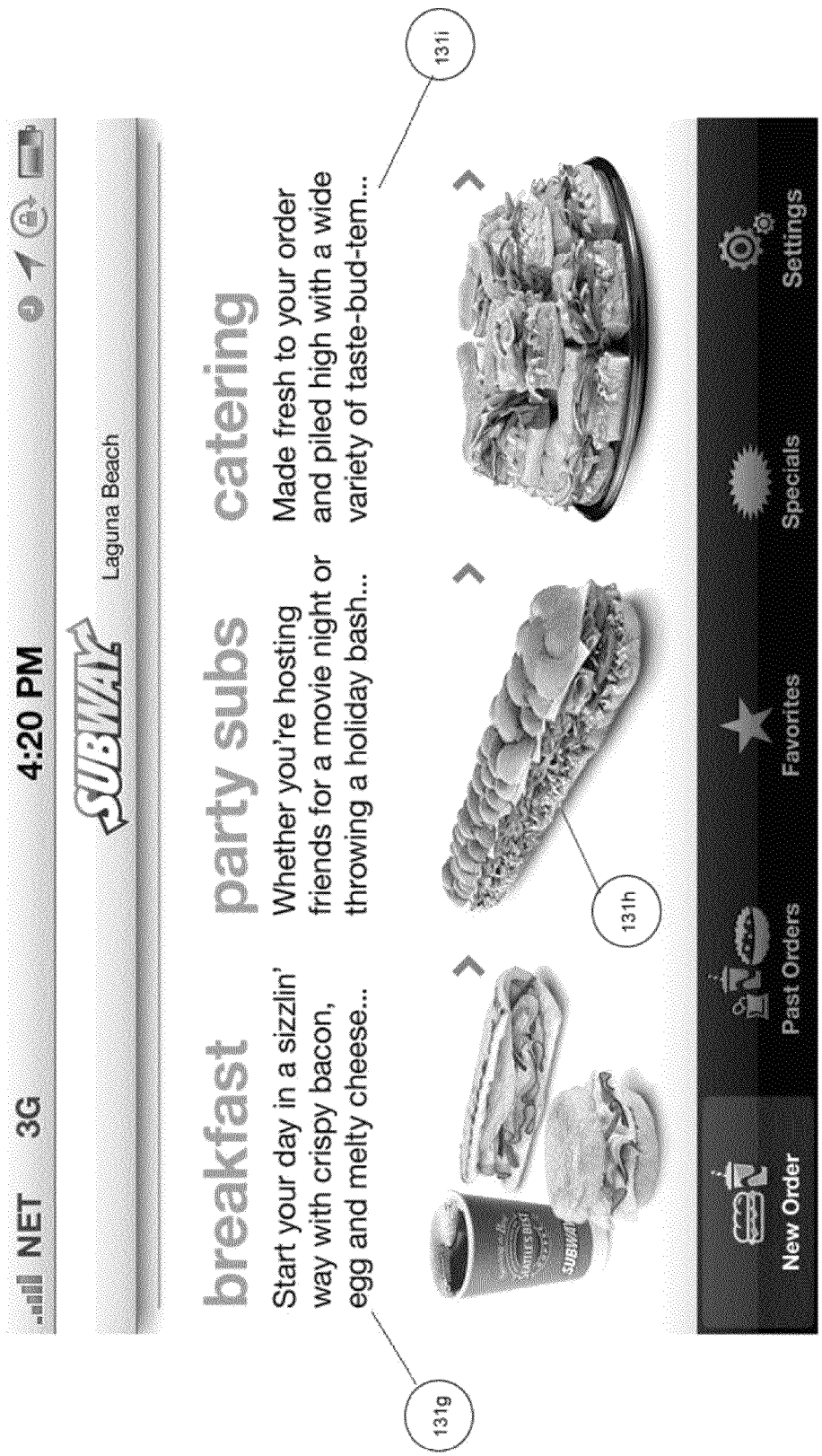
Fig 6B (3)

Fig. 6H

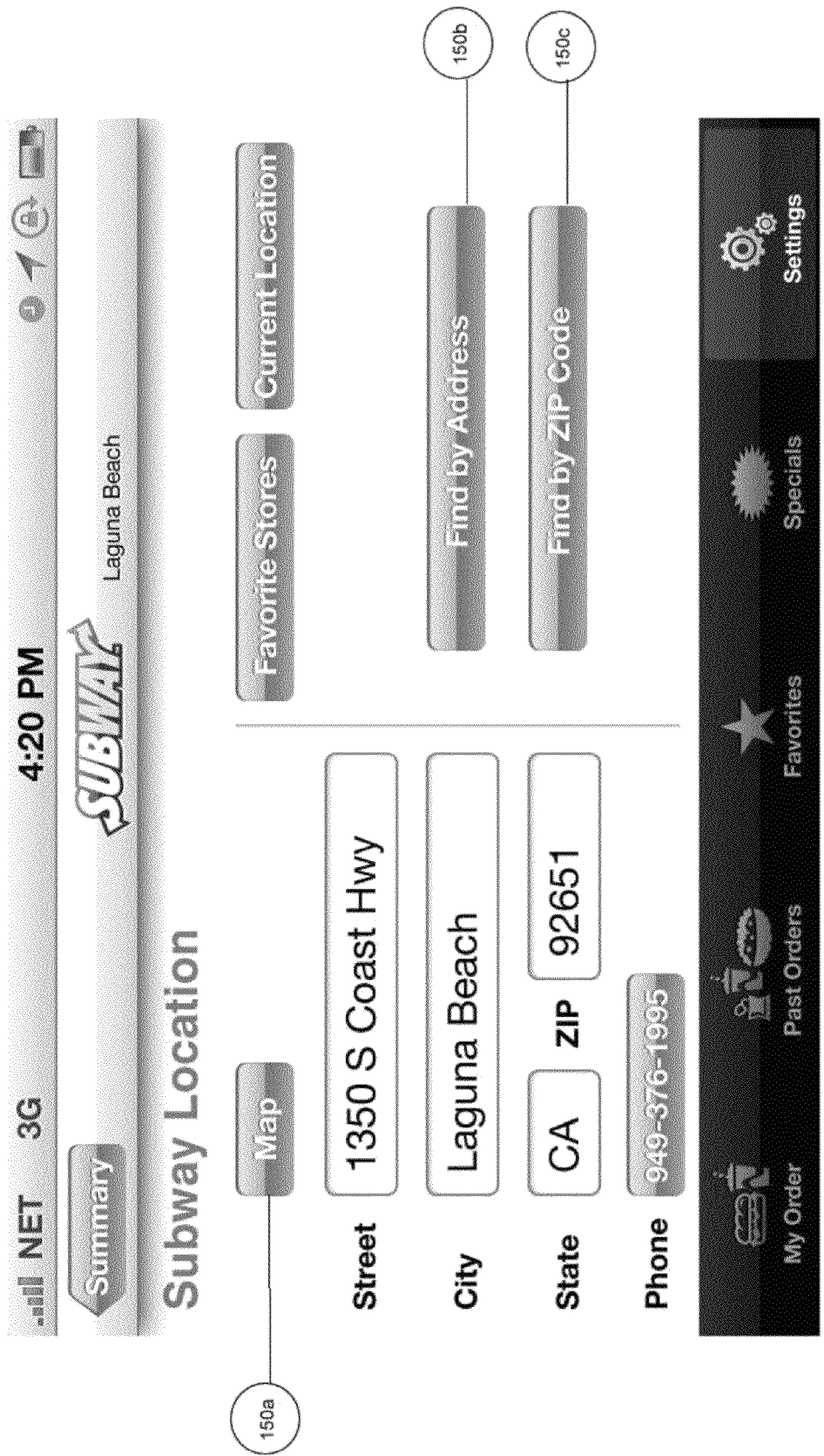

Customer Info

First: Johnathan
Last: Smith
Email: johnathan.smith@hot...
Phone: 555-990-1212

Delivery Address

Street: 1000 S Coast Hwy
Apt.: 101
City: Laguna Beach
State: CA
ZIP: 92651

Fig. 6K

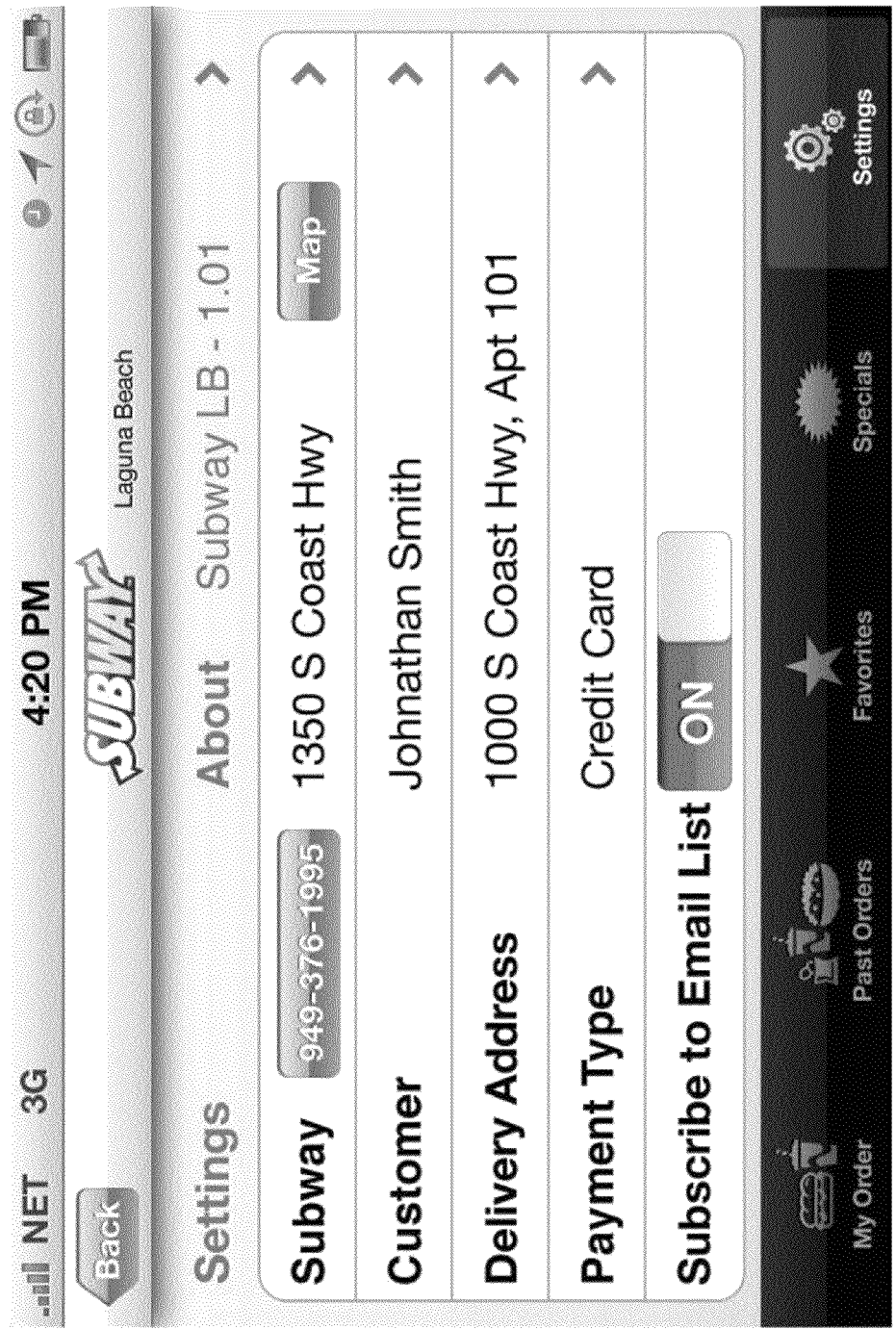
Fig. 6M (1)

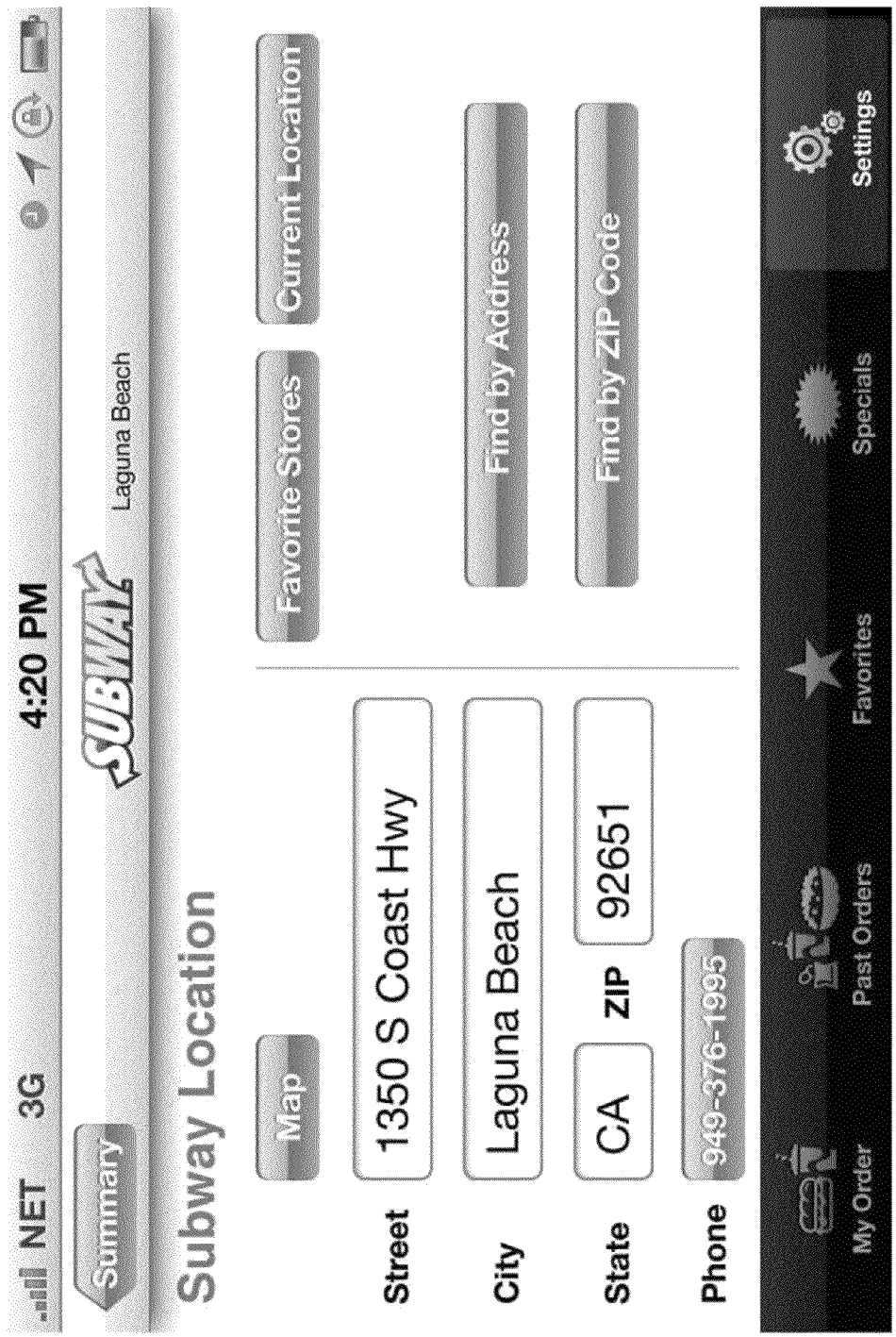
Fig. 6M (2)

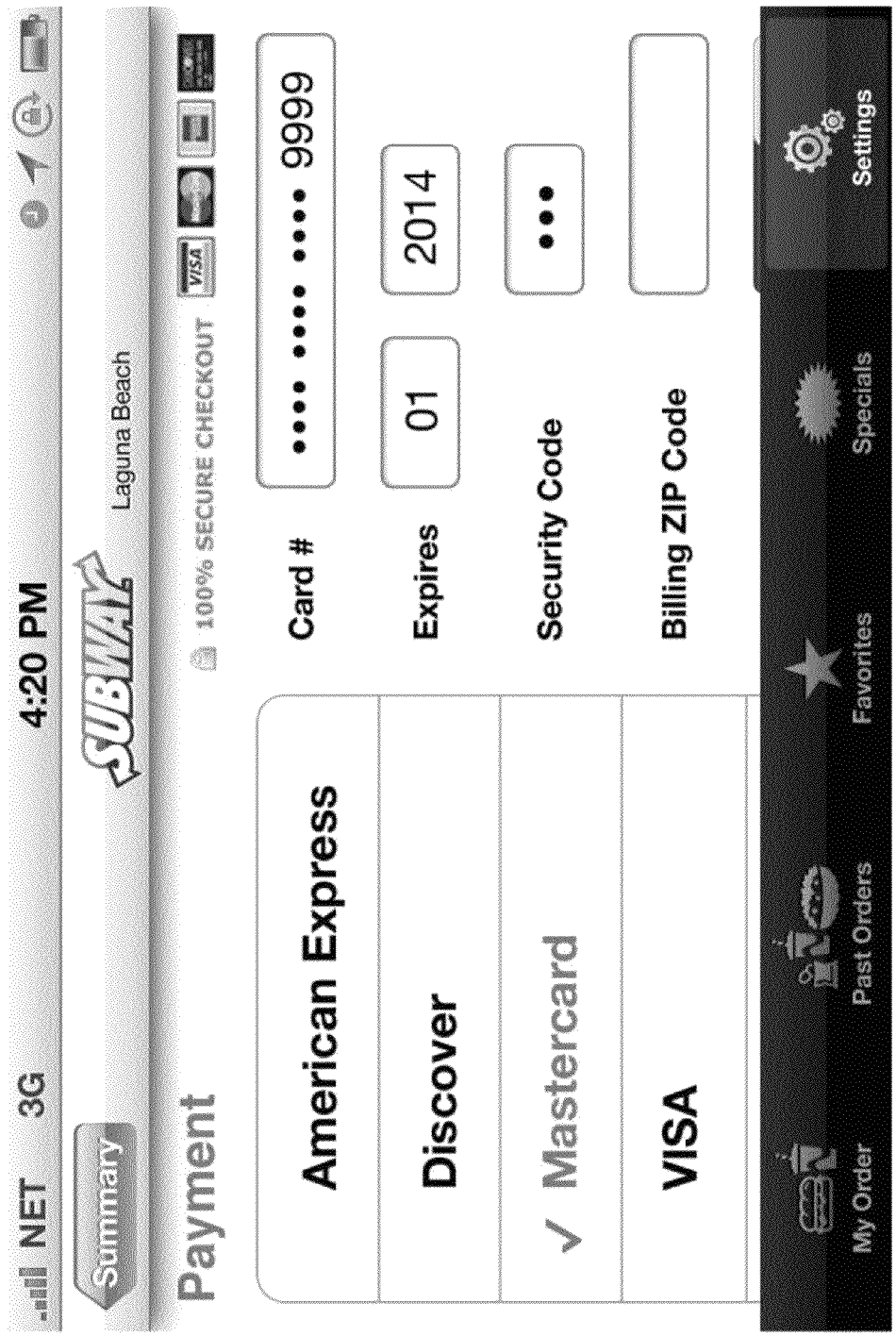
Fig. 6N (1)

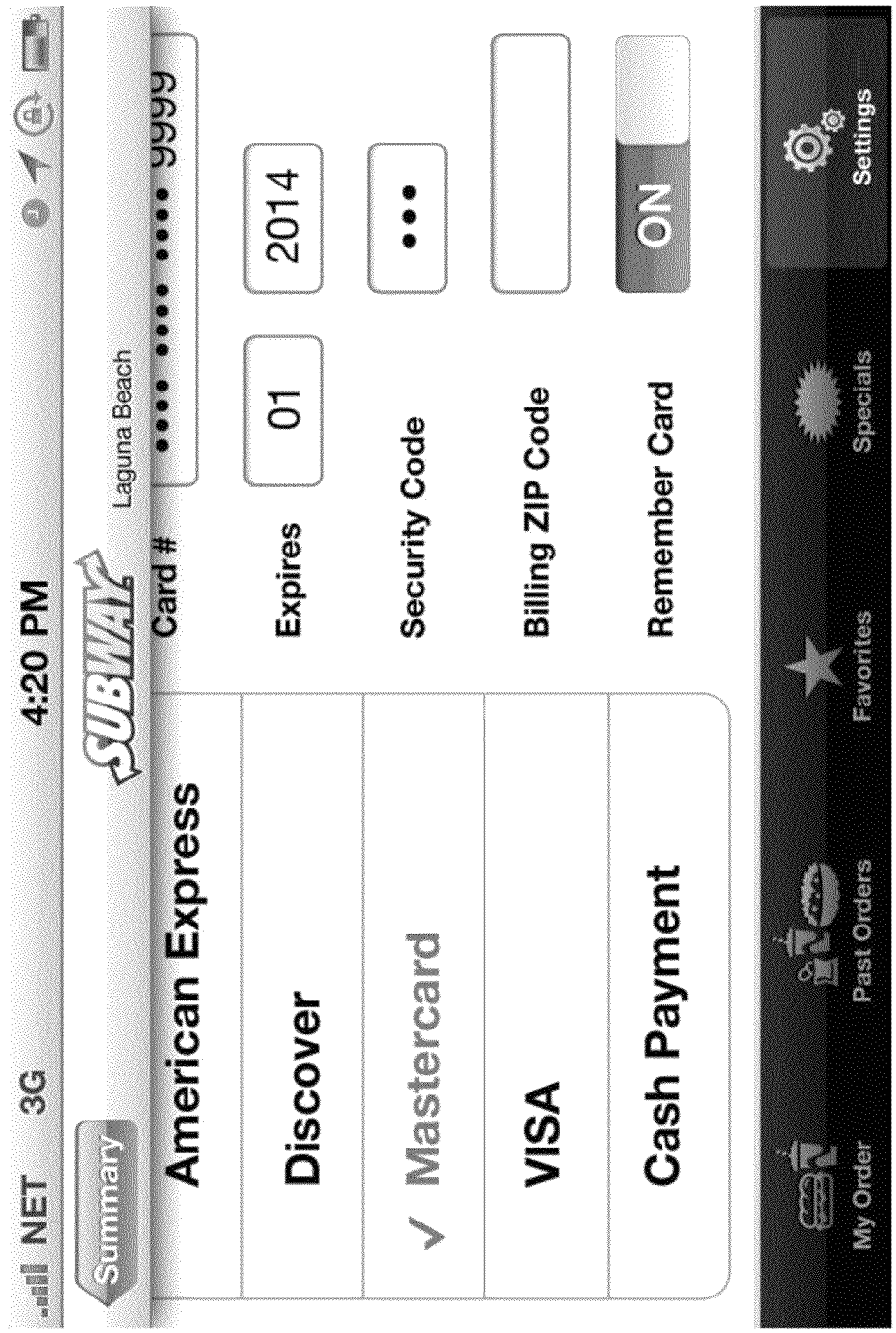
Fig. 6N (2)

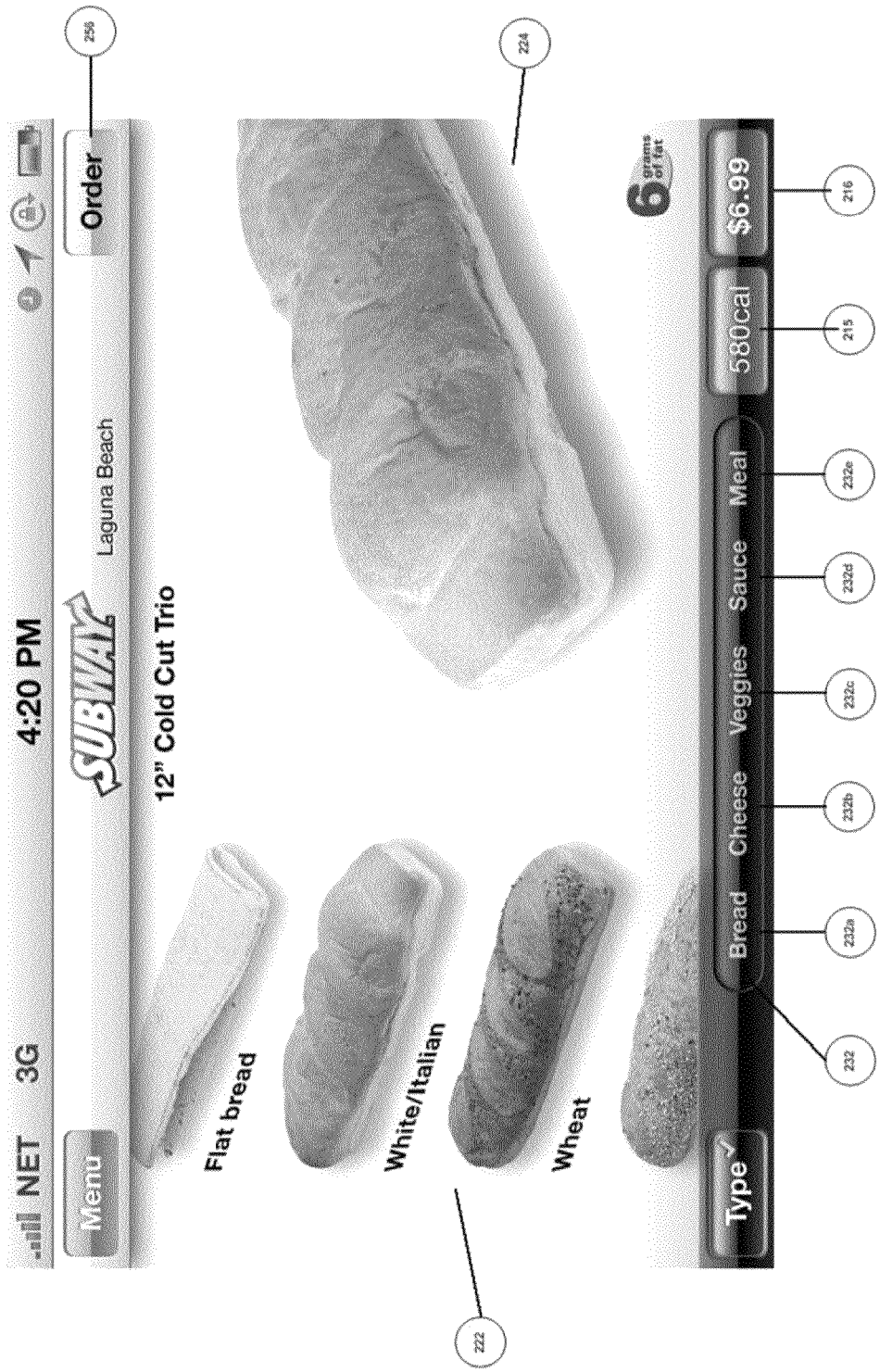

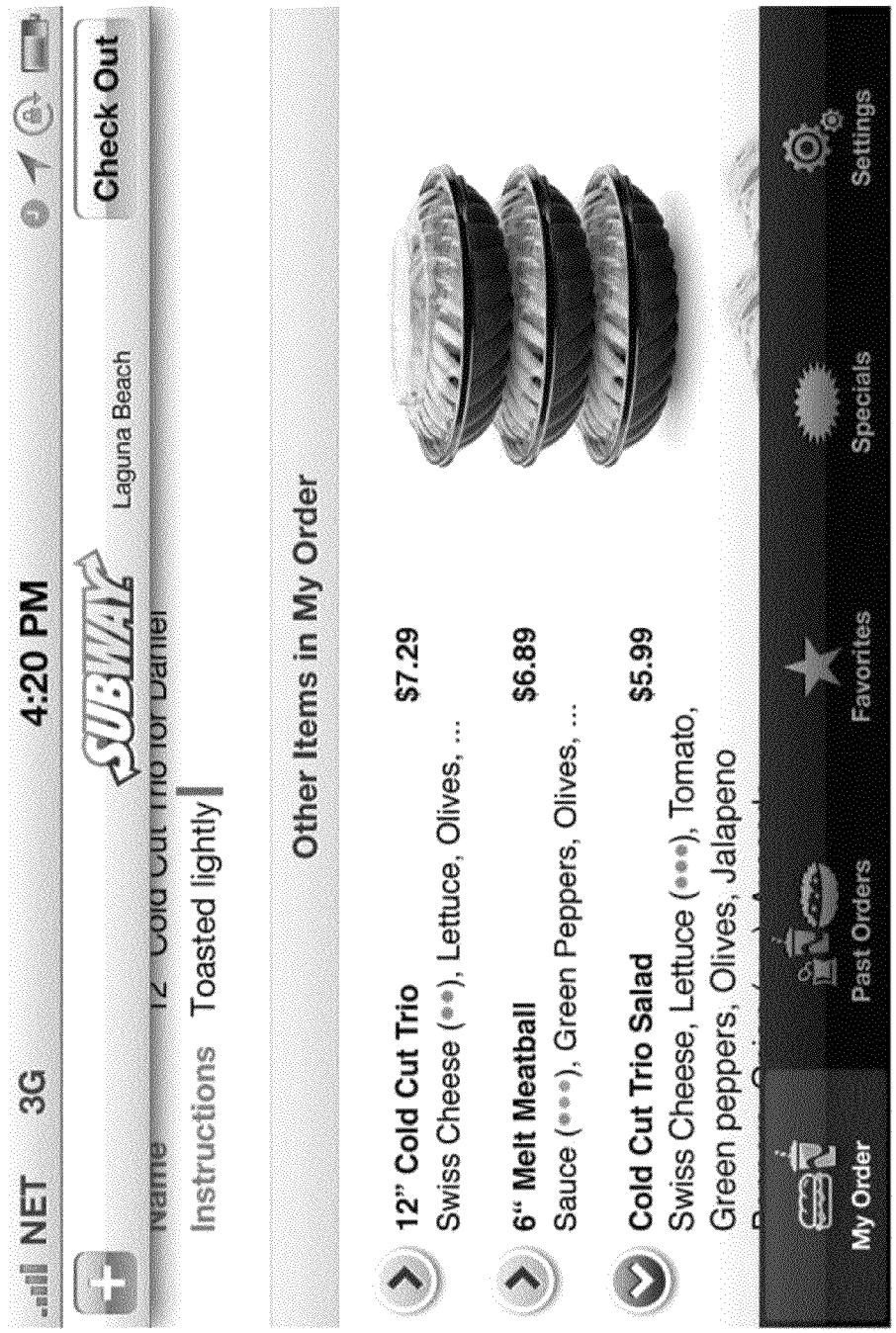

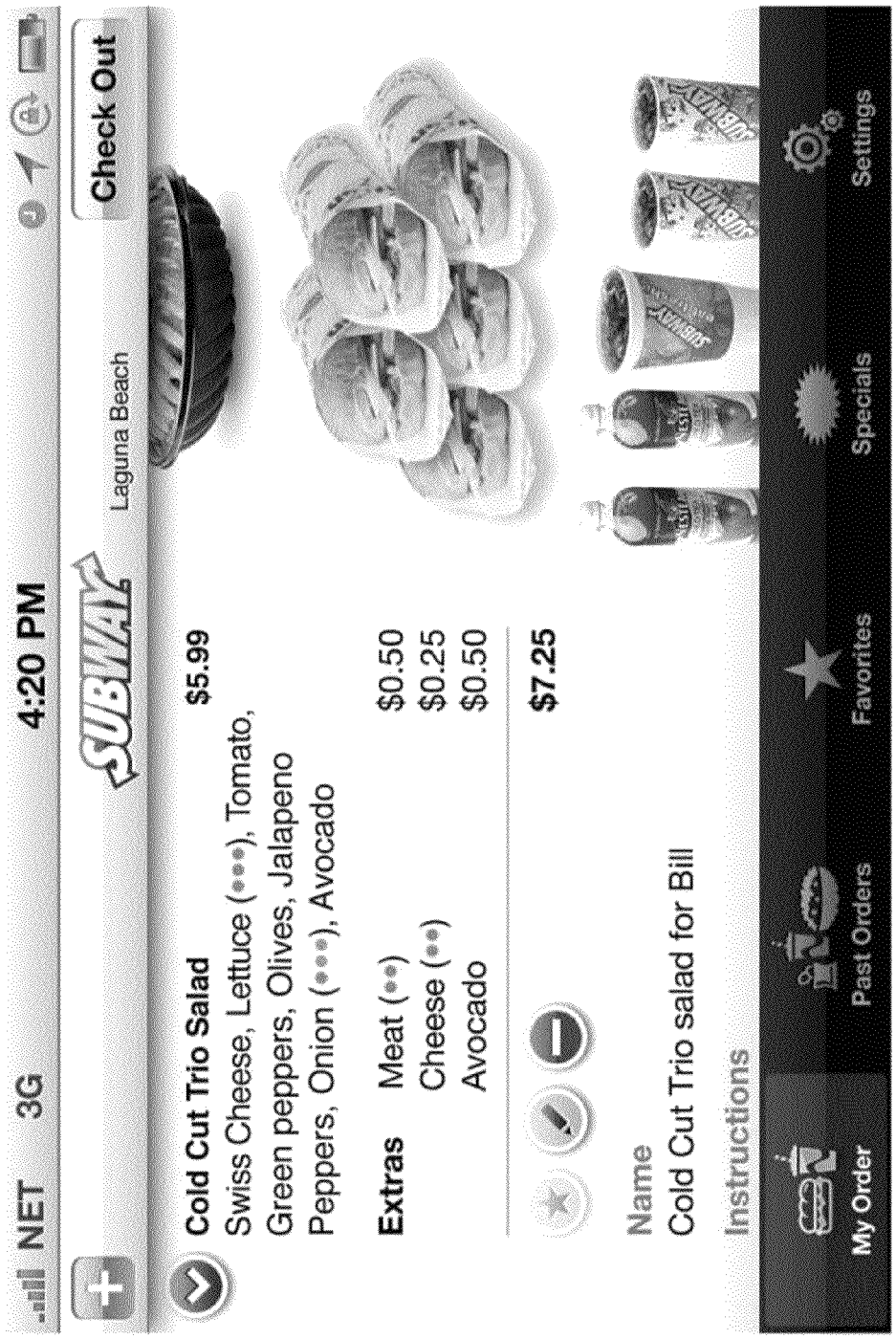
Fig. 9 (2)

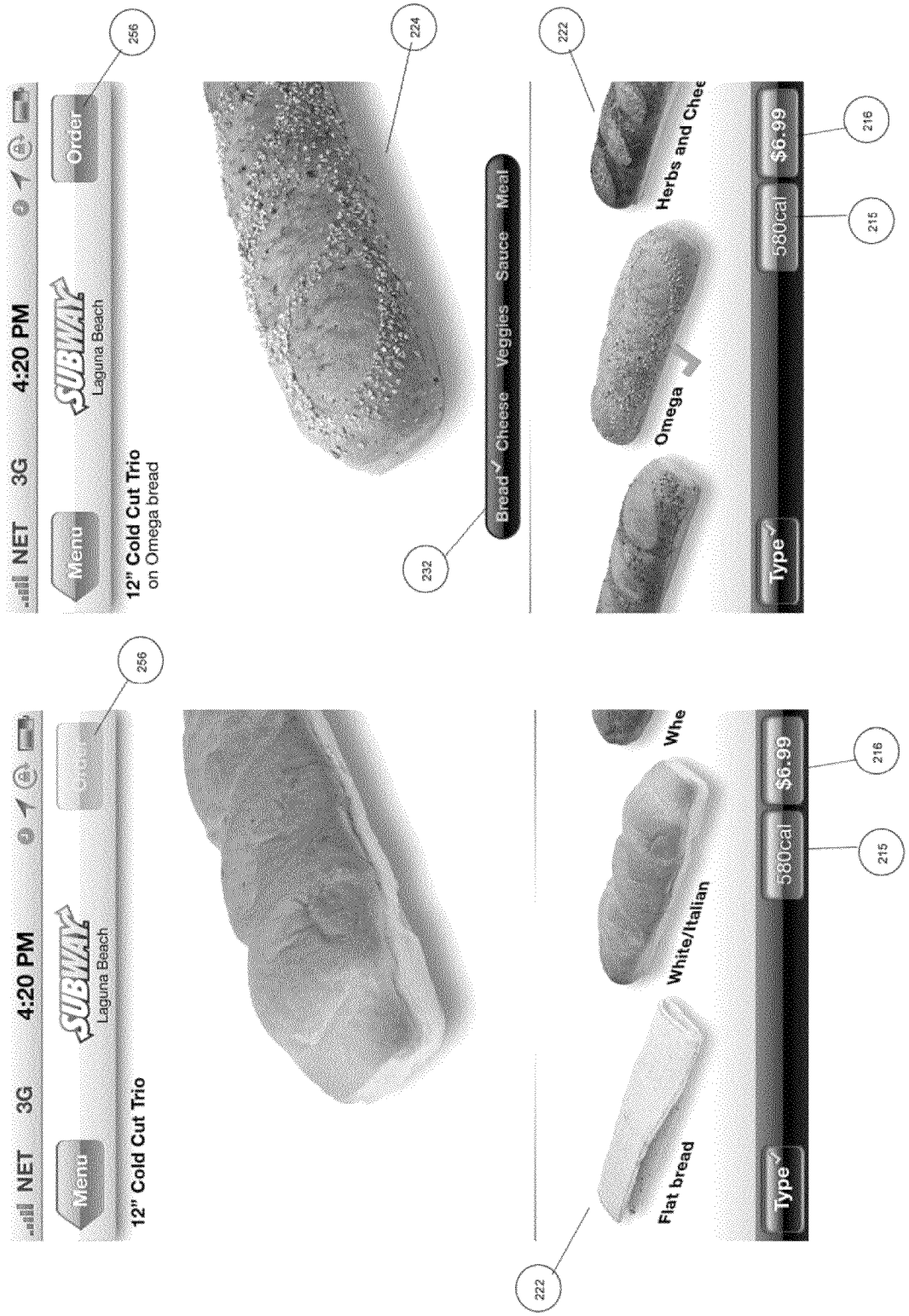

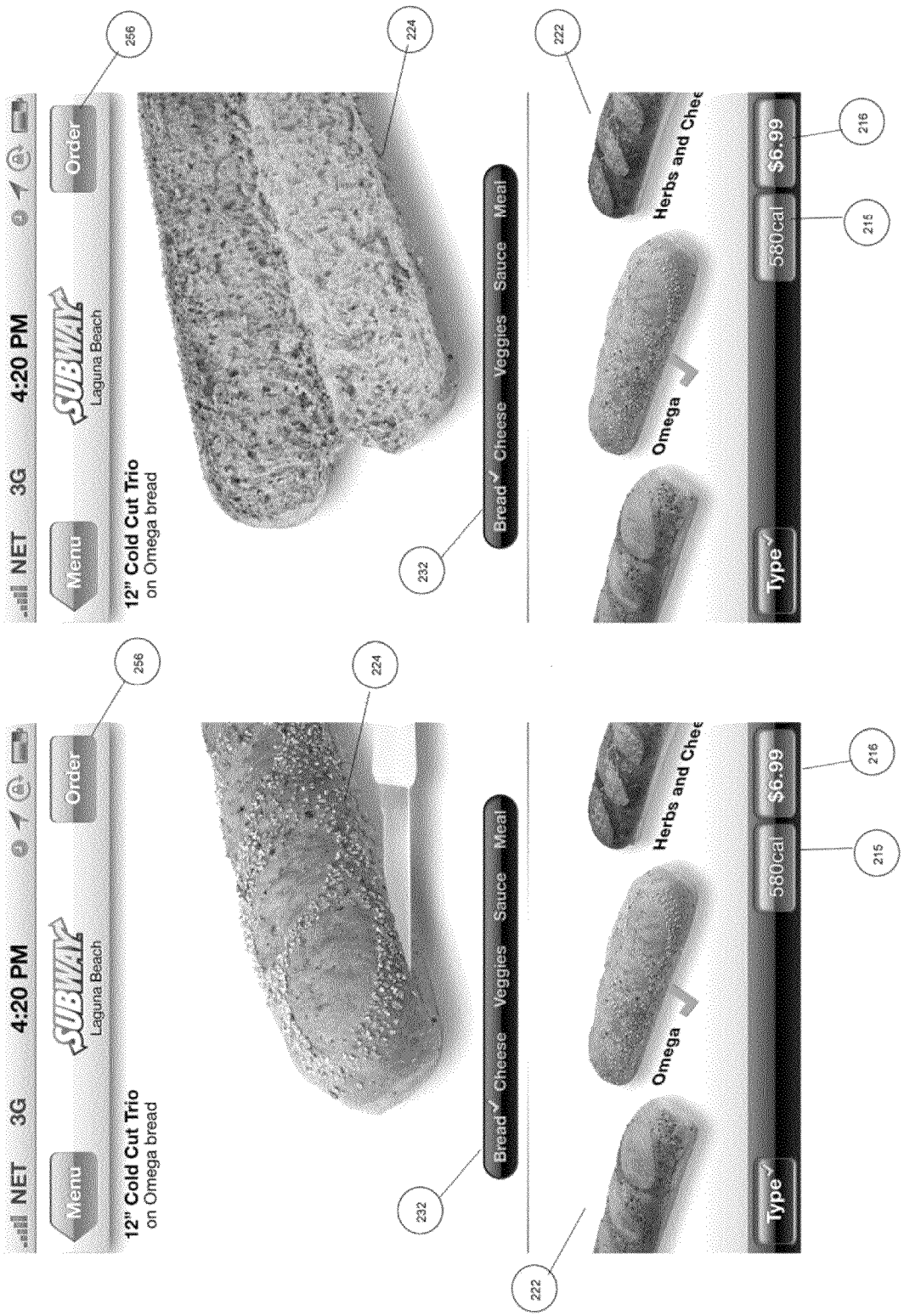

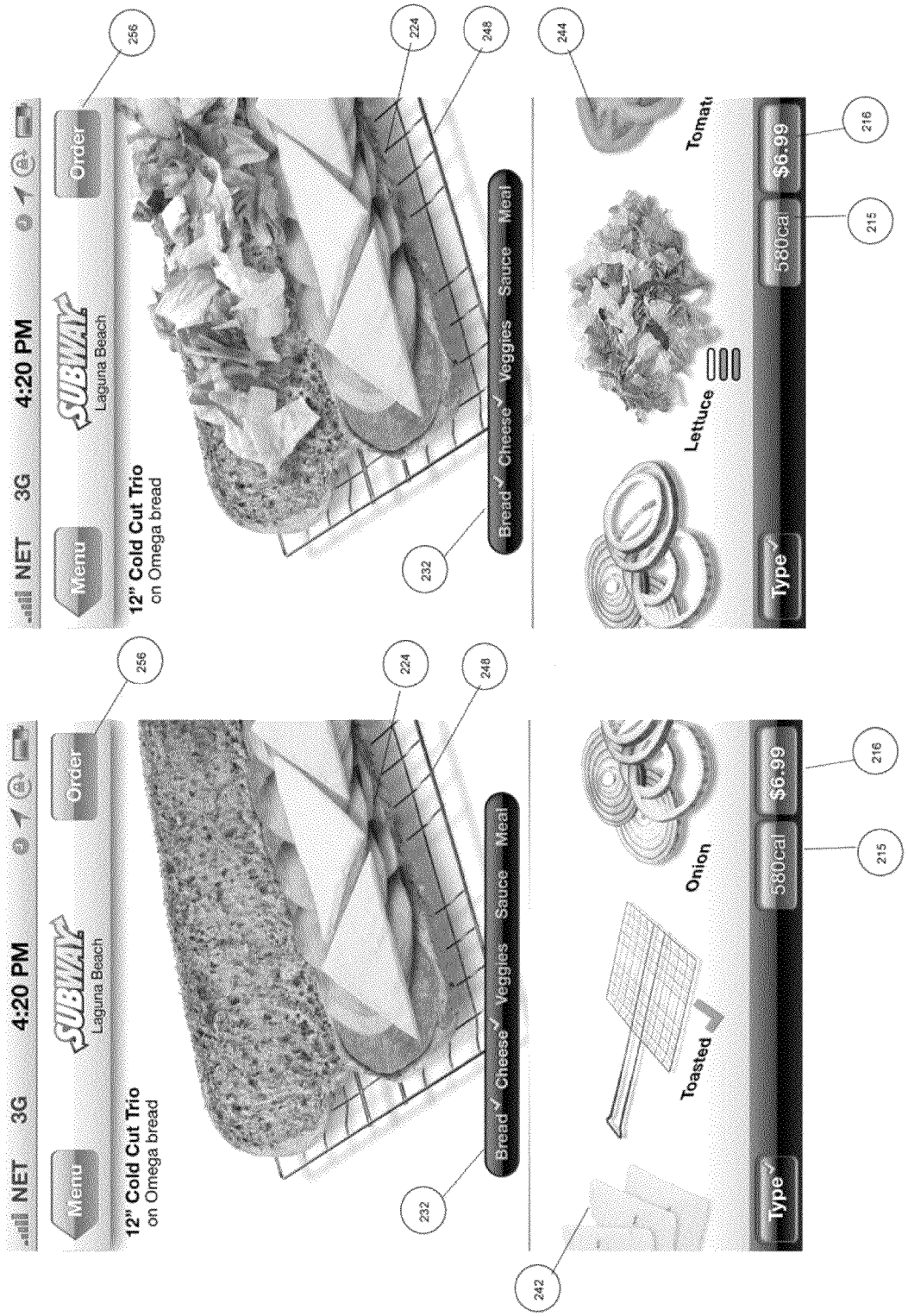

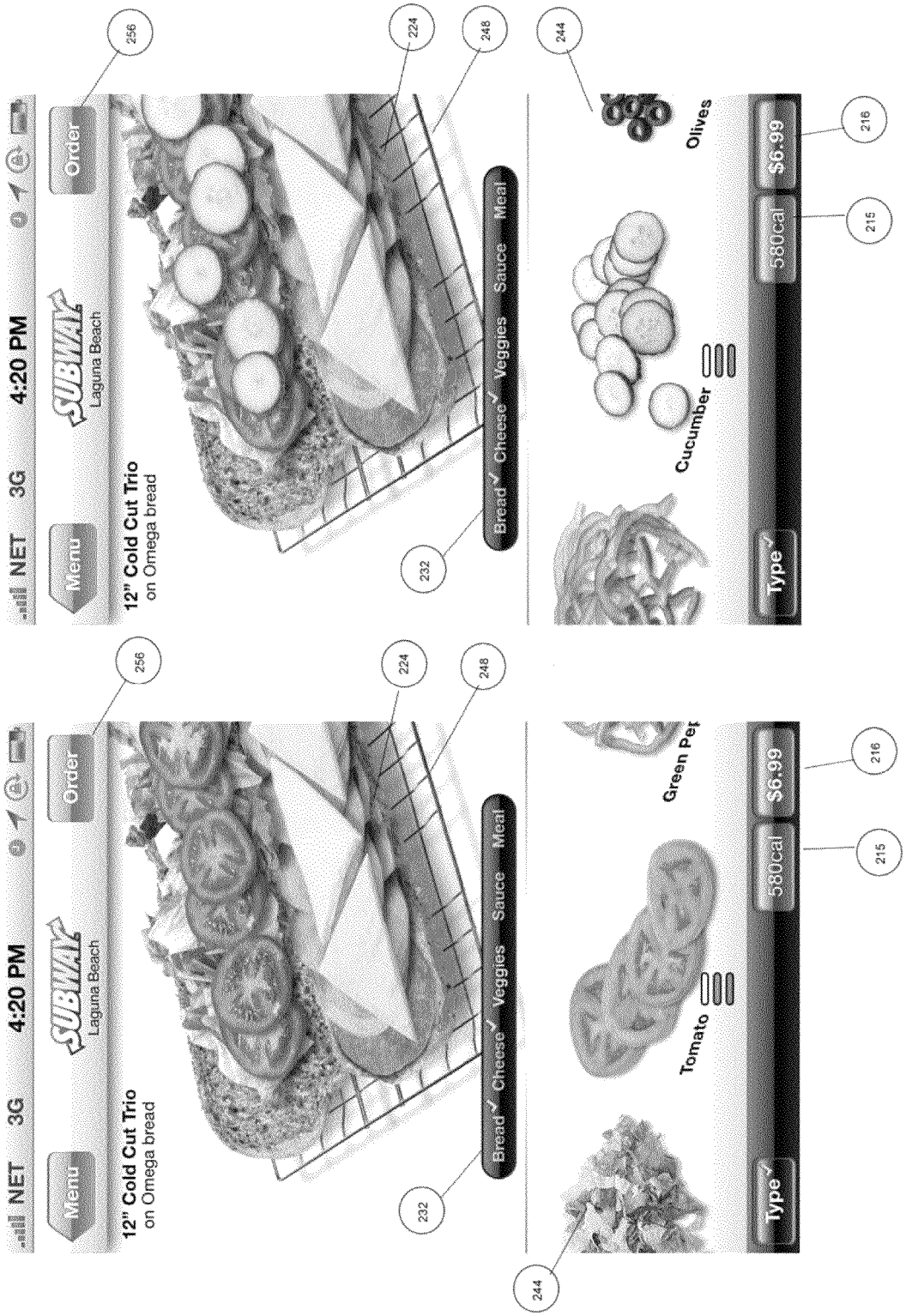

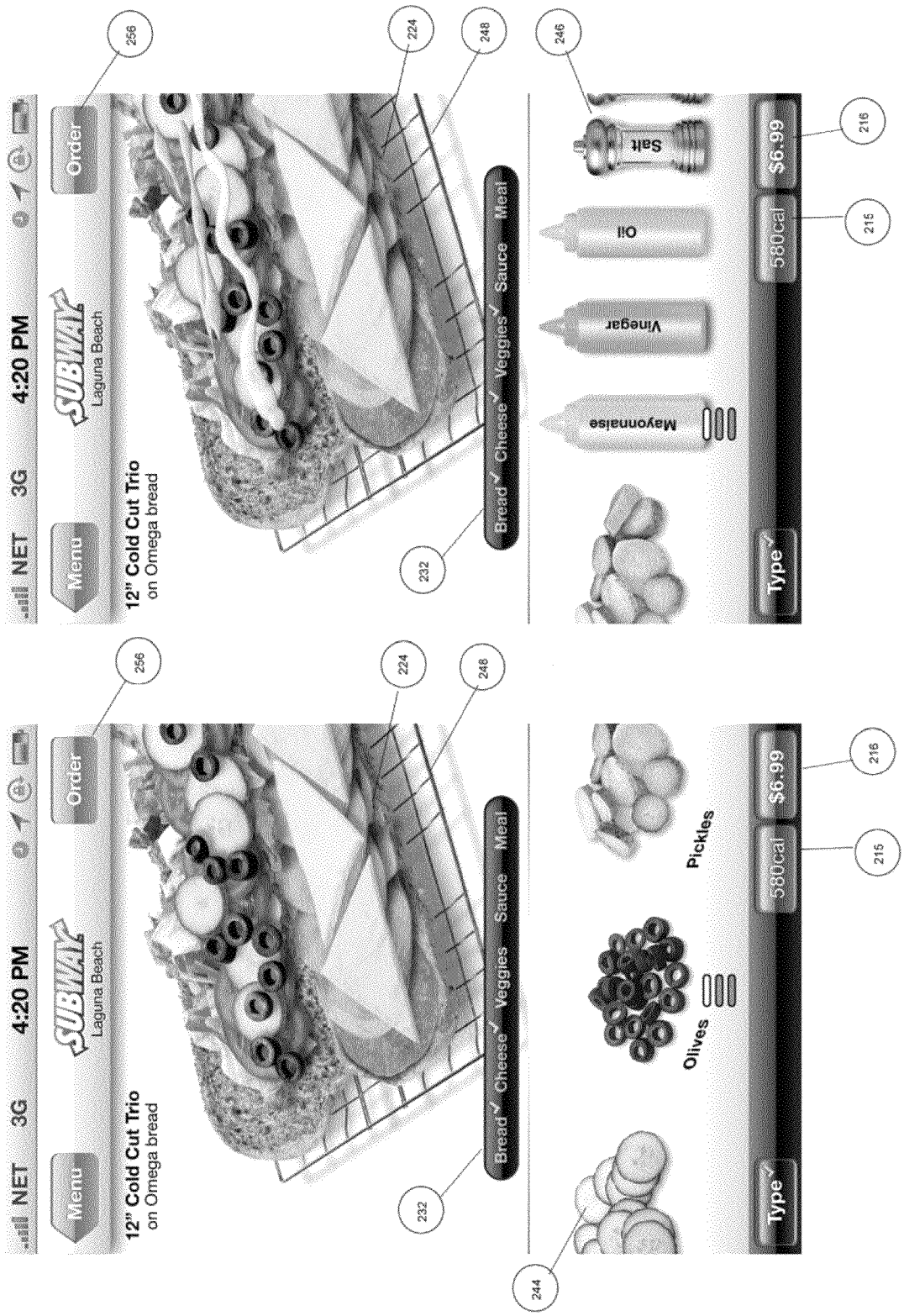

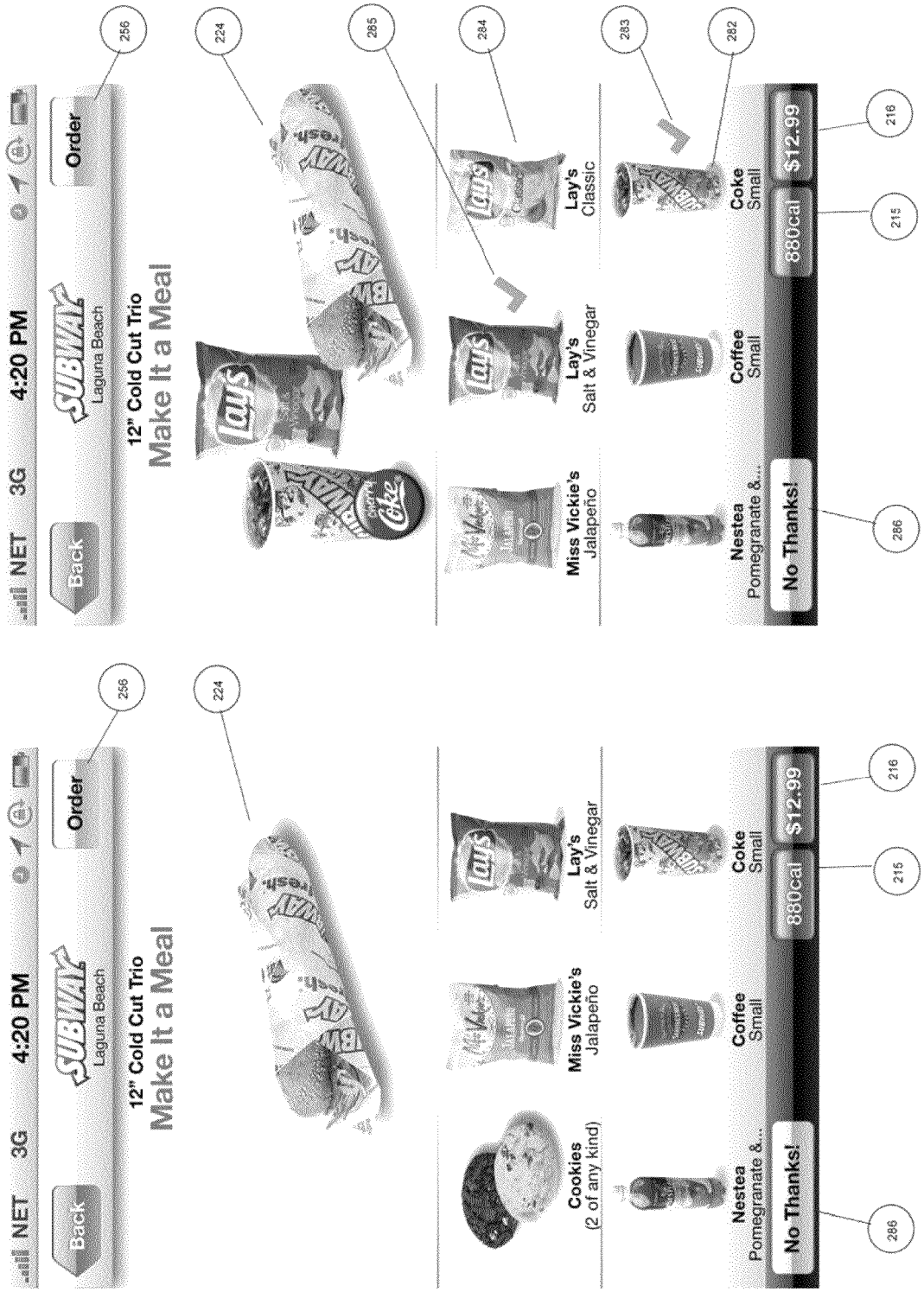

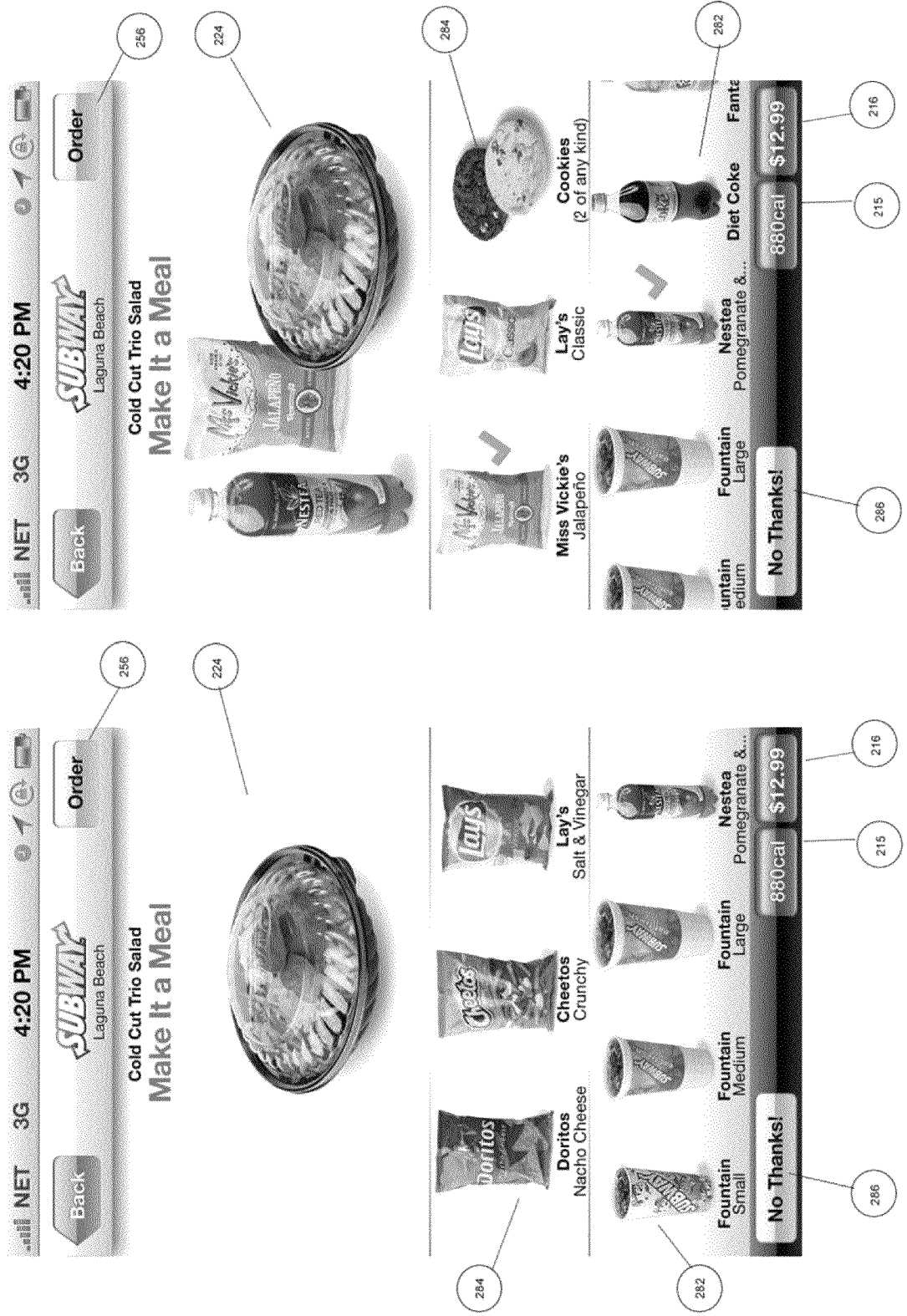

Fig. 12A

.ıll NET  3G  4:20 PM

SUBWAY
Laguna Beach

Check Out

＋

My Order

| Cal | Price | Total: $7.25 |

> 12" Cold Cut Trio  $6.00
Swiss Cheese, Lettuce, Tomato, Green peppers, Olives, Jalapeno Peppers, Onion, Avocado, Bacon

Extras  Meat (**)  $0.50
Cheese (**)  $0.25
Avocado  $0.50

Meal  Nestea - Red Tea
Chips - Miss Vickie's Jalapeño $7.25

Name  Cold Cut Trio 12" Combo for Bill
Instructions  Easy on the sauce

My Order | Past Orders | Favorites | Specials | Settings

.ıll NET  3G  4:20 PM

SUBWAY
Laguna Beach

Check Out

＋

My Order

| Cal | Price | Total: $7.25 |

> 12" Cold Cut Trio  375 cal
Swiss Cheese, Lettuce, Tomato, Green peppers, Olives, Jalapeno Peppers, Onion, Avocado, Bacon

Extras  Meat (**)  55 cal
Cheese (**)  30 cal
Avocado  25 cal

Meal  Nestea - Red Tea
Chips - Miss Vickie's Jalapeño 485 cal

Name  Cold Cut Trio 12" Combo for Bill
Instructions  Easy on the sauce

My Order | Past Orders | Favorites | Specials | Settings

SYSTEMS AND METHODS FOR ORDERING PREPARED FOOD PRODUCTS

FIELD OF THE INVENTION

The present invention relates to systems and methods for ordering prepared food products, e.g., via a network, such as a telecommunications network and/or the Internet, using an electronic device, such as a wireless and/or mobile device, e.g., a cellular telephone, tablet computer, and the like.

BACKGROUND

Vendors of some prepared food products allow customers to order their products using electronic devices, such as computers, mobile telephones, and the like. Generally, the systems available involve providing a menu to the customer on a display and allowing the customer to select items of interest. The interfaces used in such systems may simply involve displaying word lists of the menu of food items available, and allowing customers to check boxes adjacent the items of interest. Some systems may provide a visual image of menu items, but generally such images are merely examples and do not actually reflect the customer's order.

Accordingly, systems and methods for ordering prepared food products that provide an enhanced visual experience would be useful.

SUMMARY

The present invention is directed to systems and methods for ordering prepared food products, e.g., via a network, such as a telecommunications network and/or the Internet. Such systems and methods may involve use of electronic devices, such as wireless and/or mobile devices, e.g., a cellular telephone, tablet computer, and the like. The systems and methods herein may provide an enhanced experience for customers ordering prepared food products, e.g., providing a visually accurate representation of a customer's order and/or providing animations that simulate preparation of the customer's order, which may provide an experience similar to ordering food items in person and watching them be prepared.

In accordance with one embodiment, a method is provided for ordering prepared food products, e.g., a sandwich, burger, pizza, taco, and the like, via a network, by a customer using an electronic device. A menu of available prepared food products may be presented on a display of the electronic device to the customer, and one of the prepared food products may be selected using an interface of the electronic device. The electronic device may present a menu of bread items available for making the selected prepared food product on the display, the menu including visual representations of each of the available bread items. One of the bread items may be selected using the interface, whereupon the electronic device may present a visual representation of the selected bread item on the display, e.g., in an open orientation for receiving ingredients. One or more ingredients for the selected food product may be selected using the interface, whereupon the electronic device may present visual representations of the one or more ingredients superimposed on the visual representation of the selected bread item.

The customer may then input into the interface that the selected food product is complete, whereupon the electronic display may present a visual representation of the selected food product in a packaged configuration. An order including the selected food product may then be transmitted via a network to a vendor server for fulfillment. Optionally, one or more additional food items may be added to the order before transmitting the order to the vendor server.

In one embodiment, the visual representations of the one or more ingredients may be superimposed on one another, e.g., in a predetermined layering scheme, that enhances identification of the selected ingredients when superimposed onto one another and/or over the visual representation of the selected bread item. Such a layering scheme may also facilitate modification of the order, e.g., showing deselected ingredients being removed while the remaining selected ingredients remain in the visual representation being displayed, without having to replace the entire displayed image.

In addition or alternatively, the visual representations of the available bread items and ingredients may be stored in separate files in memory of the electronic device. For example, one or more databases may be stored in memory of the electronic device, which may include a list of available food products and ingredients, one or more of image files associated with respective food products and ingredients, animation files associated with respective food products and ingredients, prices associated with respective food products and ingredients, and/or nutritional information associated with respective food products and ingredients. The one or more databases may be substantially static or may be updated periodically, e.g., when an order is placed, and/or may be customized based on a selected vendor's available food products.

In accordance with another embodiment, a method is provided for ordering prepared food products, e.g., a salad, via a network, by a customer using an electronic device. A menu of available prepared food products may be presented on a display of the electronic device. One of the prepared food products may be selected using an interface of the electronic device, whereupon the electronic device may present a receptacle in an open configuration for receiving ingredients of the selected prepared food product on the display. One or more ingredients for the selected food product may be selected using the interface, whereupon the electronic device may present visual representations of the one or more ingredients superimposed on the visual representation of the receptacle.

The customer may then input into the interface that the selected food product is complete, whereupon the electronic display may present a visual representation of the selected food product with the receptacle in a closed configuration. An order including the selected food product may then be transmitted via a network to a vendor server for fulfillment.

In accordance with still another embodiment, an electronic device is provided for ordering prepared food products via a network. Generally, the electronic device includes an interface; a display; one or more processors coupled to the interface and display, and a transmitter for transmitting an order including a selected food product via a network to a vendor server for fulfillment. For example, the electronic device may be configured to present a menu of available prepared food products on the display; allow selection of one of the prepared food products using the interface, whereupon the electronic device may present a menu of bread items available for making the selected prepared food product on the display, the menu including visual representations of each of the available bread items; allow selection of one of the bread items using the interface, whereupon the electronic device may present a visual representation of the selected bread item on the display in an open orientation for receiving ingredients; allow selection of one or more ingredients for the selected food product using the interface, whereupon the electronic device may present visual representations of the one or more ingredients superimposed on the visual representation of the selected bread item; and/or allow input into the interface that the selected food product is complete, whereupon the electronic display may present a visual representation of the selected food product in a packaged configuration.

In accordance with yet another embodiment, computer program products are provided that may be configured for performing the various methods described herein and/or may be used by any of the devices or systems described herein.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which:

FIGS. 6B(1)-6B(3) show left, center, and right portions of an exemplary screen shot that may be displayed of an initial menu for ordering various food products, presented in a horizontal (landscape) scrolling orientation.

FIG. 6H shows an exemplary image that may be initially displayed when "settings" is selected from the main menu.

FIGS. 6I and 6J show alternative exemplary images that may be displayed when a favorite store is selected from the Settings page shown in FIG. 6H.

FIGS. 6K-6N show exemplary images of settings pages that may be displayed when respective options are selected from the Settings page shown in FIG. 6H.

FIGS. 9(1) and 9(2) are upper and lower portions of an exemplary screen shot, showing multiple prepared food products included in an order.

FIGS. 10A-10L are exemplary screen shots (portrait orientation) that may be displayed when an electronic device performs a method for selecting a prepared food product, i.e., a sub sandwich, for purchase, e.g., using the method shown in FIG. 4.

FIGS. 10M and 10N are exemplary screen shots (portrait orientation) that may be displayed when selection of the sandwich of FIGS. 10A-10L is complete, e.g., to display horizontally scrolling submenus of additional food products that may be purchased with the selected sandwich.

FIGS. 11A and 11B are exemplary screen shots (portrait orientation) that may be displayed when selection of a salad, such as that shown in of FIGS. 8A and 8B is complete, e.g., to display horizontally scrolling submenus of additional food products that may be purchased with the selected salad.

FIGS. 12A and 12B are exemplary screen shots (portrait orientation) that may be displayed when the order of FIGS. 10A-10N is completed, showing a price-breakdown and a caloric breakdown, respectively.

DETAILED DESCRIPTION OF THE EXEMPLARY EMBODIMENTS

Figure 1:
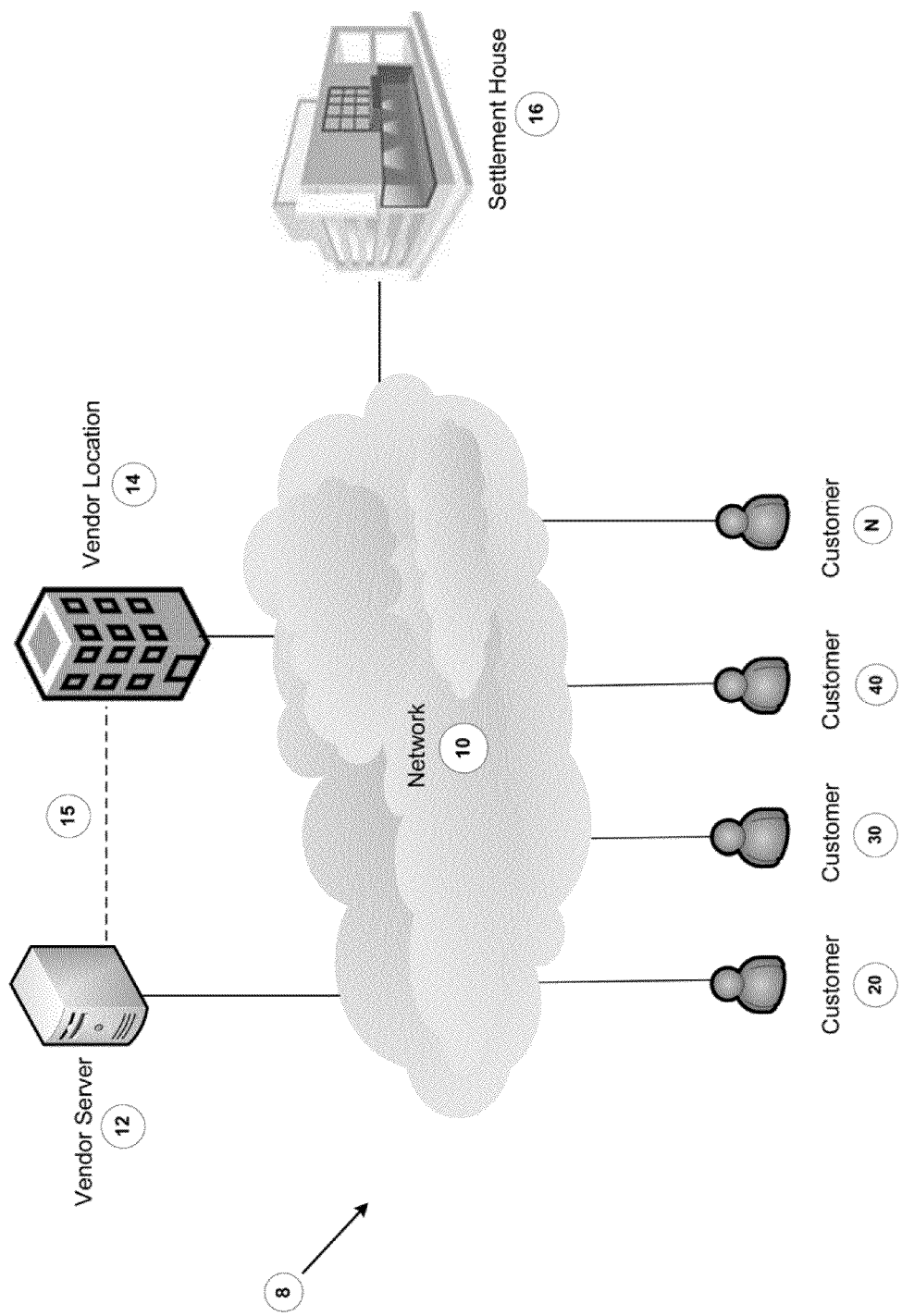
FIG. 1 is a schematic drawing showing a network architecture providing an exemplary embodiment of a system for ordering prepared food products.

Turning to the drawings, FIG. 1 shows an exemplary embodiment of a system 8 that includes one or more vendor servers 12, vendor physical locations 14, (one exemplary server 12 and physical location 14 shown merely for simplicity), and various electronic devices, such as customer electronic devices 20, 30, . . . n, connected to and/or communicating via a network 10. In addition or alternatively, the system 8 may also include one or more additional devices, such as a settlement ho use 16 for processing payments on behalf of vendors and/or customers, and the like.

In exemplary embodiments, the network 10 may be a telecommunications network, including a wide area network ("WAN"), a local area network ("LAN"), an intranet, a wireless network, and/or a telephony network. For example, the network 10 may incorporate several different types of networks including a WAN, a LAN, and/or a wireless network; one such network including multiple different types of networks is the Internet.

Figure 2:
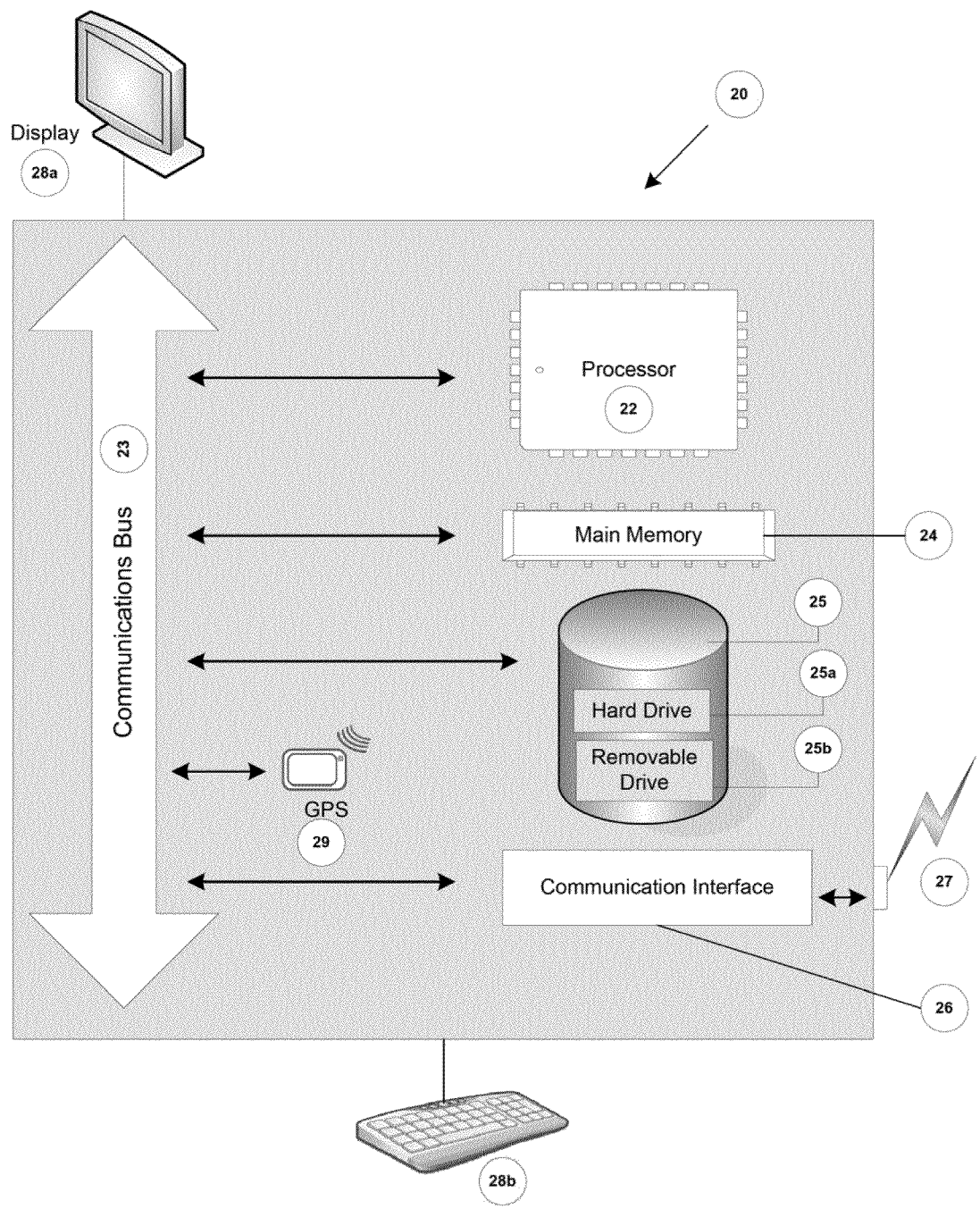
FIG. 2 is a schematic of an exemplary wireless device that may be used to order prepared food products via a network.

Each of the customer electronic devices 20-n may be an electronic and/or computing device, such as a mobile, smart, and/or cellular telephone, a tablet computer, a personal digital assistant, a wi-fi device, a desktop computer, a laptop computer, an interactive television, a kiosk, and the like, capable of communicating via the network 10. Generally, the customer devices 20-n may include one or more processors 22, memory and/or other storage devices 24, communication interfaces 26, and/or user interfaces 28, as shown in FIG. 2 and described further below. Users or "customers" using the electronic devices 20-n may interact with the vendor server(s) 12 and/or settlement house 16, e.g., submitting and/or modifying orders, updating menu and/or other information, and the like, as described elsewhere herein.

The vendor server 12 may include one or more computer systems including one or more processors, memory and/or storage devices, and communication interfaces for communicating via the network 10, e.g., with the electronic devices 20-n, vendor location 14, and/or settlement house 16. In addition or alternatively, the vendor server 12 may communicate directly with the vendor location 14, and/or may be operated directly by or communicate directly with the vendor location 14, in addition to or instead of via the network 40, e.g., if the vendor server 12 is at the same physical location as the vendor location 14, as represented by dashed line 15. The vendor server 12 may include one or more hardware-based components and/or software-based modules for performing the various functions related to the system 8, as described elsewhere herein. Although only one vendor server 12 and vendor location 14 are shown, it will be appreciated that a single vendor server 12 may communicate with multiple vendor locations 14 (not shown), and/or that multiple vendor servers (also not shown) may be provided for the same or different vendors.

Turning to FIG. 2, an exemplary embodiment of a customer electronic device 20 is shown that includes one or more hardware and/or software components for performing the methods described herein. As shown, the electronic device 20 may be a wireless device, e.g., a mobile, smart, and/or cellular telephone, a tablet computer, a personal digital assistant, a Wi-Fi device, a laptop computer, and the like, capable of communicating via the network 10 (not shown, see FIG. 1). The electronic device 20 includes one or more processors, such as exemplary processor 22, for completing the various tasks described herein, e.g., to place orders for prepared food products, download, upload, and/or save information, and the like, as described further below. Additional processors may be provided, such as an auxiliary processor to manage input/output or perform floating point mathematical operations, a special-purpose microprocessor having an architecture rapid execution of signal processing algorithms, a slave processor subordinate to the main processing system ("back-end processor"), and/or a coprocessor (not shown). Such auxiliary processors may be discrete processors or may be integrated with the processor 22.

The processor 22 is generally connected to a communication bus 23. The communication bus 23 may include a data channel for facilitating information transfer between storage and/or other components of the electronic device 20. The communication bus 23 may also provide signals required for communication with the processor 12, including a data bus, address bus, and/or control bus (not shown). The communication bus 23 may include any known bus architecture, for example, industry standard architecture (ISA), extended industry standard architecture (EISA), Micro Channel Architecture (MCA), peripheral component interconnect (PCI) local bus, IEEE 488 general-purpose interface bus (GPIB), IEEE 696/S-100, and the like.

The electronic device 20 also includes memory and/or storage devices, e.g., main memory 24 and secondary memory or storage devices 25. The main memory 24 may provide storage of instructions and/or data for programs executed on the processor 22. In exemplary embodiments, the main memory 24 may be semiconductor-based memory, such as dynamic random access memory (DRAM) and/or static random access memory (SRAM). In addition, other semiconductor-based memory may also be provided, such as synchronous dynamic random access memory (SDRAM), Rambus dynamic random access memory (RDRAM), ferroelectric random access memory (FRAM), and the like, as well as read only memory (ROM).

The secondary memory 25 may include a hard disk drive 25a and/or a removable storage drive 25b, for example, a flash drive, a floppy disk drive, a magnetic tape drive, an optical disk drive, a CDROM drive, a DVDROM drive, and the like (not shown). The removable storage drive 25 may read from and/or write to a removable storage unit (not shown) in a well-known manner. In exemplary embodiments, the removable storage unit may include a floppy disk, magnetic tape, optical disk, CDROM disk, DVDROM disk, and the like that may be read from and/or written to by removable storage drive 25b. Additionally, the removable storage unit may include a computer usable storage medium with computer software and computer data stored thereon.

Optionally, the secondary memory 25 may include other components allowing computer programs and/or other instructions to be loaded into the electronic device 20. For example, such components may include semiconductor-based memory such as programmable read-only memory (PROM), erasable programmable read-only memory (EPROM), electrically erasable read-only memory (EEPROM), or flash memory (block oriented memory similar to EEPROM). Also included are any other interfaces and removable storage units that allow software and data to be transferred from the removable storage unit to the electronic device 20.

The electronic device 20 also generally includes one or more communication interfaces 26, e.g., one or more transceivers, receivers, and/or transmitters. Communication interface(s) 26 may allow software and/or data to be transferred between the electronic device 20 and the vendor server 12 and/or other external devices, networks, or information sources. Examples of communication interface 26 include but are not limited to an infrared or radiofrequency ("RF") interface (such as those that use the Bluetooth standard), a modem, a network interface (for example an Ethernet card), a communications port, a PCMCIA slot and card, and the like. The communication interface(s) 26 may implement industry promulgated architecture standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and the like. Software and/or data transferred via the communication interface 26 may be transferred using signals 27, such as electronic, electromagnetic, optical signals, and the like. The signals 27 may be implemented using wires, cables, fiber optics, telephone lines, cellular phone links, radio frequency (RF) links, and/or other communications channels.

Computer programming instructions, e.g., computer programs, software, or firmware, may be stored in the main memory 24 and/or the secondary memory 25. Computer programs may also be received via the communication interface 26. Such computer programs, when executed, may enable the electronic device 20 to perform one or more of the features described elsewhere herein.

As used herein, "computer program product" may refer to any media used to provide programming instructions to the electronic device 20. Examples of such media include removable storage units in removable storage drive 25b, a hard disk installed in hard disk drive 25a, and signals 27. Thus, a computer program product may include means for providing programming instructions to the electronic device 20.

Where the methods and/or features described herein are completed using software, the software may be stored in a computer program product and loaded into the electronic device 20, e.g., using the hard disk drive 25a, removable storage drive 25b, and/or communication interface 26. The computer programming instructions, when executed by the processor 22, may cause the processor 22 to perform the methods and/or features described herein. In addition or alternatively, one or more of the methods and/or features may be implemented primarily in hardware using hardware components, such as application specific integrated circuits ("ASICs").

In addition, the electronic device 20 may include one or more user interfaces 28, e.g., a keyboard 28b, mouse, touch screen, touch pad (not shown), and/or other input device. The user interface 28 may allow a customer using the electronic device 20 to download software, launch one or more programs, place and/or pay for orders, and/or otherwise communicate with the vendor server 12 and/or settlement house 16, as described elsewhere herein.

Further, the electronic device 20 may include one or more output devices, e.g., a display 28a, and the like. The output device(s) 28a may facilitate a customer controlling and/or otherwise communicating with the processor 22 or other components of the electronic device 20. In addition, the output device(s) 28a may allow information to be presented and/or manipulated in a desired manner, e.g., to present a series of menus and/or images, as described elsewhere herein. In one embodiment, the electronic device 20 may include a touch screen (not shown) that may act as a display 28a and as an input device 28b, allowing the customer to scroll through menus and/or select icons, e.g., by touching the corresponding images on the touch screen, as described elsewhere herein.

Optionally, the electronic device 20 may include one or more additional hardware components and/or software modules. For example, the electronic device 20 may include a GPS 29 or other device or system for identifying a location of the electronic device 20, e.g., to facilitate identifying vendor locations based on proximity to the customer.

Figure 3:
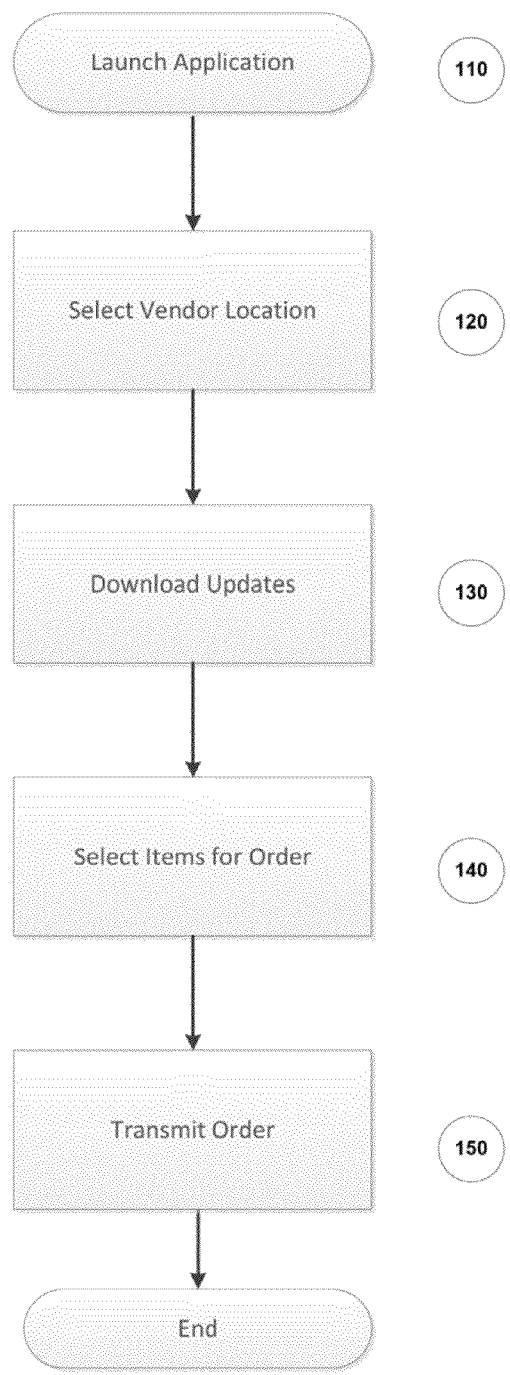
FIG. 3 is a flow chart showing an exemplary method for using a wireless device for ordering prepared food products.

Turning to FIG. 3, an exemplary method is shown for using an electronic device, such as the electronic device 20 of FIG. 2 (also referenced below), to place an order for one or more prepared food products, e.g., using an application downloaded or otherwise stored in the memory 24 and/or 25 of the electronic device 20. For example, the application may be initially downloaded via the network 10, e.g., from the vendor server 12, a general application server, or other available server. When the application is downloaded or otherwise stored in memory 24 and/or 25, the application may include a long-term or indefinite database, e.g., stored in memory 25, and optionally, a short-term or temporary database, e.g., stored in memory 24 and/or 25. For example, the long-term database may include a menu of standard food products available from the vendor(s) accessible using the application, prices, nutritional and/or other information regarding the food products, images of food products and available ingredients, standard animations, and the like, as described further below. The temporary database may be used to store information during a particular transaction, e.g., when the electronic device 20 contacts a vendor server 12, such as specials, modifications to the menu of standard food products (e.g., new products not included in the long-term database, food products in the long-term database not available at a selected vendor location 14), price changes, and the like, also as described further below.

In an exemplary embodiment, the application may be a specialized program dedicated to ordering food products from a single vendor or its affiliates, e.g., a company that operates multiple outlets directly, or franchisees of a franchisor, such as Subway® restaurants. In this embodiment, the application may be downloaded from the vendor server 12, e.g., via a website or other location accessible via the network 10 and maintained and/or operated by the vendor server 12. Alternatively, the application may be available from a website providing multiple applications for various vendors, e.g., a website specializing in food service, or from a general applications store, such as the iTunes® store or other vendor. In another embodiment, the application may provide menus and ordering services for multiple vendors, e.g., such that desired vendors may be selected from the application and orders then placed for products from that particular vendor's menu, e.g., as described elsewhere herein.

Returning to FIG. 3, once the application is stored on the electronic device 20, at any time, the application may be used to place orders for prepared food products. Initially, at step 110, the application may be launched, e.g., by selecting the desired application from a menu of available applications displayed on the display 28a. For example, the customer using the electronic device 20 may use a touch screen, touch pad, keyboard, or other input device 28b to navigate through a menu of applications stored in memory 24 or 25 on the electronic device 20, and select the application by touching an icon representing the application on a touch screen, clicking on a touch pad, pressing "enter" on a keyboard or keypad, or otherwise using the input device 28b (similar methods may be used to select items from any of the menus or methods described elsewhere herein).

As described further below, the images related to the application may be displayed on the electronic device 20 in landscape or portrait orientation, as desired. For example, the display 28a may have an aspect ratio in which the width is greater than the height (landscape orientation) or in which the width is smaller than the height (portrait orientation). Optionally, the electronic device 20 may include a display 28a that may be operated in either landscape or portrait orientation. For example, the electronic device 20 may include one or more accelerometers, gyroscopes, or other sensors that may determine the orientation of the display 28a, and the application may automatically display the images in the appropriate orientation based on the sensor information.

Next, at step 120, a vendor location may be selected. For example, the GPS 29 on the electronic device or other device or system may provide the location of the electronic device 20, which may be transmitted via the communication interface 26 to the vendor server 12 or other location. The vendor server 12 may return one or more vendor locations 14 based on the GPS data, e.g., by proximity to the electronic device 20, which may be presented to the customer as a list or other menu on the display 28a. Alternatively, a database of vendor locations may be included in the long-term database of the application, e.g., downloaded and stored in the memory 25. A list or menu of available vendor locations may be displayed on the display 28a when the processor 22 accesses the GPS data and the database, e.g., based on proximity to the location of the electronic device 20. From the list or menu, the customer may select a desired vendor location 14, e.g., using the input device 28b.

In a further alternative, the electronic device 20 may have one or more favorite vendor locations stored in the long-term database, e.g., in the memory 25, saved by the user. FIGS. 6M(1) and 6M(2) show an exemplary image that may be displayed of a saved or favorite vendor location, e.g., by accessing the "Settings" icon 132e from the main menu 132, as described further below. The favorite vendor location(s) may be displayed on the display 28a or automatically selected when the application launches. The customer may simply accept a default vendor location using the input device 28b or may override the default and request a list of vendor locations, e.g., based on proximity to the electronic device 20 (from GPS data) or based on proximity to a location input by the customer using the input device 28b, e.g., a Zip or postal code, city, state, and the like.

Once a vendor location 14 is selected, the electronic device 20 may communicate with the vendor server 12 and/or vendor location 14, e.g., to receive updates and/or other information, relevant to the selected vendor location 14. For example, the processor 22 may transmit an inquiry to the vendor server 12 and/or vendor location 14 requesting any special offers, menu updates, and the like, which may be downloaded via the communication interface 26 and stored in the memory 24 and/or 25, e.g., in the long-term or temporary database of the application.

Figure 5A:
FIGS. 5A and 5B are exemplary screen shots (portrait orientation) showing initial images that may be displayed when an electronic device initially launches an application performing a method, such as that shown in FIG. 3.

FIG. 5A shows an exemplary initial image that may be displayed on the display 28a of the electronic device 20, where a location of a Subway® restaurant in Laguna Beach, Calif. has been selected. An image, such as that shown in FIG. 5A, may be displayed for a predetermined time, if desired, e.g., to allow time for any menu updates or other information to buffer and/or at least partially download into memory 24 and/or 25.

Figure 5B:
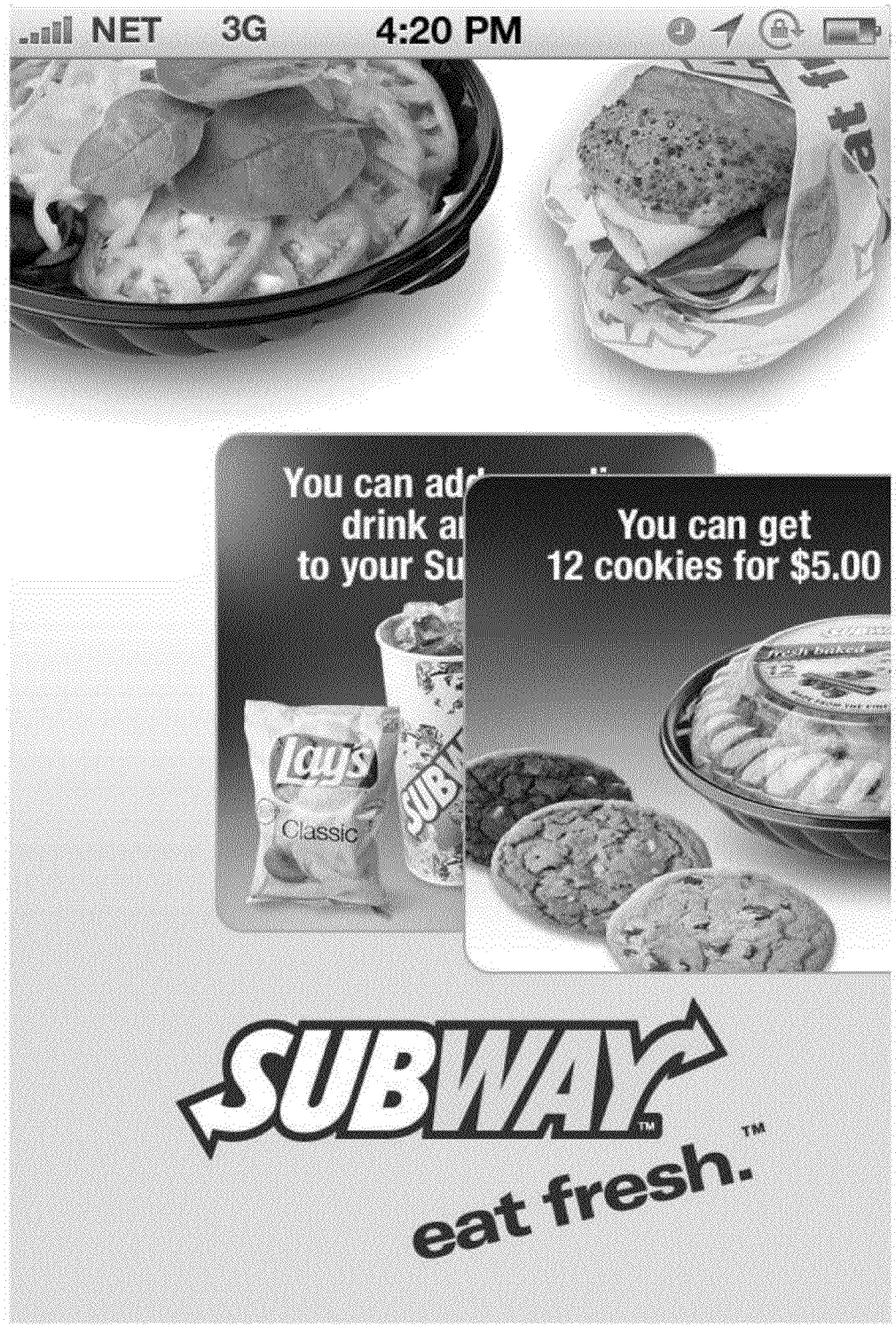
Figure 6A:
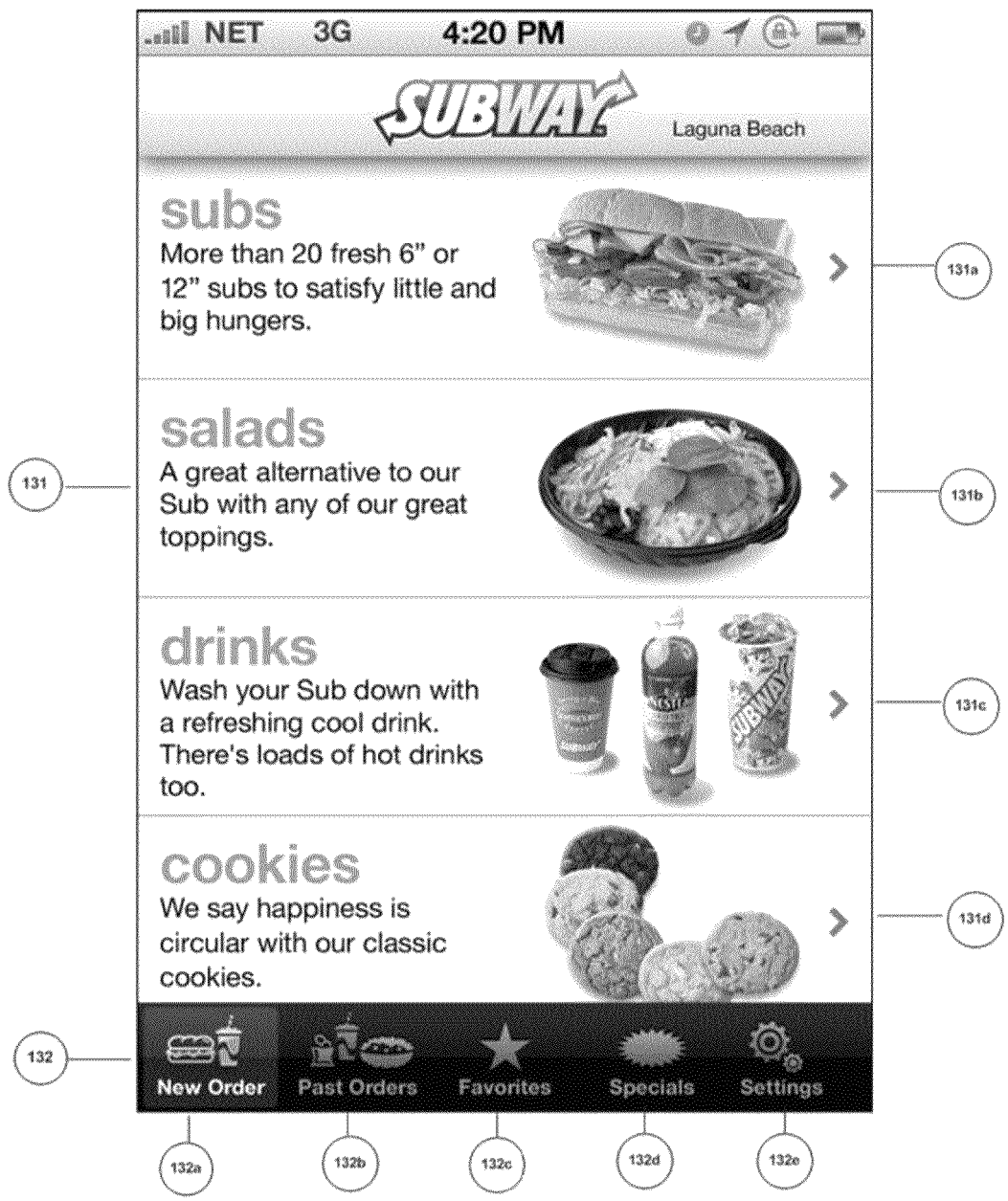
FIG. 6A shows an exemplary screen shot that may be displayed of an initial menu for ordering various food products, presented in a vertical (portrait) scrolling orientation.
Figure 6C:
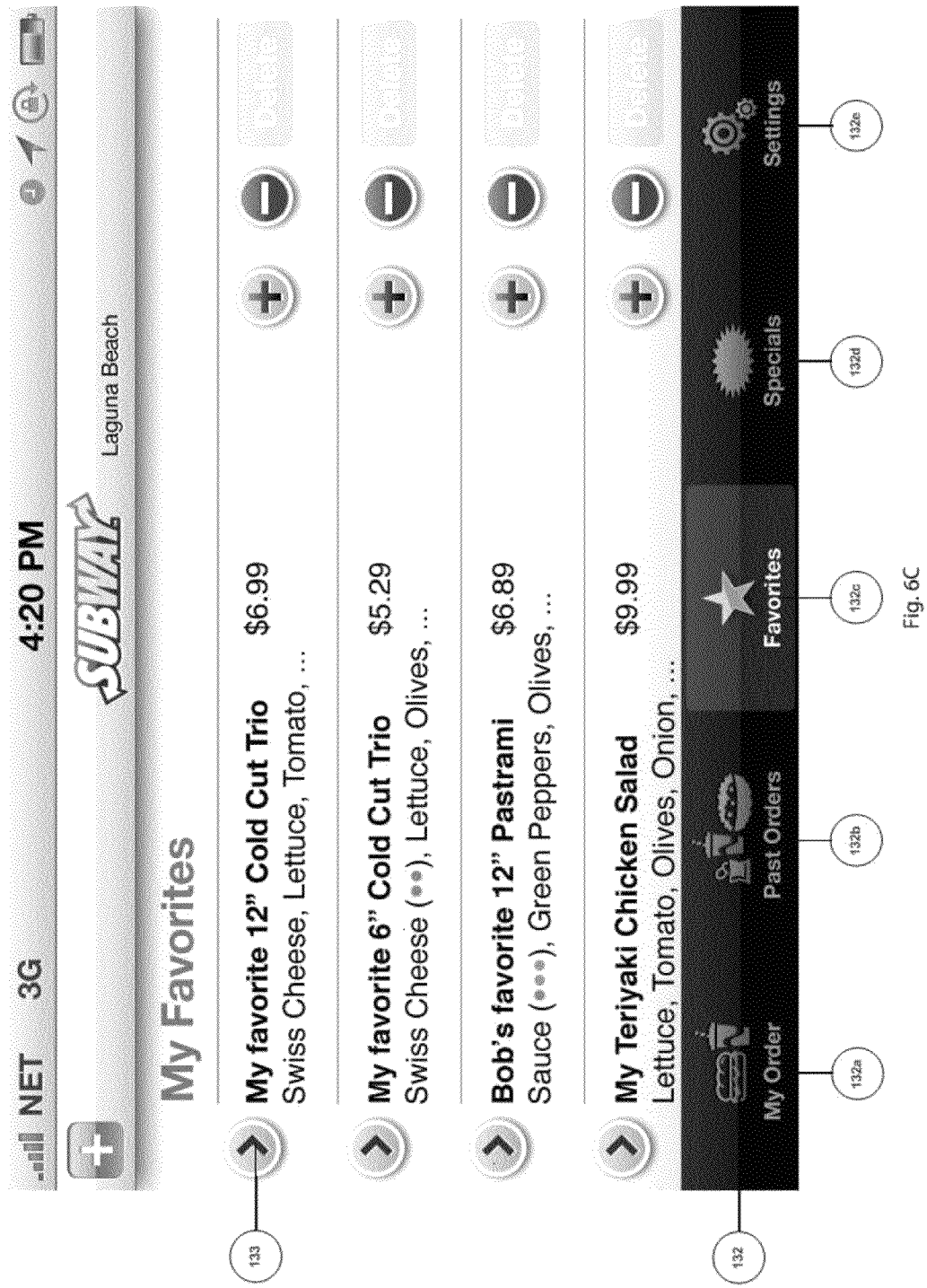
FIGS. 6C and 6D are exemplary screen shots that may be displayed, e.g., when a customer selects "My Favorites" from the exemplary initial menus shown in FIGS. 6A and 6B.

If the vendor location 14 has any special offers, e.g., included in the information downloaded from the vendor server 12, the application may automatically direct the processor 22 to present such offers on the display 28a, e.g., sequentially after the initial screen. For example, the image of FIG. 5A includes a notice to the customer that a drink and chips can be added to a sub for $2.50. FIG. 5B shows another exemplary image of a special offer ("12 cookies for $5.00") that may be displayed alone or as part of a sequence of special offers on or after the initial image, e.g., superimposed on the image of FIG. 5A. The special offer(s) may be displayed for a predetermined time, e.g., to allow additional time, if needed, for menu updates, image files or other graphics, and the like to further download into the memory 24 and/or 25 of the electronic device 20. Optionally, a user may use the input device 28b to select a special offer, e.g., by touching a touch screen over the image of the special offer, or otherwise using the input device 28b, to bypass at least some of the subsequent menus and jump immediately to a special offer of interest. Alternatively, the user may select "Specials" from the main menu 131, as described further below, at any time while the application is running to access the list of available special offers, which may be displayed, e.g., as shown in FIGS. 6F and 6G.

As described above, in an exemplary system and method, the application may include a long-term database of standard products; product images, animations, or other graphics; prices; nutritional information; and the like. The long-term database may be set-up and/or stored in the memory 24 and/or 25, e.g., when the application is initially downloaded or otherwise stored. During step 130, the processor 22 may check if any of the standard menu items, prices, and/or other information has changed, and, if so, the new menu items, prices, and/or other updated information may be downloaded and added to the long-term database in memory 24 and/or 25, e.g., indefinitely replacing previous prices or other information. Alternatively, the new prices may be saved temporarily, e.g., into the temporary database, such that the long-term database remains unchanged, while allowing the temporary prices charged by the vendor location 14 to be saved, displayed, and used during an order. For example, the processor 22 may download any such special prices or other deals via the communications interface 26, which may be offered by the vendor location 14 and/or added to the long-term and/or temporary databases.

In addition or alternatively, the processor 22 may download any new products offered by the vendor location 14 that are not already included in the long-term database, e.g., for indefinite addition to the long-term database, or temporarily saved solely for the current transaction, e.g., in the temporary database. Alternatively, the processor 22 may determine from the data received from the vendor server 12 that certain products in the long-term database are not offered by the selected vendor location 14, whereupon the processor 22 may leave such products off of the menus subsequently displayed and offered to the customer by the application on the electronic device 20.

Returning to FIG. 3, at step 140, one or more food products may be selected for purchase, e.g., added to an order being placed by the customer. For example, as shown in FIG. 6A, after presenting an initial image (e.g., FIG. 5A) and/or any special offer images (e.g., FIG. 5B), an initial menu 131 may be displayed on the display 28a, e.g., to present menu options to the customer. As shown in FIG. 6A, the menu 131 may be displayed in a portrait or vertical stacked orientation, e.g., which may be scrolled vertically to present a plurality of menu categories, such as "subs" 131a, "salads" 131b, "drinks" 131c, and "cookies" 131d. Alternatively, as shown in FIGS. 6B(1)-6B(3), the initial menu 131' may be displayed in a landscape or side-by-side orientation, e.g., which may be scrolled horizontally to present menu categories, such as "subs" 131a, "salads" 131b, "drinks" 131c, "cookies" 131d, "chips" 131e, "soups" 131f, "breakfast" 131g, "party subs" 131h, and "catering" 131i on the display 28a to the customer.

Optionally, as shown in FIGS. 6A and 6B, a shortcut or main menu 132 (and/or other menus, not shown) may be included in the image presenting the initial menu 131, e.g., along the bottom of the image, as shown, or alternatively, along the top or one of the sides of the image (not shown). The shortcut menu 132 may provide additional options to the customer in addition to selecting individual food products from the initial menu 131.

For example, the customer may select "new order" 132a from the shortcut menu 132 to begin placing a new order and canceling any unsaved order information to date (e.g., after confirmation from the customer). Alternatively, the customer may simply select one of the displayed categories on the initial menu 131 to initiate a new order and select one or more prepared food products for purchase. For example, the customer may select a sandwich for purchase, e.g., by touching the image over or adjacent the region labeled "subs" 131a, 131a' (or over the image of the exemplary sandwich or elsewhere in the field shown adjacent the corresponding text), or otherwise inputting a selection using the input device 28b, whereupon the electronic device 20 may perform a method to select the prepared food product of choice, such as that shown in FIGS. 4, 7A-7Q, and/or 10A-10L, and described further below.

Alternatively, the customer may select "past order" 132b from the shortcut menu 132 to repeat a previous order that the customer has placed using the electronic device 20, e.g., saved in memory 25. For example, if the customer selects past order 132b using the input device 28b, the processor 22 may access the memory 25, and present a submenu of previous orders on the display 28a, such as that shown in FIG. 6E. The customer may then select one of the previous orders, or cancel and exit the submenu and return to the initial menu 131. Optionally, the customer may select to edit the previous order, e.g., by selecting an "edit" button or highlighted text link included in the displayed image (not shown), whereupon the order may be edited using methods similar to those used to place a new order, as described further elsewhere herein.

In yet another option, the customer may select "favorites" 132c from the shortcut menu 132, whereupon the processor 22 may cause a list or submenu of favorite food products previously saved in memory 24 and/or 25 of the electronic device 20. For example, FIG. 6C shows an exemplary image including a submenu of favorite food products previously saved in memory 25 of the electronic device 20. Any of the favorites may be selected, may be edited, and/or may be deleted, e.g., by selecting appropriate icons adjacent the respective favorite food products.

Figure 6D:
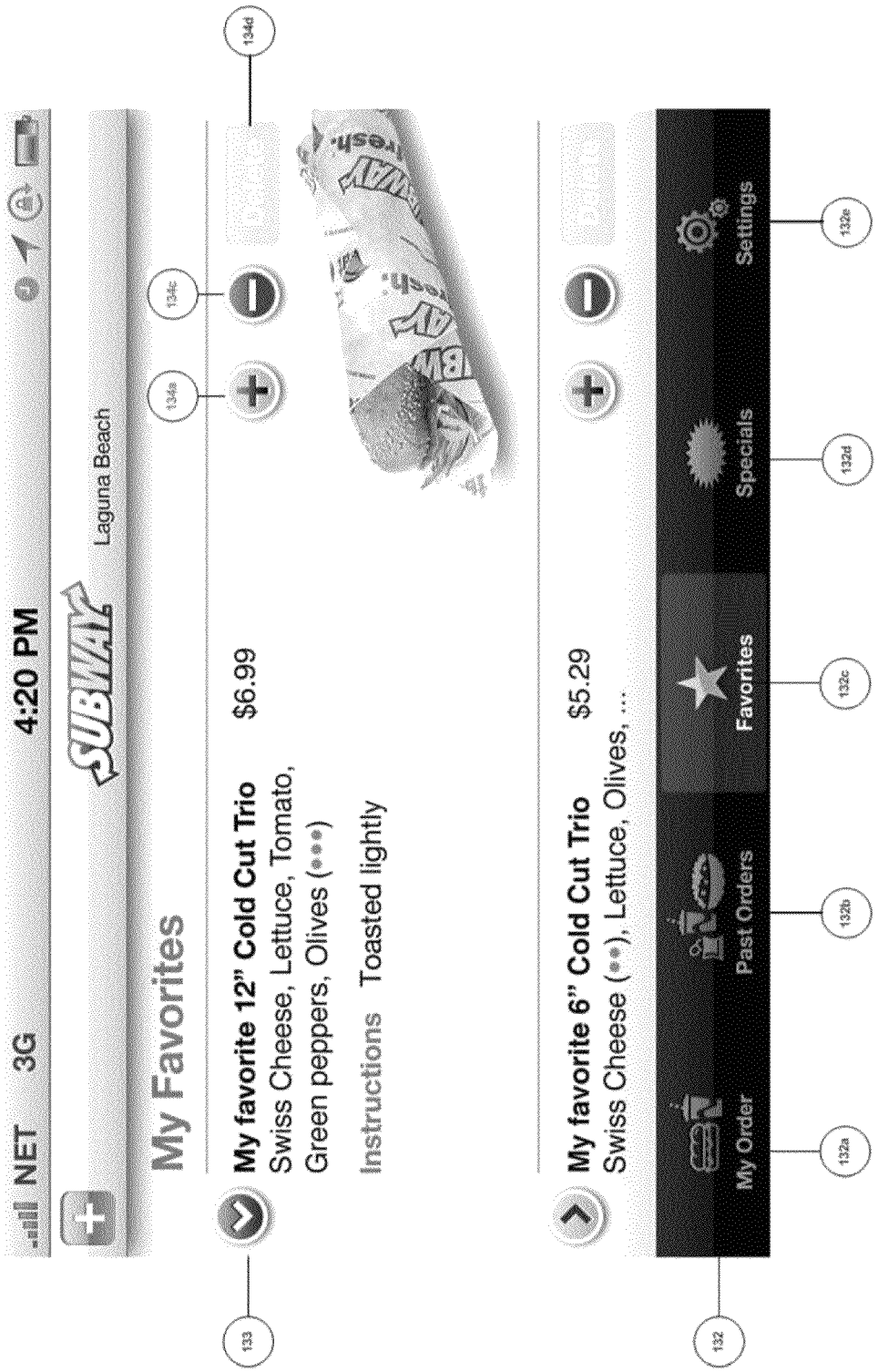
Figure 6E:
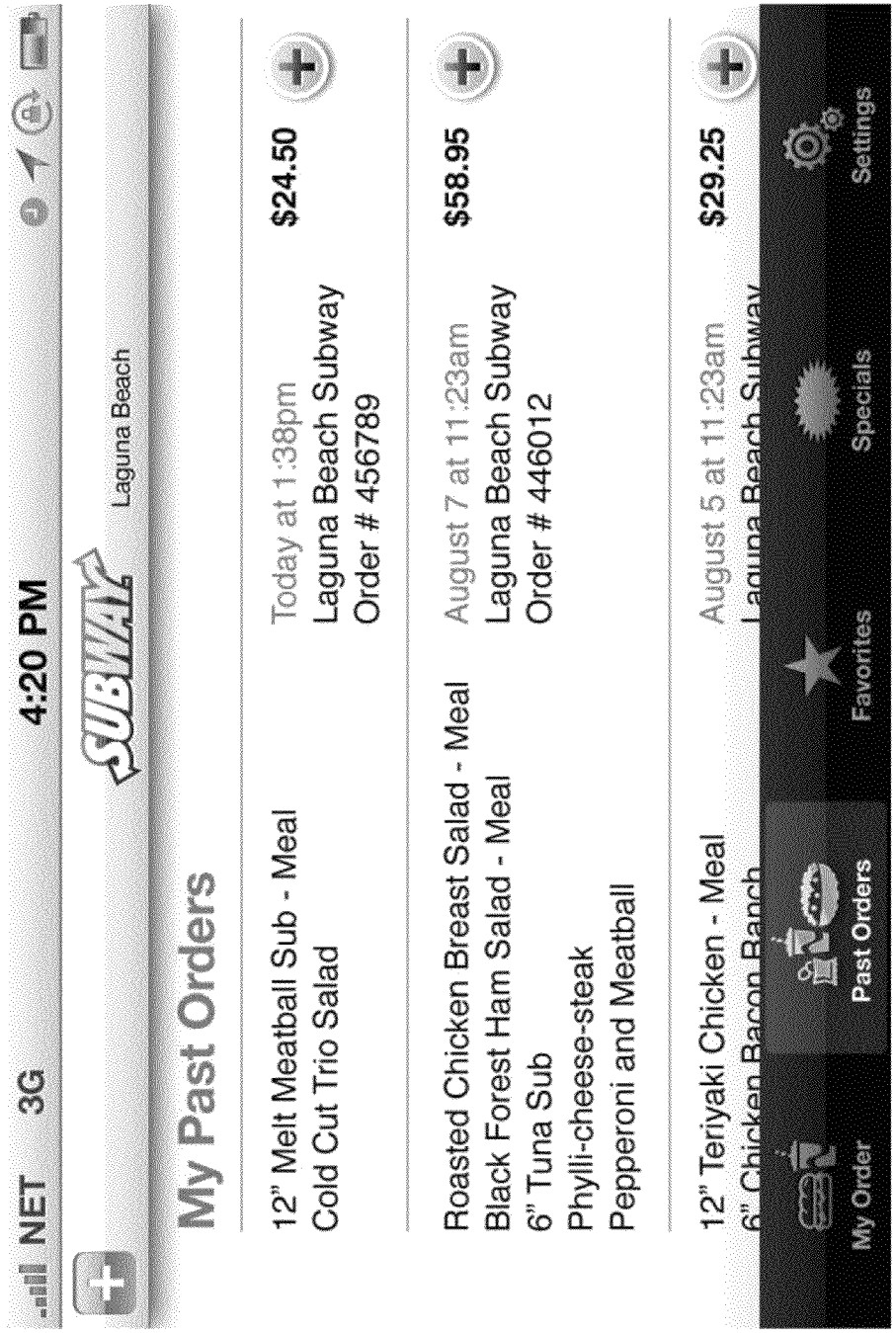
FIG. 6E is an exemplary screen shot that may be displayed, e.g., when a customer selects "Past Orders" from the exemplary initial menus shown in FIGS. 6A and 6B.
Figure 6F:
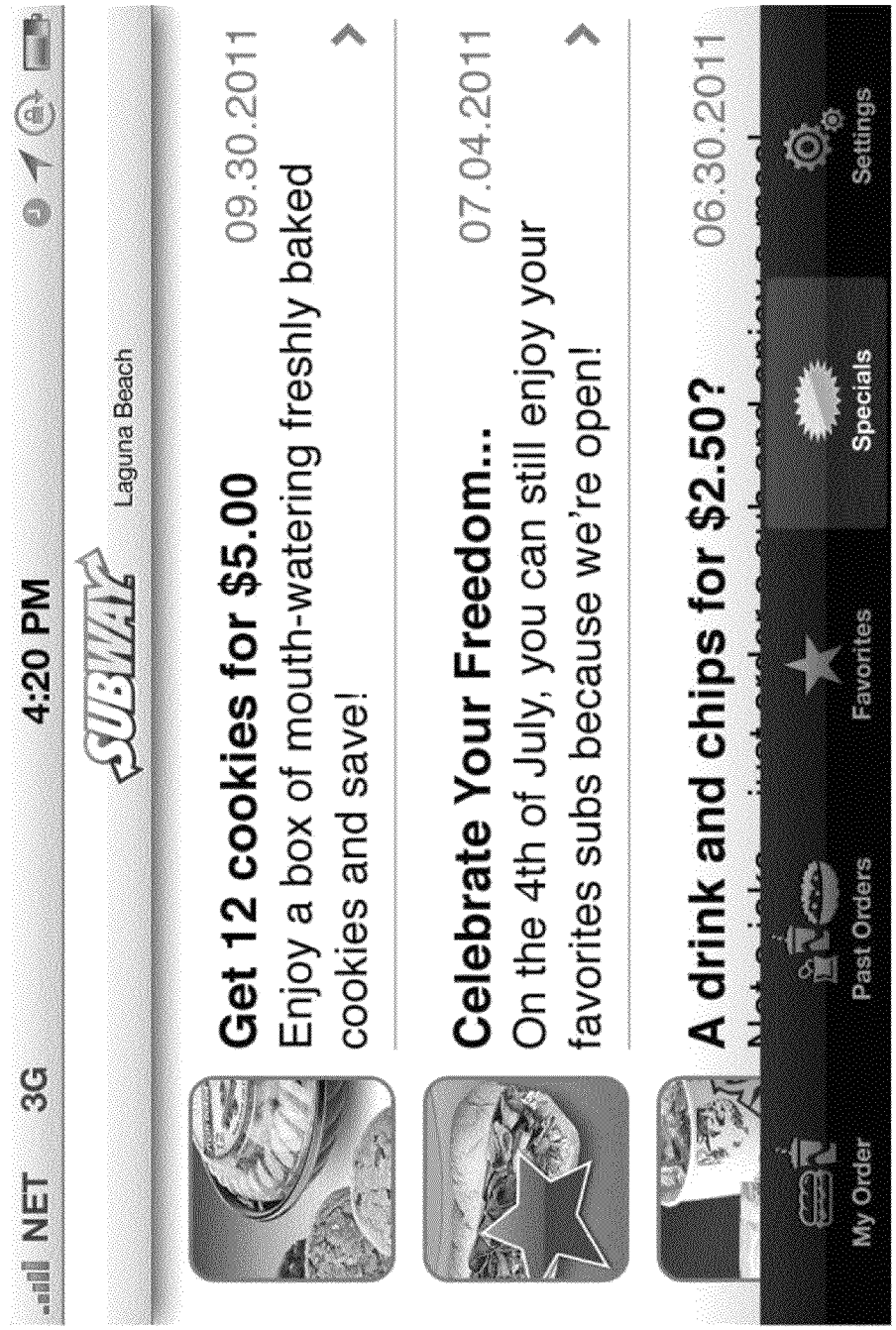
FIGS. 6F and 6G are exemplary screen shots (landscape orientation) that may be displayed when "Specials" is selected from the exemplary initial menus shown in FIGS. 6A and 6B.
Figure 6G:
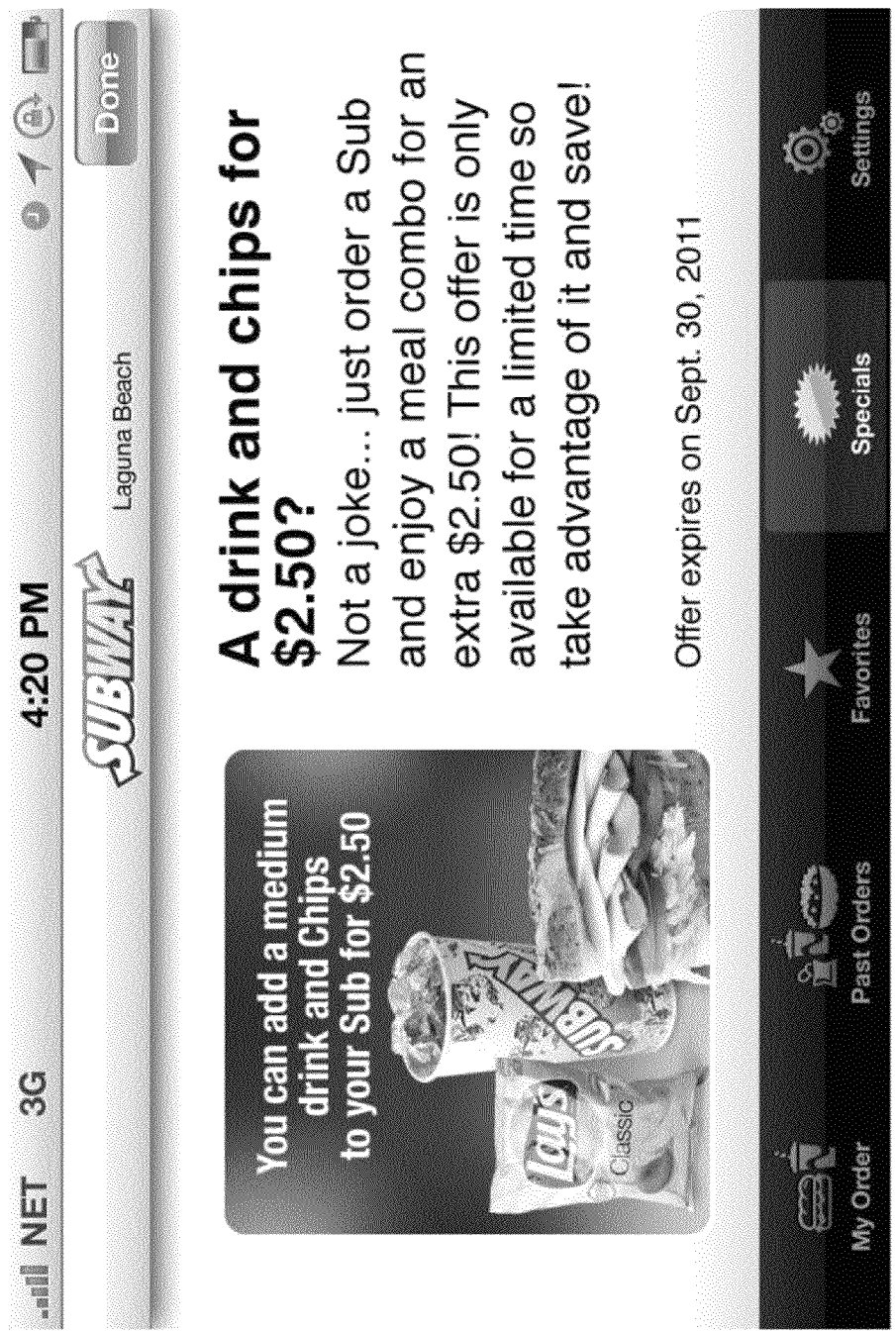

For example, turning to FIG. 6D, an image of an exemplary favorite prepared food product, e.g., a sandwich, is shown and described, e.g., by selecting an expand icon 133 to the left of the favorite food product (e.g., changing from a ">" in FIG. 6C to a "V" in FIG. 6D). If the customer wants to order the favorite food product identified as previously ordered, the customer may add the product to their order, e.g., by selecting (e.g., touching or clicking) the "+" icon 134a shown in FIG. 6D. Alternatively, if the customer wants to modify the favorite food product, the customer may select the "pencil" icon 134b and modify the food product, using methods similar to those described elsewhere herein. In a further alternative, the customer may delete the favorite food product, e.g., by selecting the "−" icon 134c, and then confirming by selecting the "Delete" icon 134d (e.g., to reduce the risk of accidental selection).

In still another option, the customer may select "specials" 132d from the shortcut menu 132, whereupon the processor 22 may access the memory 24 and/or 25 and/or communicate with the vendor server 14 for special offers. The processor 22 may then present a list or submenu of special deals, such as the exemplary images shown in FIGS. 6E and 6F, offered by the vendor location 14 on the display 28a. The customer may select one of the specials included in the display image, if desired, and may then modify the special order, e.g., to add and/or change ingredients, and the like, similar to other methods herein.

Figure 6H:
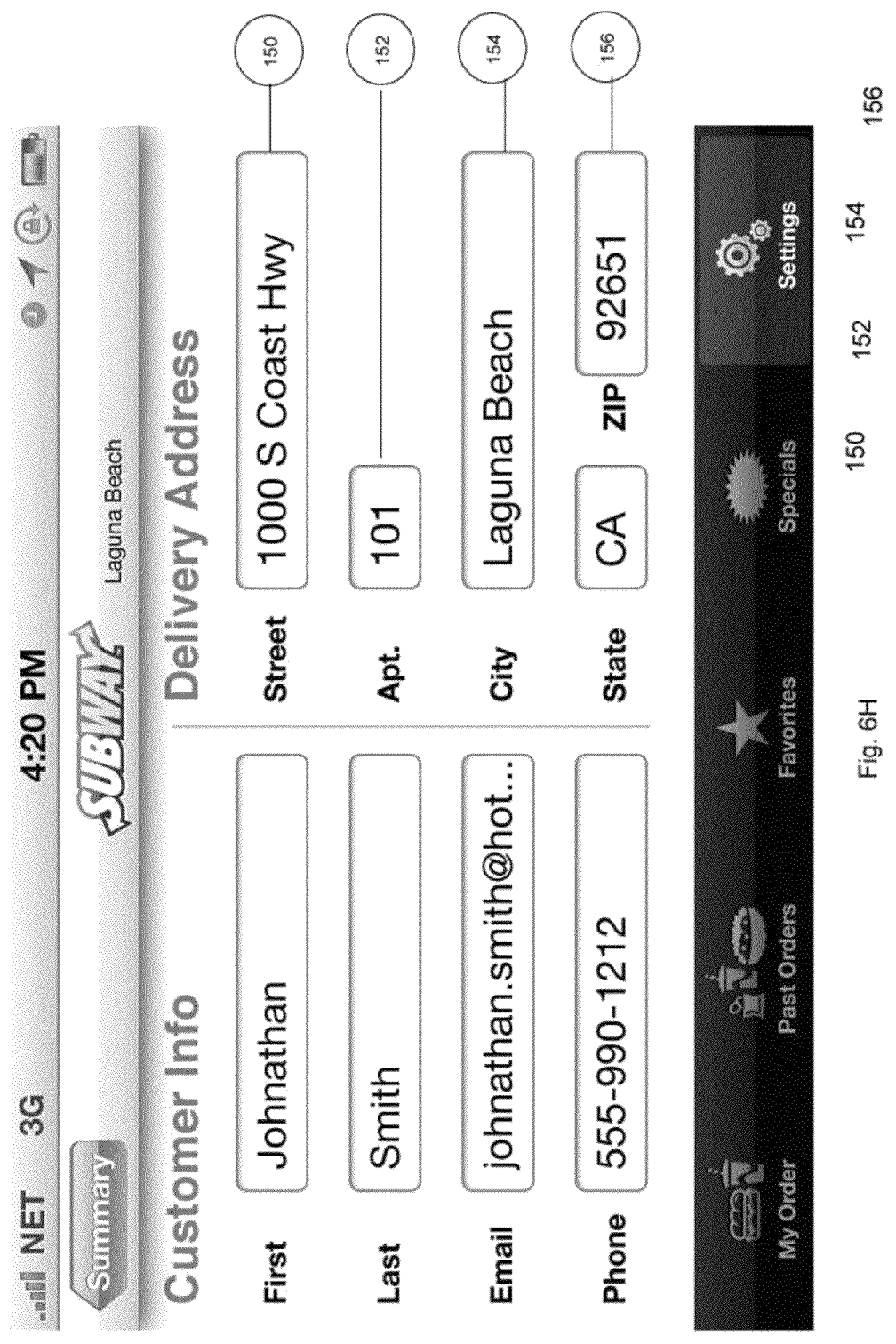

Finally, the customer may select "settings" 132e from the shortcut menu 132, e.g., to set or change other settings related to operation of the application and/or electronic device 20. For example, when settings 132e is selected, the customer may be able to save preferred vendor locations, update payment information, e.g., credit or debit card, or online payment service information, such as PayPal® information, and the like. For example, FIG. 6H shows an exemplary image that may be initially displayed when "settings" is selected from the main menu 132, showing saved user information, e.g., saved favorite vendor location(s) 150, user name 152, address 154, and saved payment information 156. The user may select any of these items to review additional details and/or make any desired changes.

Figure 6J:
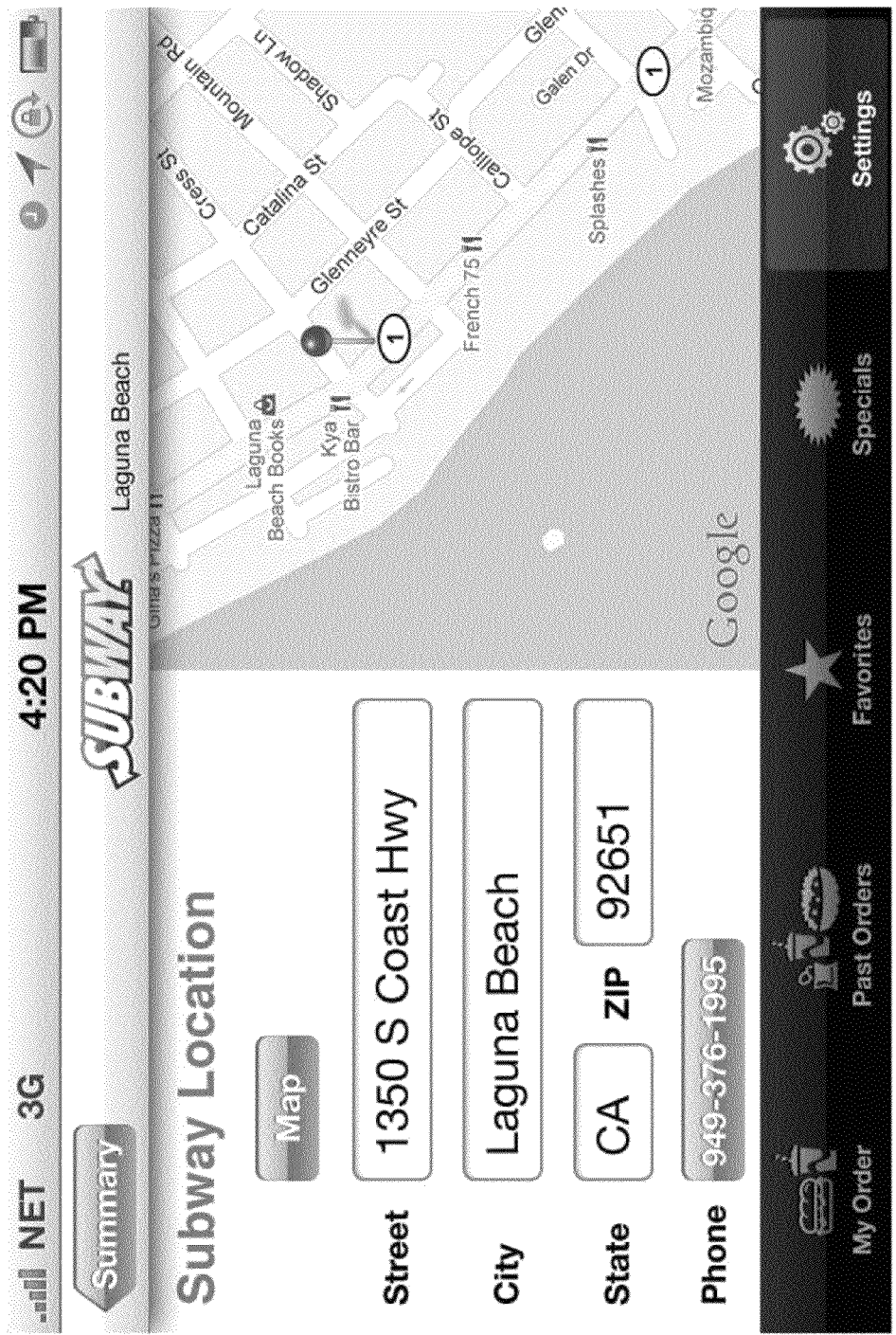

For example, if the user selects the "store" icon or associated field 150 shown in FIG. 6H, an image including information related to any saved favorite vendor location(s) may be displayed, such as the image shown in FIG. 6I. If desired, a map of the area of the saved vendor location may be selected, e.g., by selecting the "map" icon 150a in FIG. 6I, whereupon a map may be displayed, such as that shown in FIG. 6J. Alternatively, the user may conduct searches for vendor locations, e.g., by selecting the "Find by Address' icon 150b or the "Find by ZIP Code" icon 150c, shown in FIG. 6I, whereupon additional search screens (not shown) may be displayed.

Figure 6L:
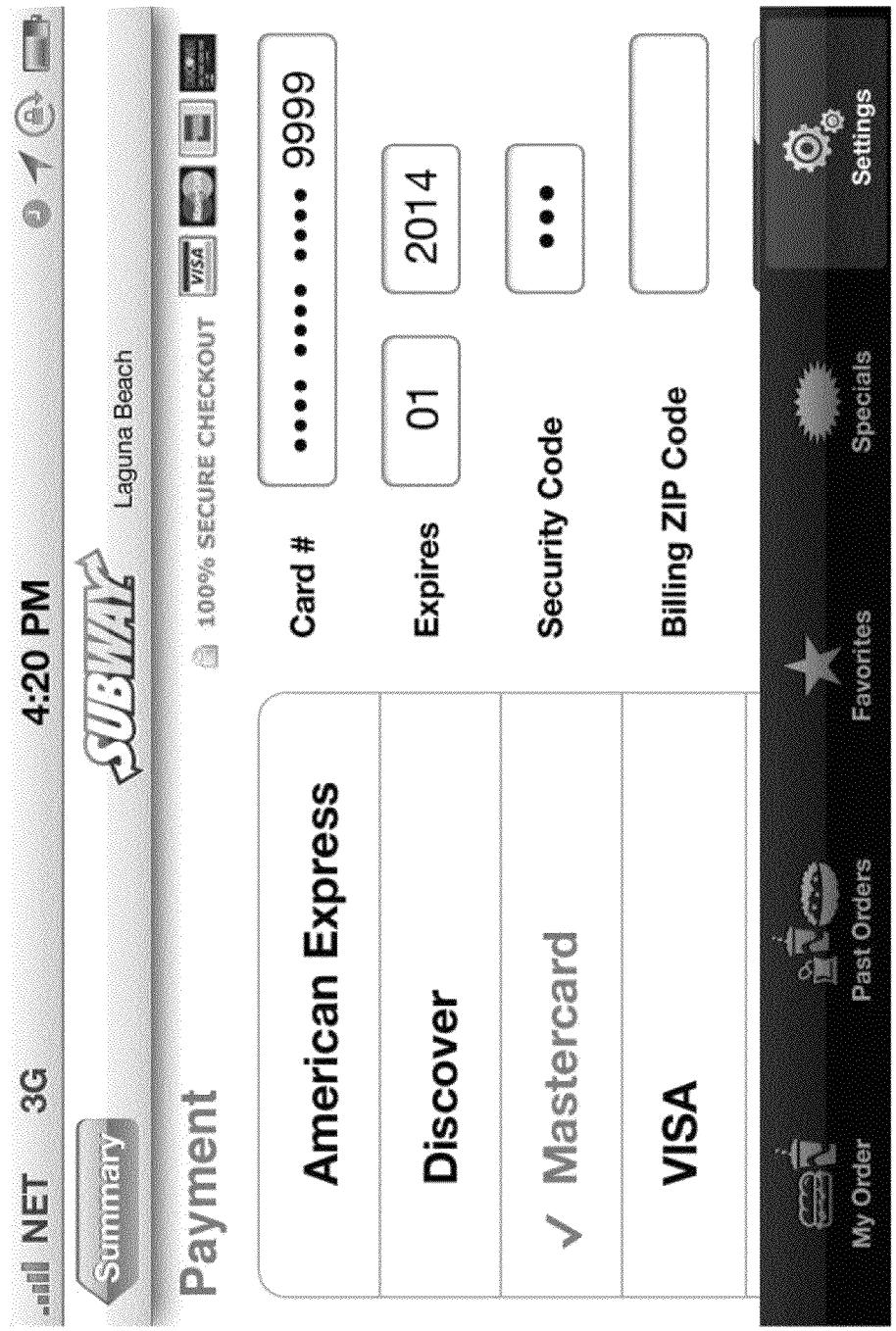

If the "user" or "delivery address" icons or fields 152, 154 are selected from the Settings menu shown in FIG. 6H, an image including information regarding the user and their address may be displayed, such as the image shown in FIG. 6K. If the "payment type" icon or field 156 is selected, an image including saved payment information may be displayed, such as the image shown in FIG. 6L. The user may then modify, add, and/or delete information, as desired from the displayed fields. FIGS. 6M and 6N show alternative images that may be displayed, e.g., to display and/or allow modification of similar information.

Returning to FIG. 3, once an order is complete (e.g., using any of the methods described below or elsewhere herein), at step 150, the electronic device 20 may transmit the order to the vendor server 12 for processing. For example, the electronic device 20 may transmit a data file including the order via the communication interface 26 and the network 10 to the vendor server 12. The customer may pay for the order with the vendor server 12 directly, or via the settlement house 16 using conventional methods. For example, the electronic device 20 may include payment information in the memory 25, such as that shown in FIG. 6L or 6N, which may be transmitted with the order or may be subsequently transmitted when prompted during communications with the vendor server 12. Alternatively, the customer may opt to pay for the order when they arrive at the vendor location 14 to pick up their order.

Once the order has been successfully transmitted and acknowledged by the vendor server 12 (and optionally paid for), the vendor server 12 may communicate the order to the selected vendor location 14, for example, via the network 10 or directly via link 15, e.g., if the vendor server 12 is located physically at the vendor location 14. The order may be presented to the vendor location 14 in any desired format, e.g., a text file, image file, and the like, that may be integrated into the existing systems and/or procedures at the vendor location 14. Optionally, the vendor location 14 may send an acknowledgment to the electronic device 20, e.g., a text, e-mail, or other communication, acknowledging receipt of the order. Optionally, the vendor location 14 may send a communication to the electronic device 20, e.g., when the order has been prepared and is ready for pick up, or any other desired communication, for example, via the vendor server 12, the network 10, and the like.

Figure 4:
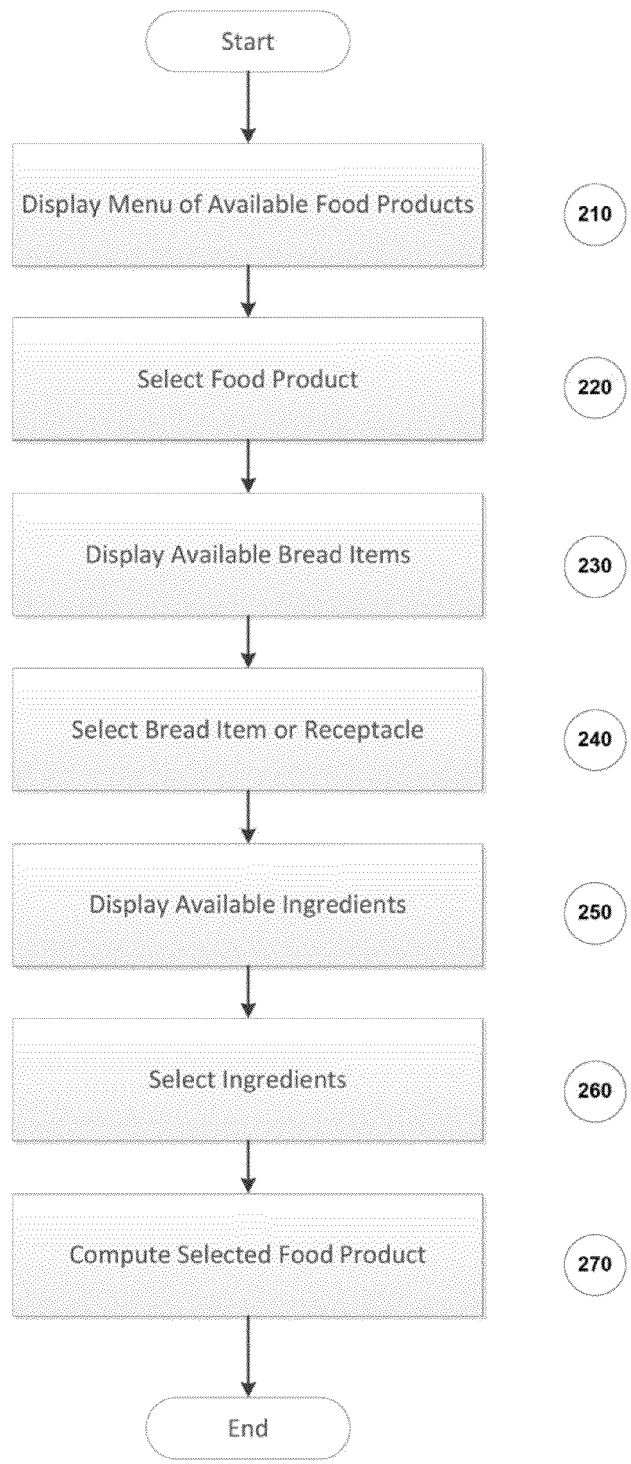
FIG. 4 is a flowchart showing an exemplary method for selecting and/or building a prepared food product to be included in an order.
Figure 7A:
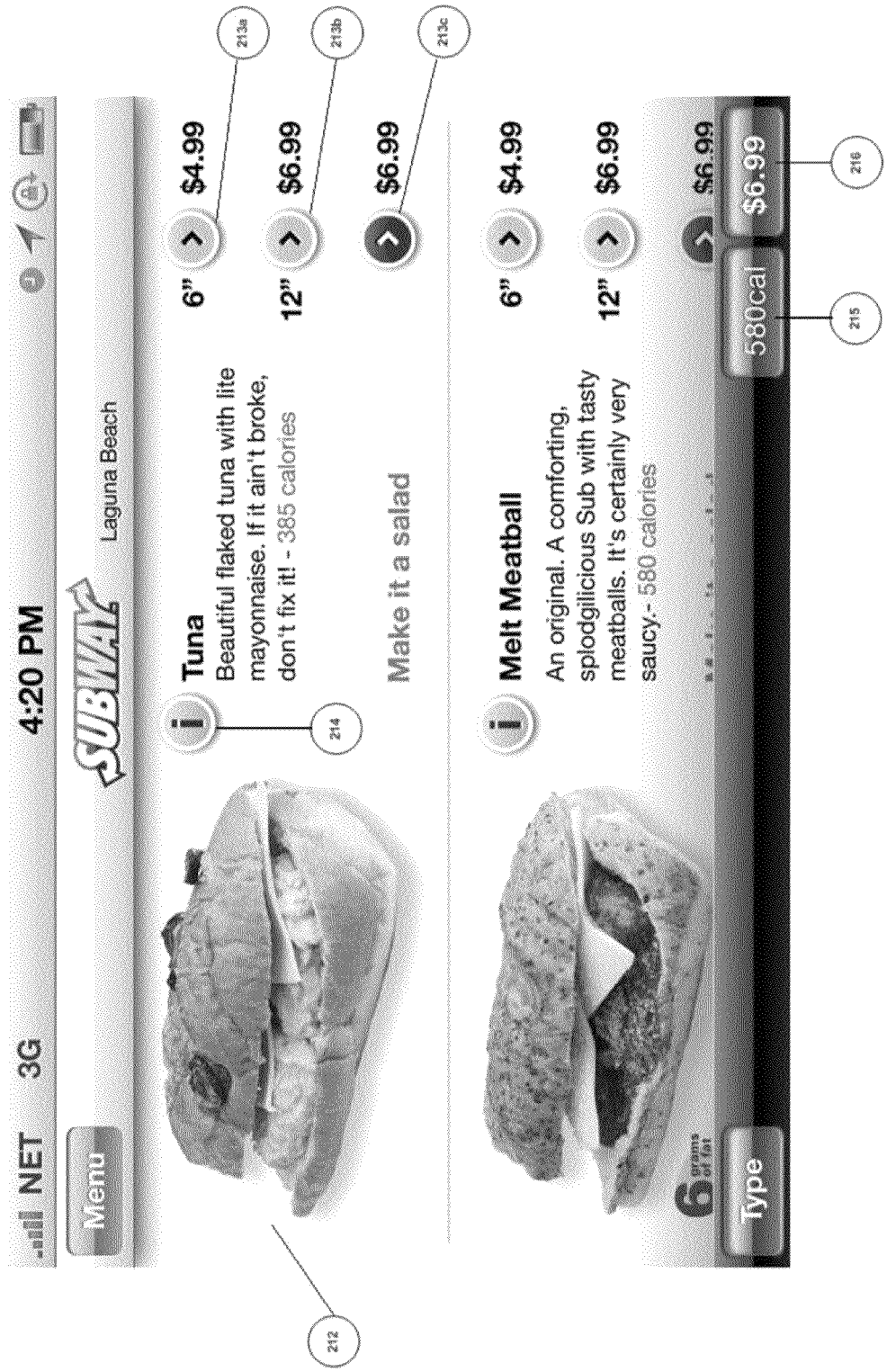
FIGS. 7A-7Q are exemplary screen shots (landscape orientation) that may be displayed when an electronic device performs a method for selecting a prepared food product, i.e., a sub sandwich, for purchase, e.g., using the method shown in FIG. 4.
Figure 7B:
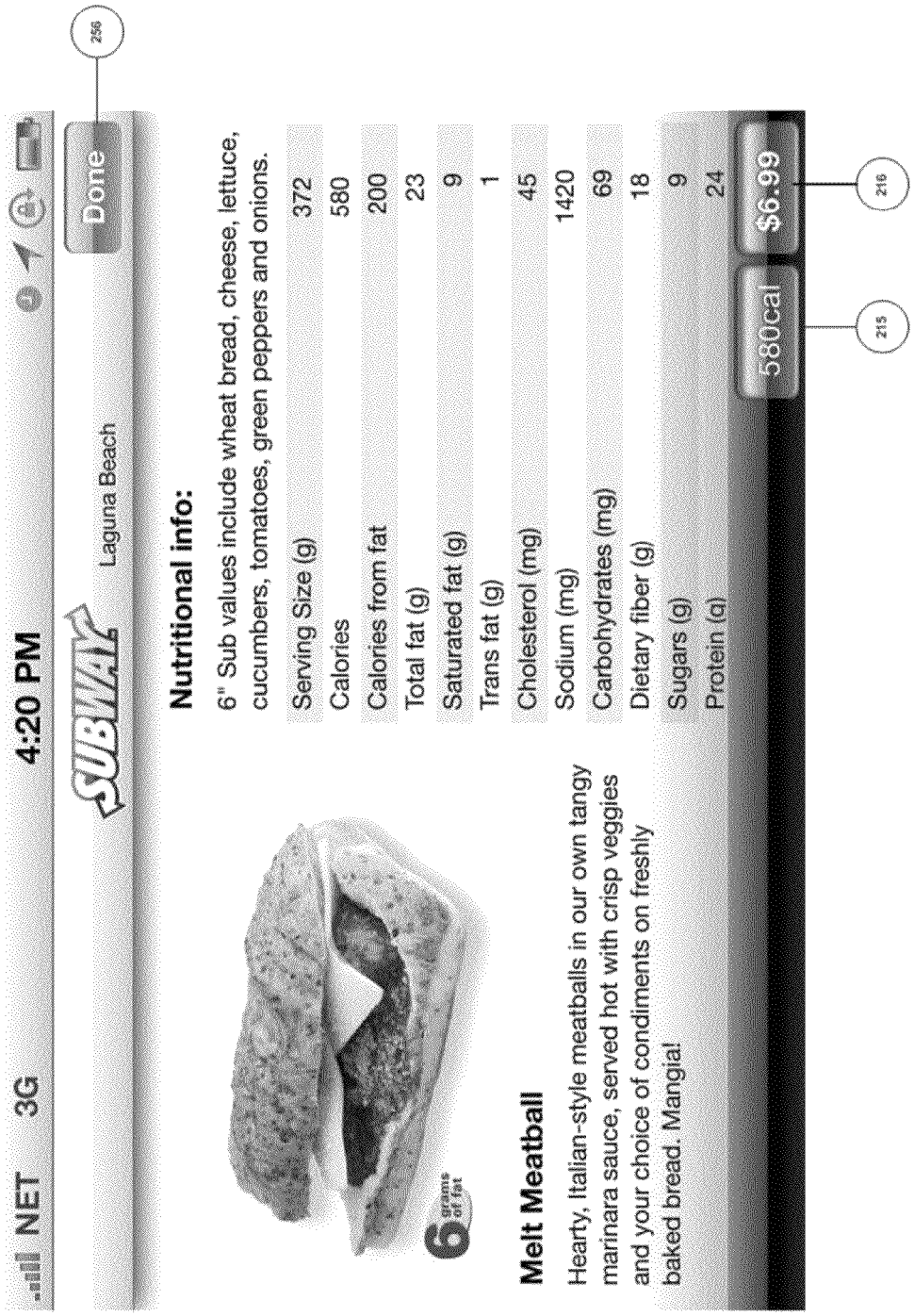
FIGS. 7R and 7S are exemplary screen shots (landscape orientation) that may be displayed when selection of the sandwich of FIGS. 7A-7Q is complete, e.g., to display vertically scrolling submenus of additional food products that may be purchased with the selected sandwich.
FIGS. 7T-7V are exemplary screen shots (landscape orientation) that may be displayed when an order is completed, including options to save an order to a favorites list and/or to provide special instructions.
Figure 7D:
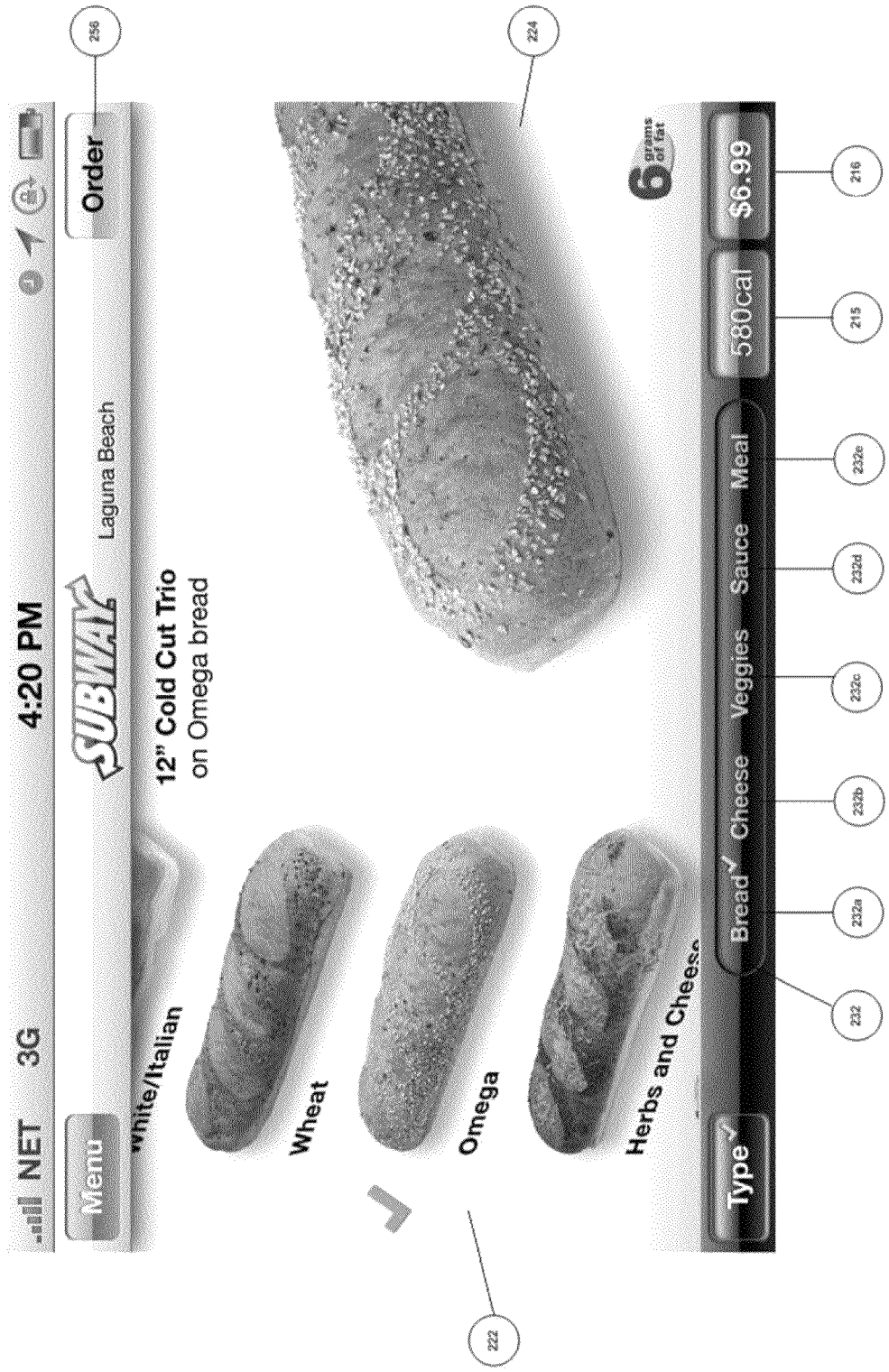
Figure 7E:
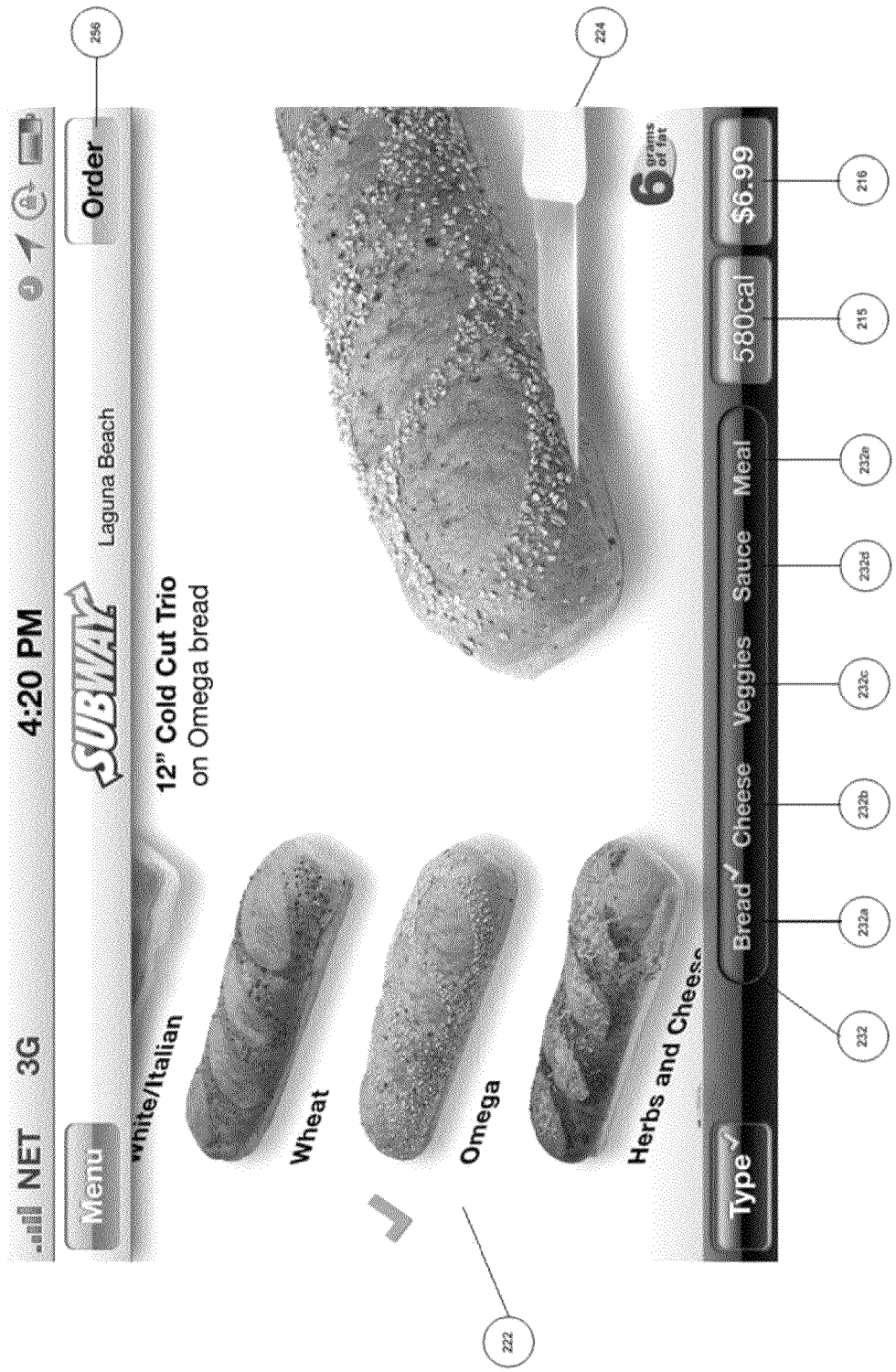
Figure 7F:
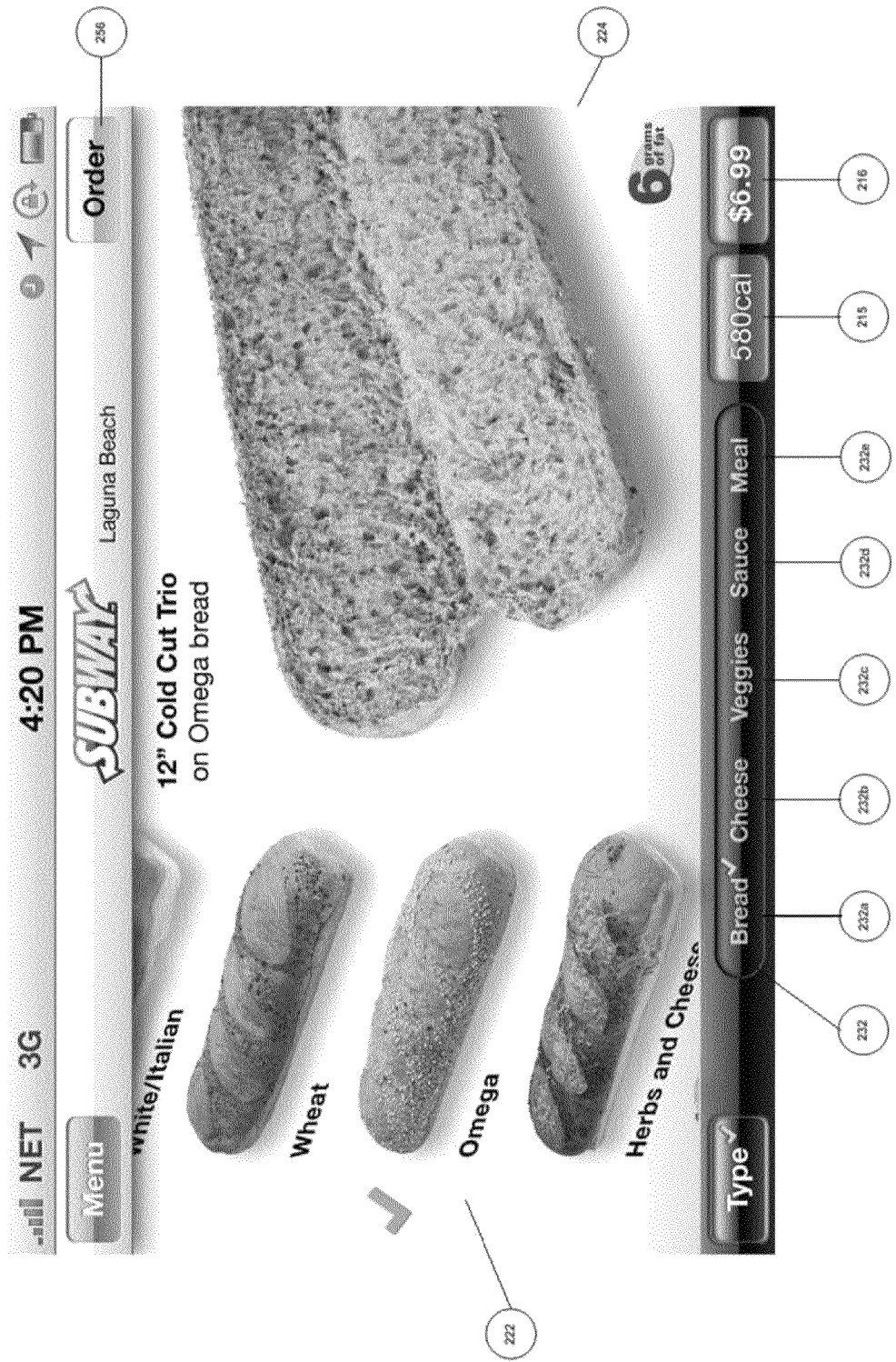
Figure 7G:
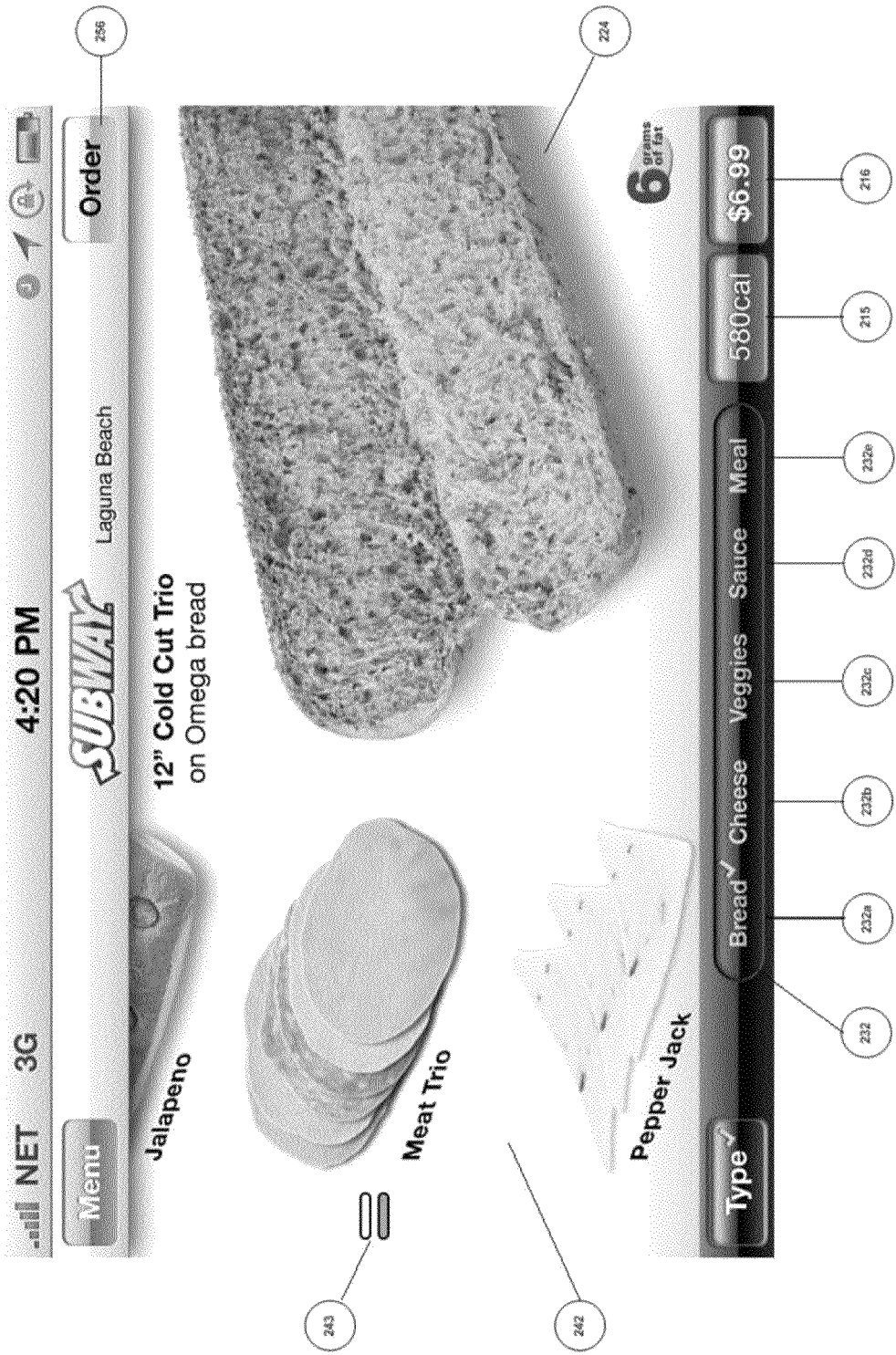
Figure 7H:
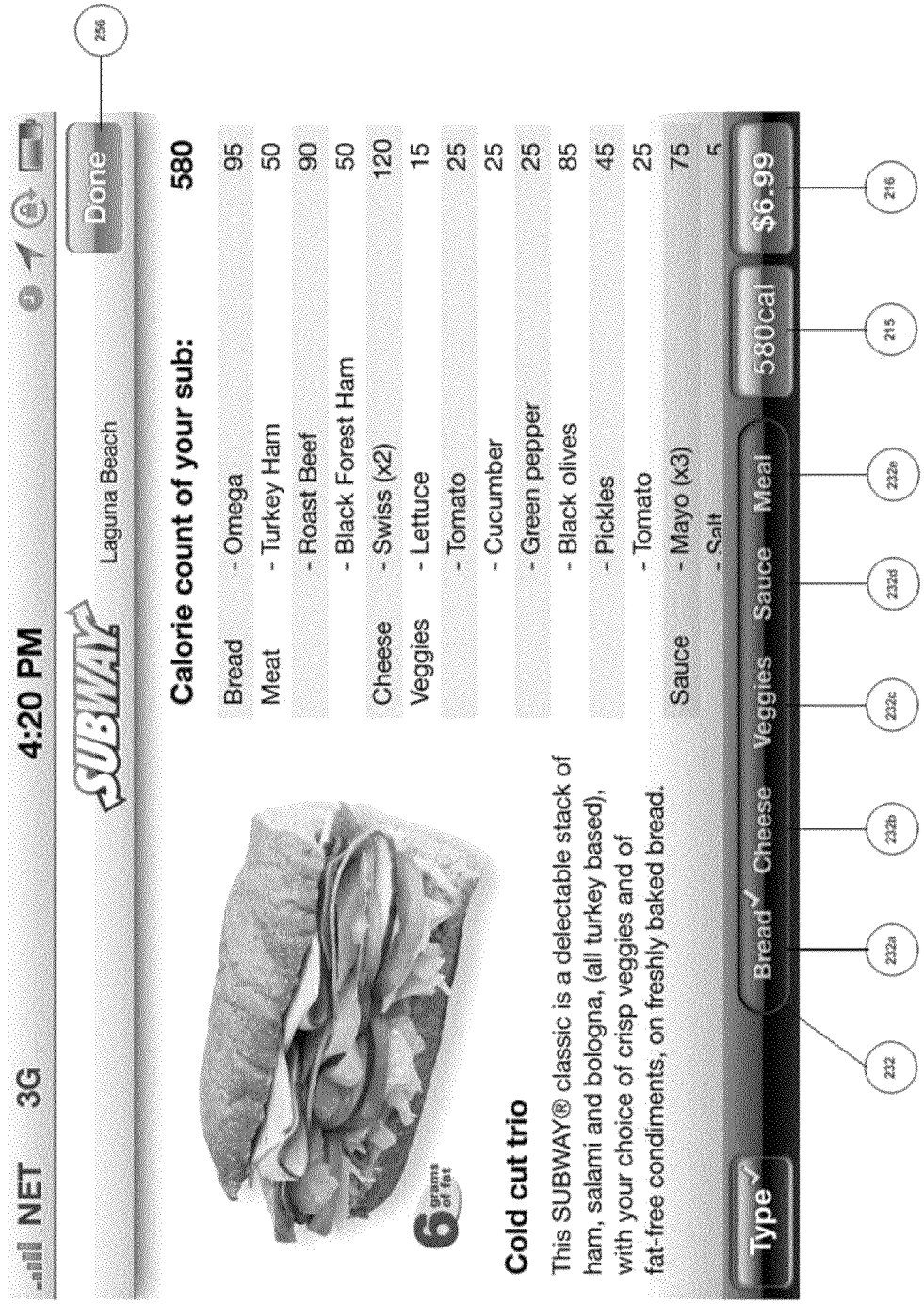
Figure 71:
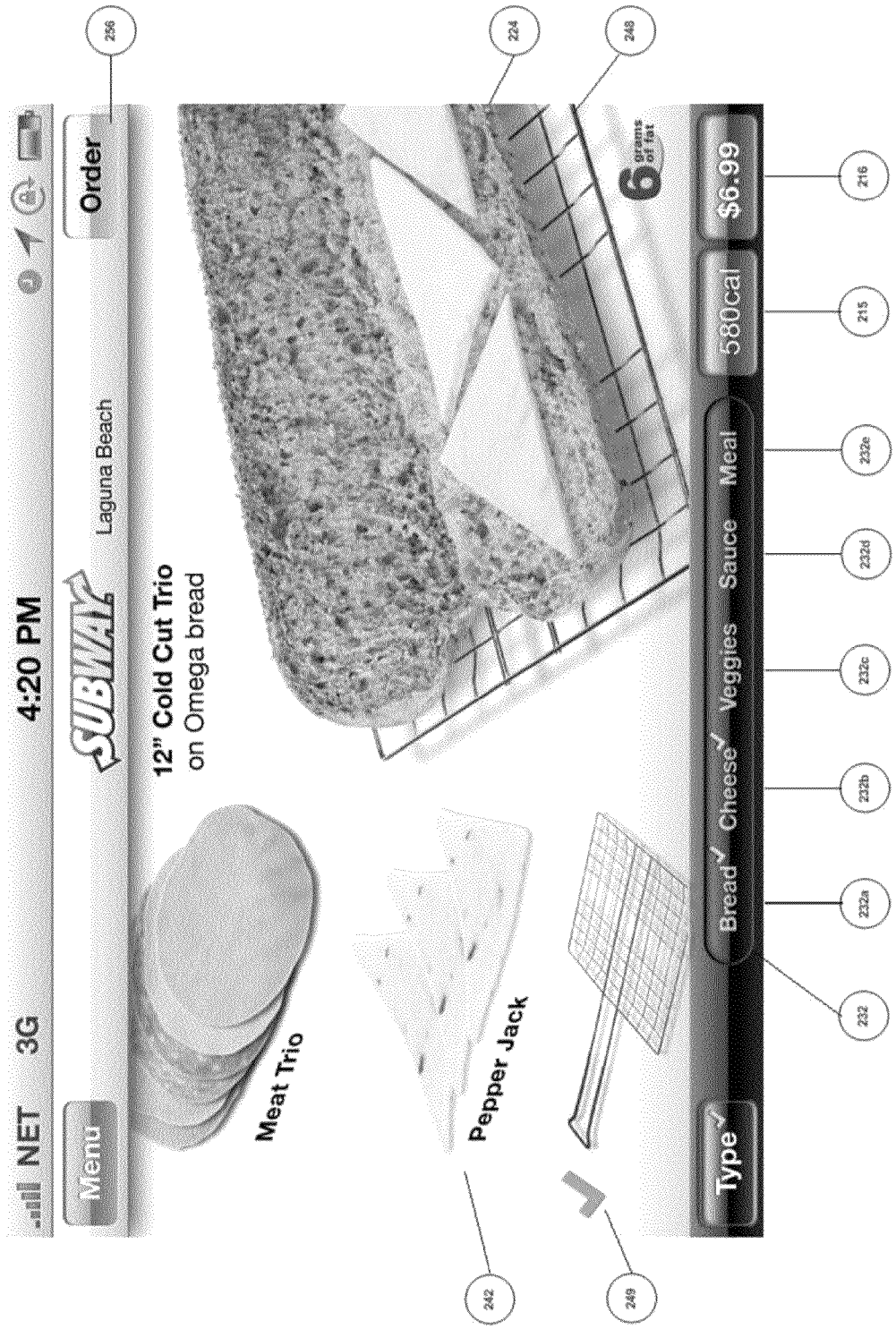
Figure 7J:
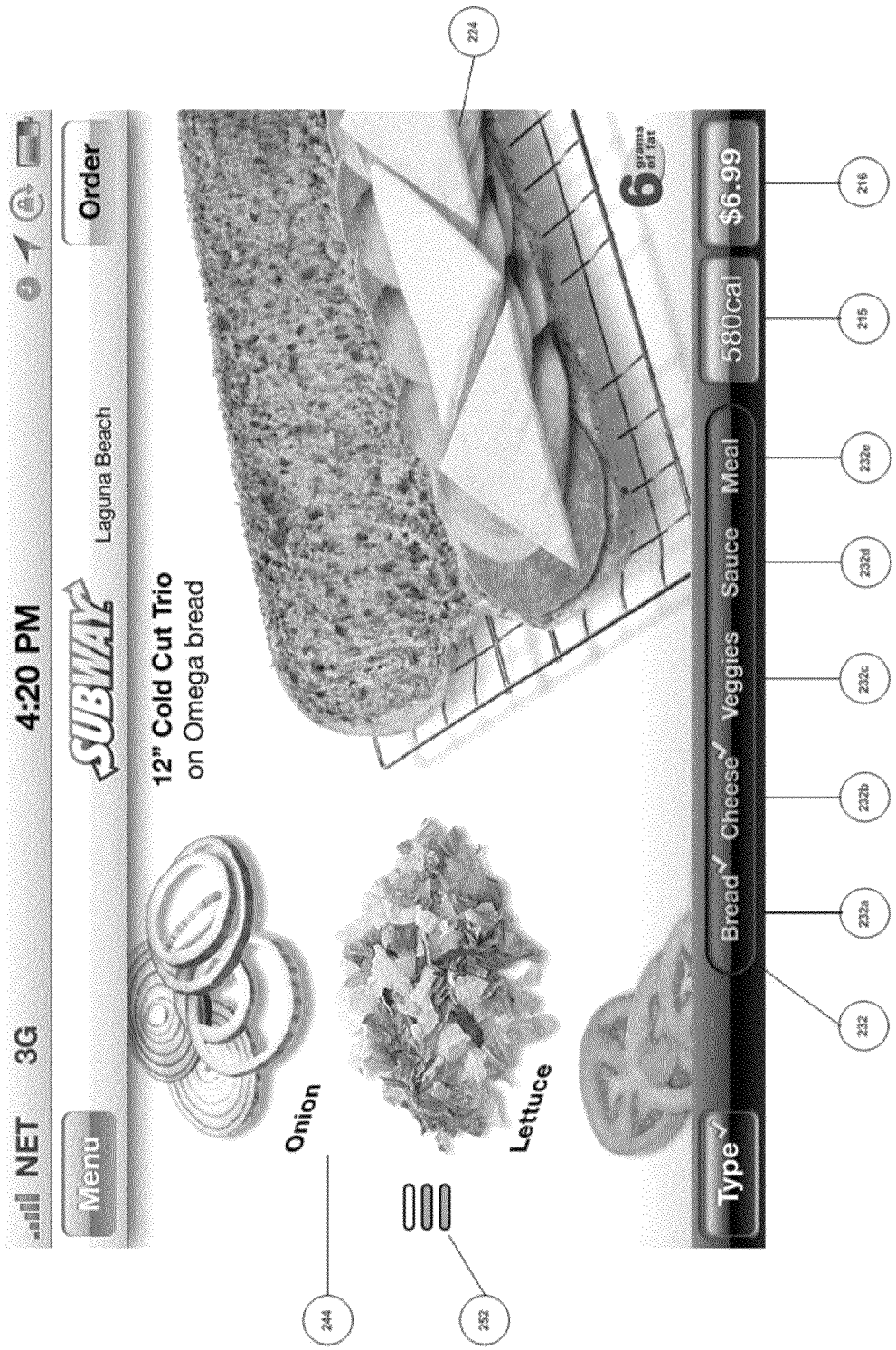
Figure 7K:
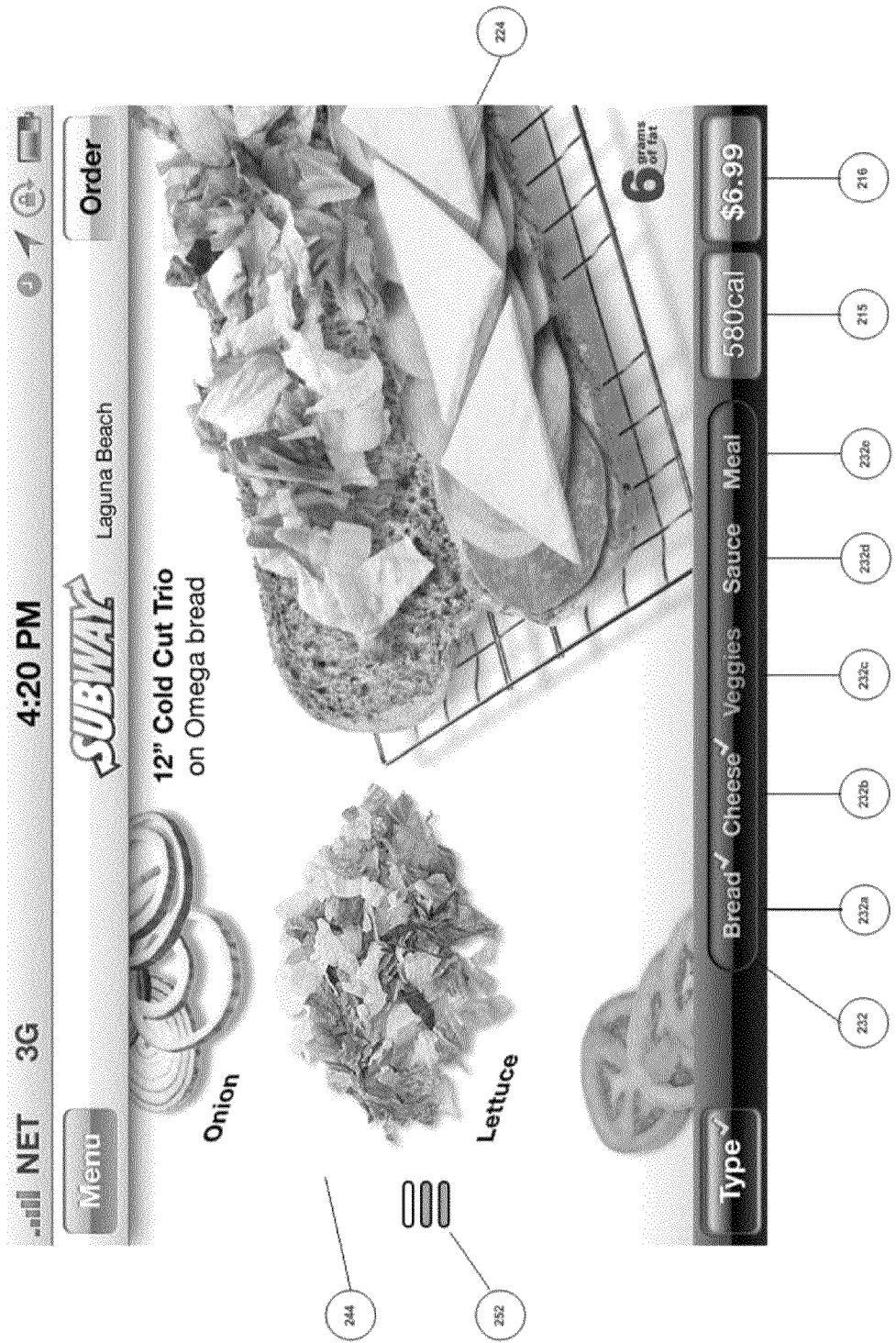
Figure 7L:
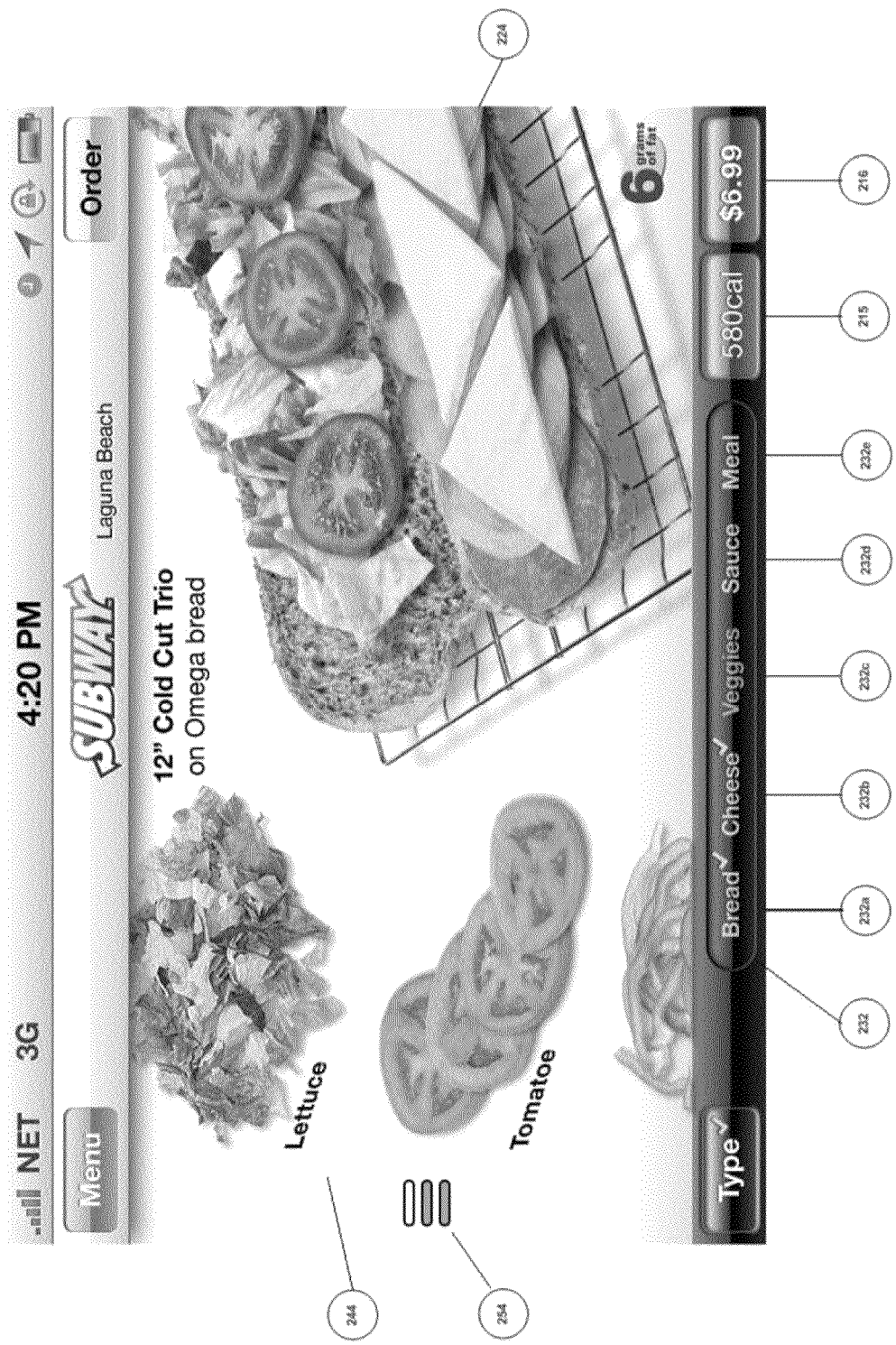
Figure 7M:
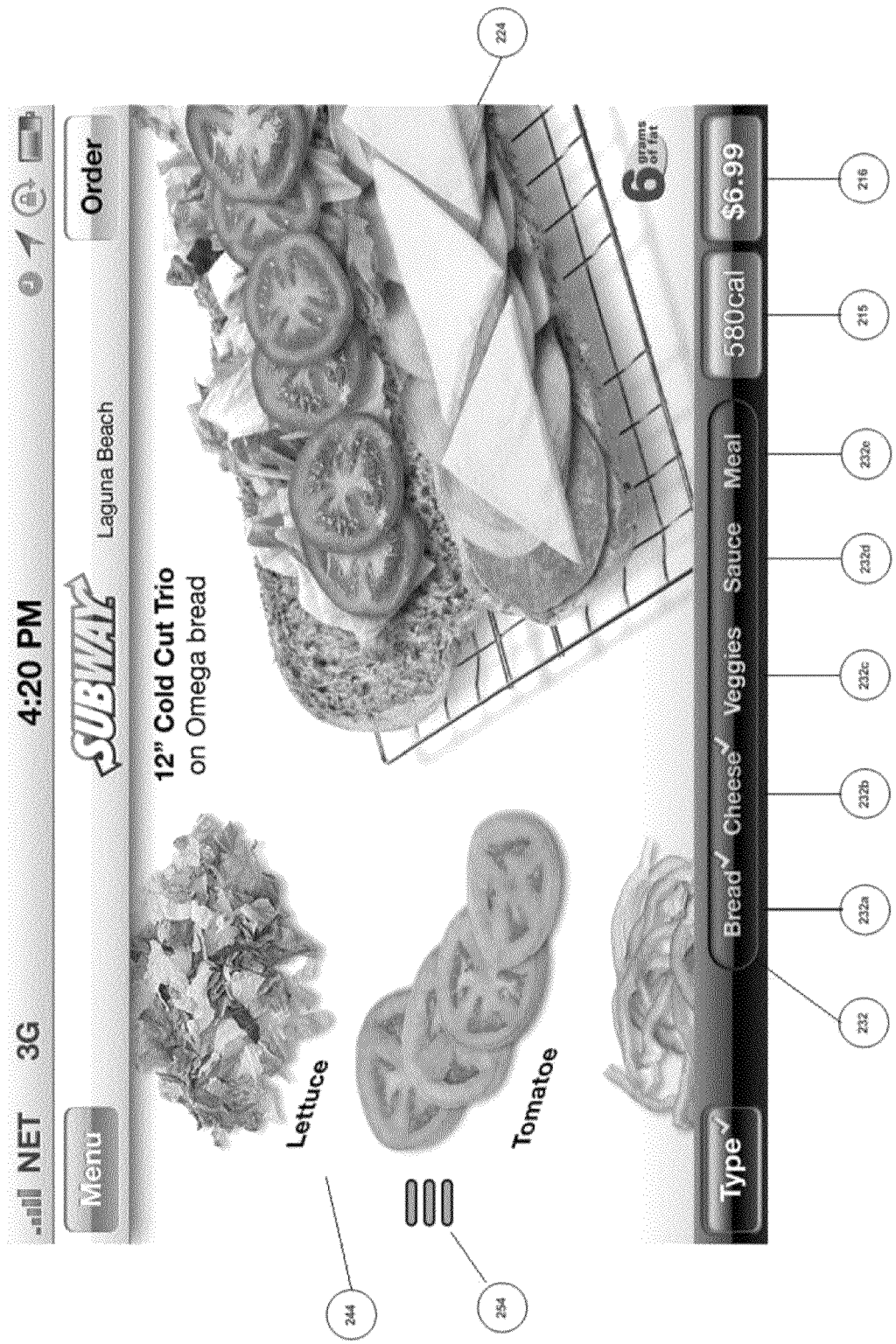
Figure 7N:
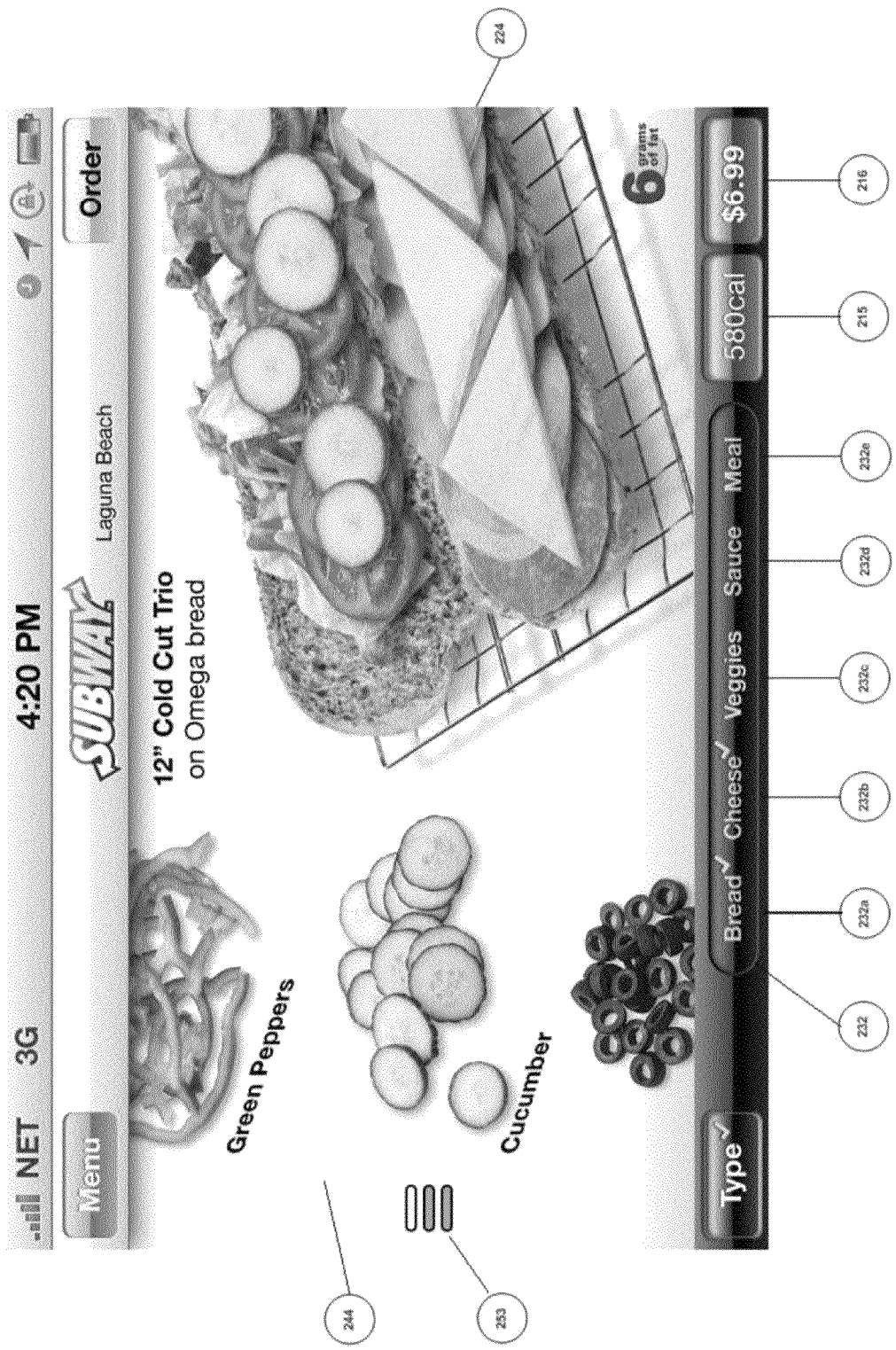
Figure 70:
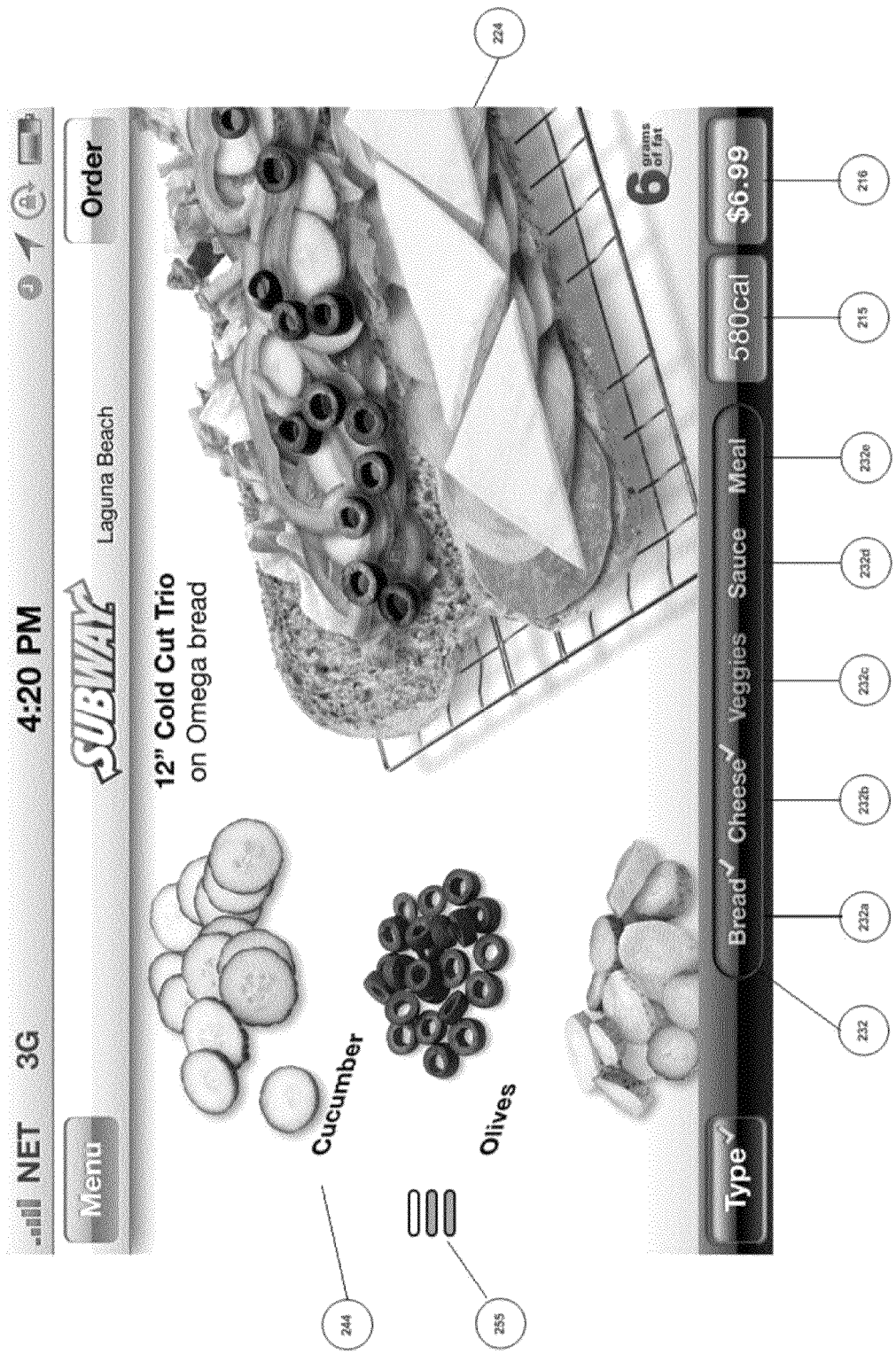
Figure 7P:
Figure 7Q:
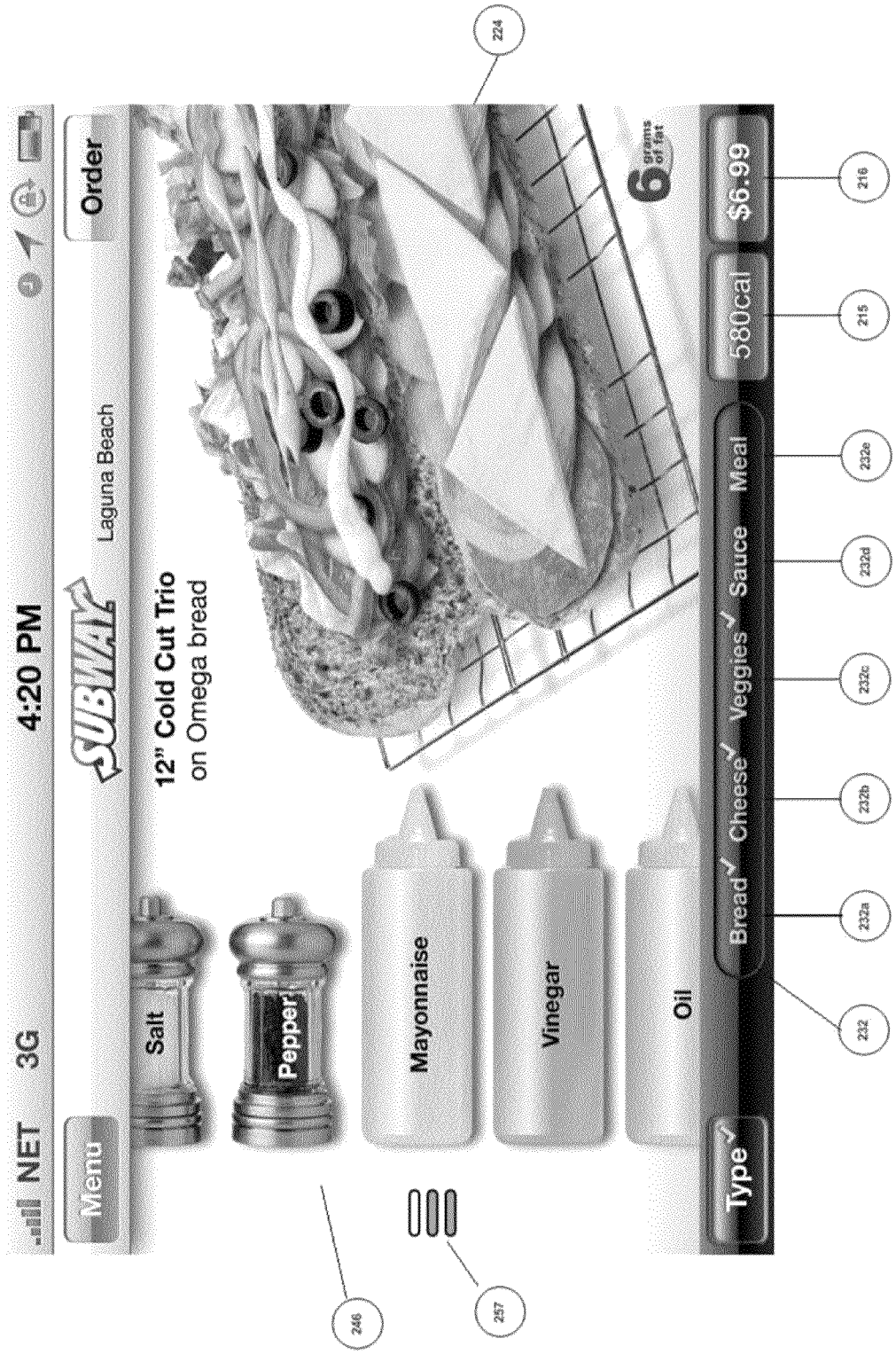

Turning to FIGS. 4 and 7A-7Q, an exemplary method will now be described for selecting and building a desired prepared food product, e.g., a sandwich from a selected Subway® restaurant, for inclusion in a customer's order.

Although the illustrated method shows an individual sandwich being ordered, it will be appreciated that the process may be repeated as many times as desired to add additional food products to an individual customer order.

In addition, FIGS. 7A-7Q show images that may displayed on a display in a landscape orientation. Alternatively, FIGS. 10A-10L show similar images that may be displayed in a portrait orientation.

As described above, an initial menu 131 of available product categories may be presented by the processor 22 on the display 28a, e.g., such as those shown in FIGS. 6A and 6B. The customer may select a desired product category to add to an order, e.g., from the initial menu 131. For example, the customer may select "subs" 131a from the initial menu 131 to select a sandwich.

In response to the selection, at step 210 in FIG. 4, the processor 22 may access the memory 24 and/or 25 to identify available sandwiches, and may present a menu 212 of available sandwiches on the display 28a. As shown in FIG. 7A, the menu 212 may be presented in a vertical orientation that may scroll vertically to allow the customer to peruse the available products. Alternatively, the menu 212 may be provided in a side-by-side orientation (not shown), which may be scrolled horizontally (both alternatives may be used for any of the menus and/or images shown and described herein, as will be appreciated by those of ordinary skill in the art).

Figure 8A:
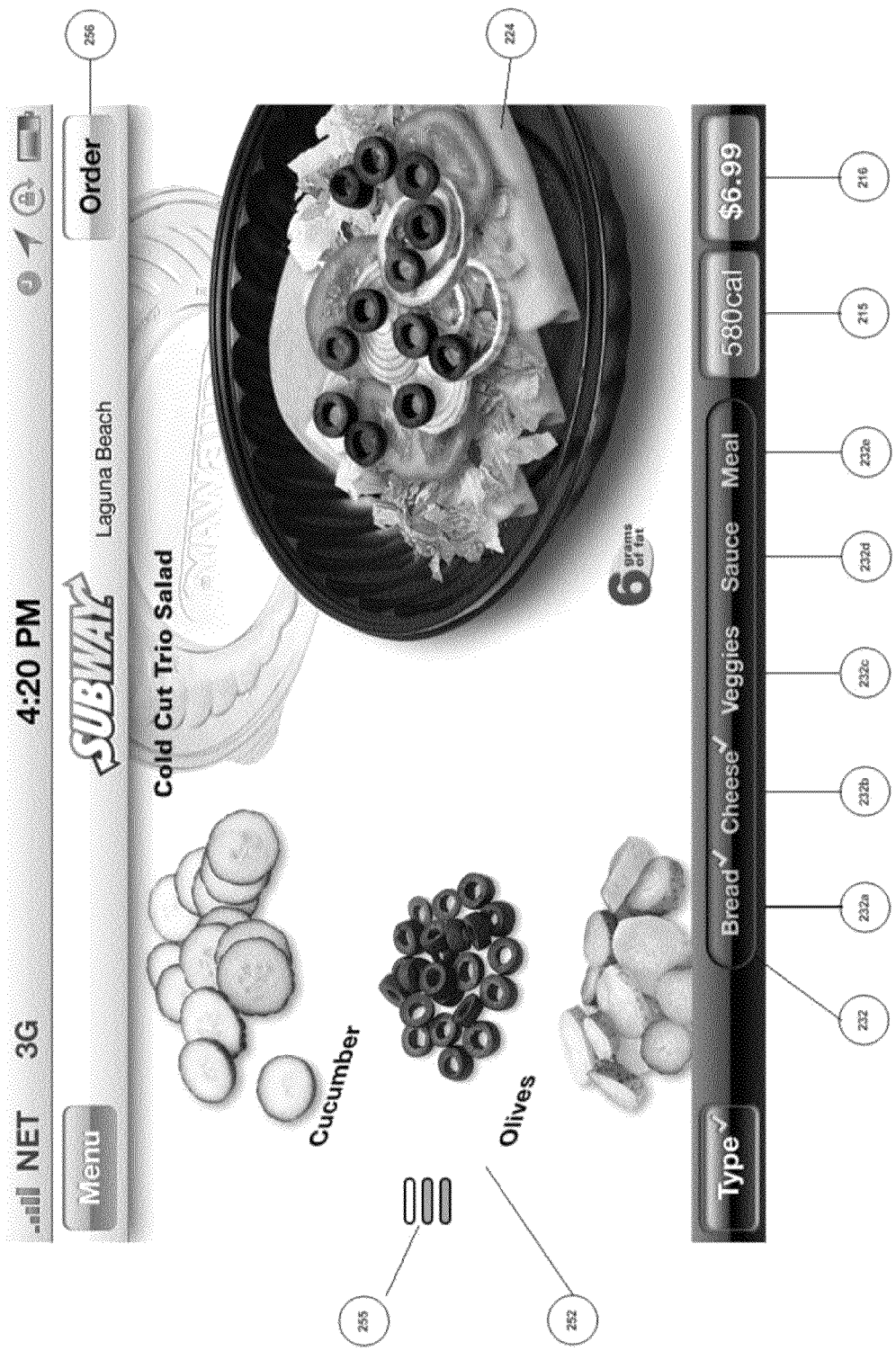
FIGS. 8A and 8B are exemplary screen shots (landscape orientation) that may be displayed when an electronic device performs a method for selecting a prepared food product, i.e., a salad, for purchase, e.g., using the method shown in FIG. 4.
Figure 8B:
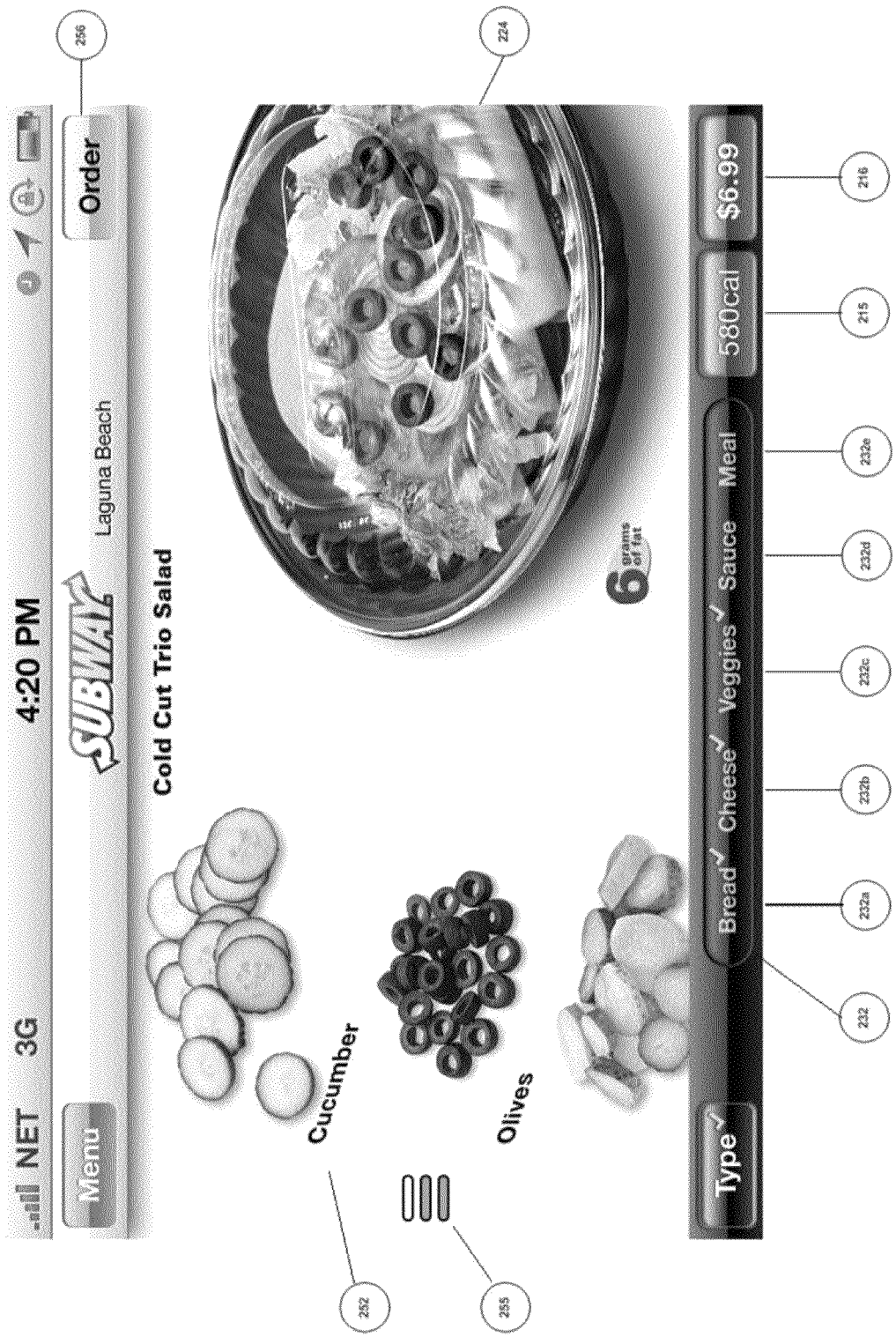
Figure 8C:
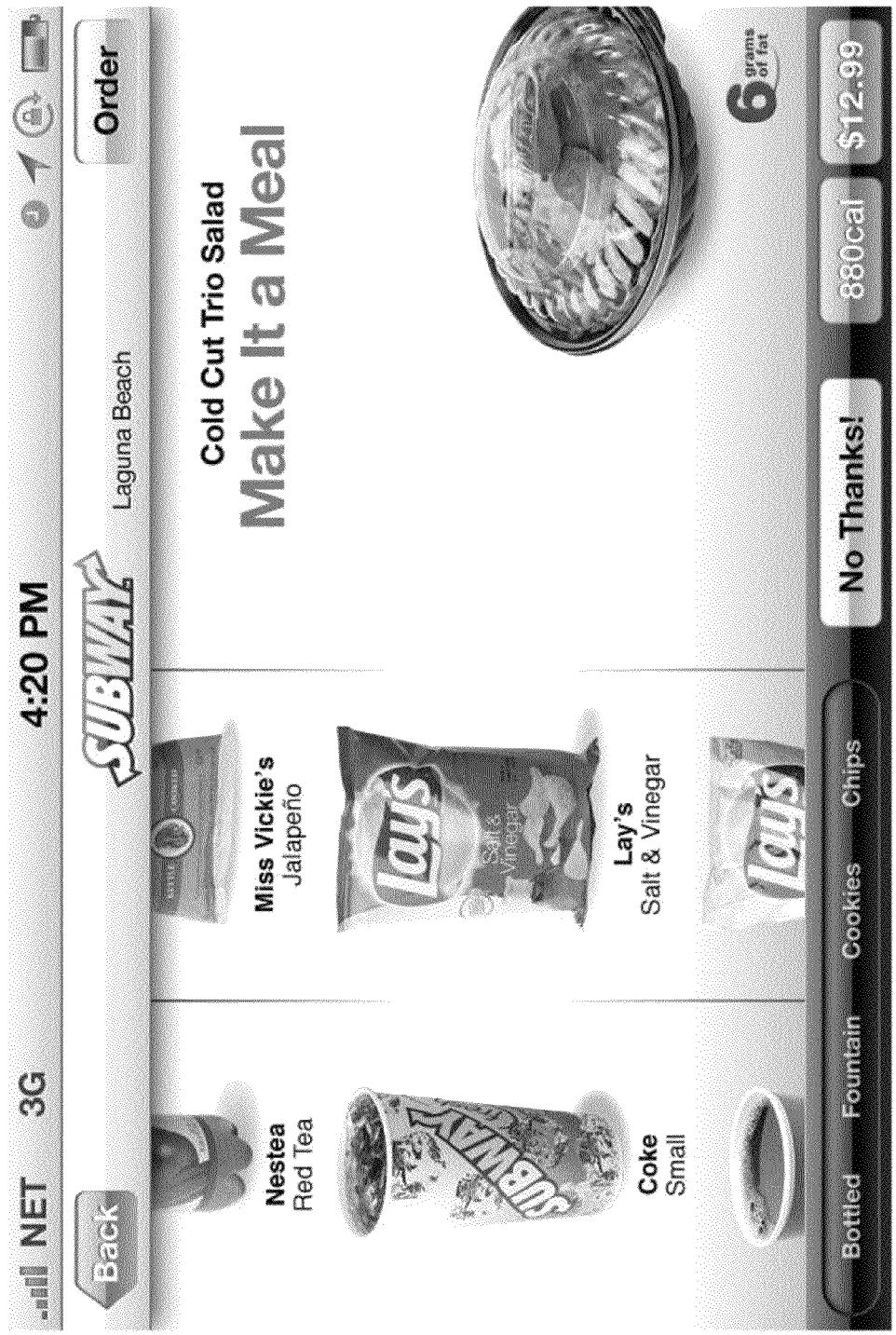
FIGS. 8C and 8D are exemplary screen shots (landscape orientation) that may be displayed when selection of the salad in FIGS. 8A and 8B is complete, e.g., to display vertically scrolling submenus of additional food products that may be purchased with the selected salad.
Figure 8D:
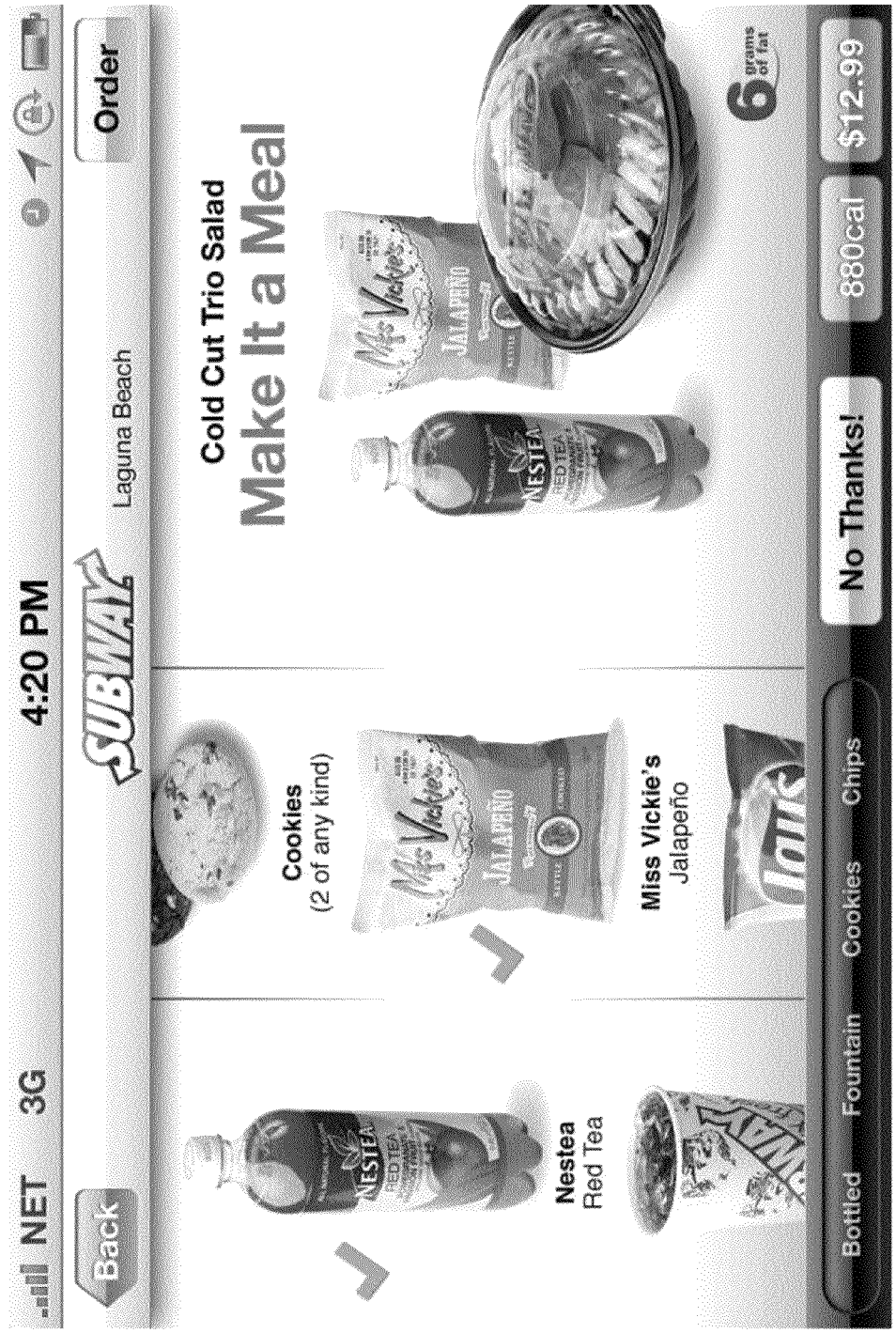
Figure 8E:
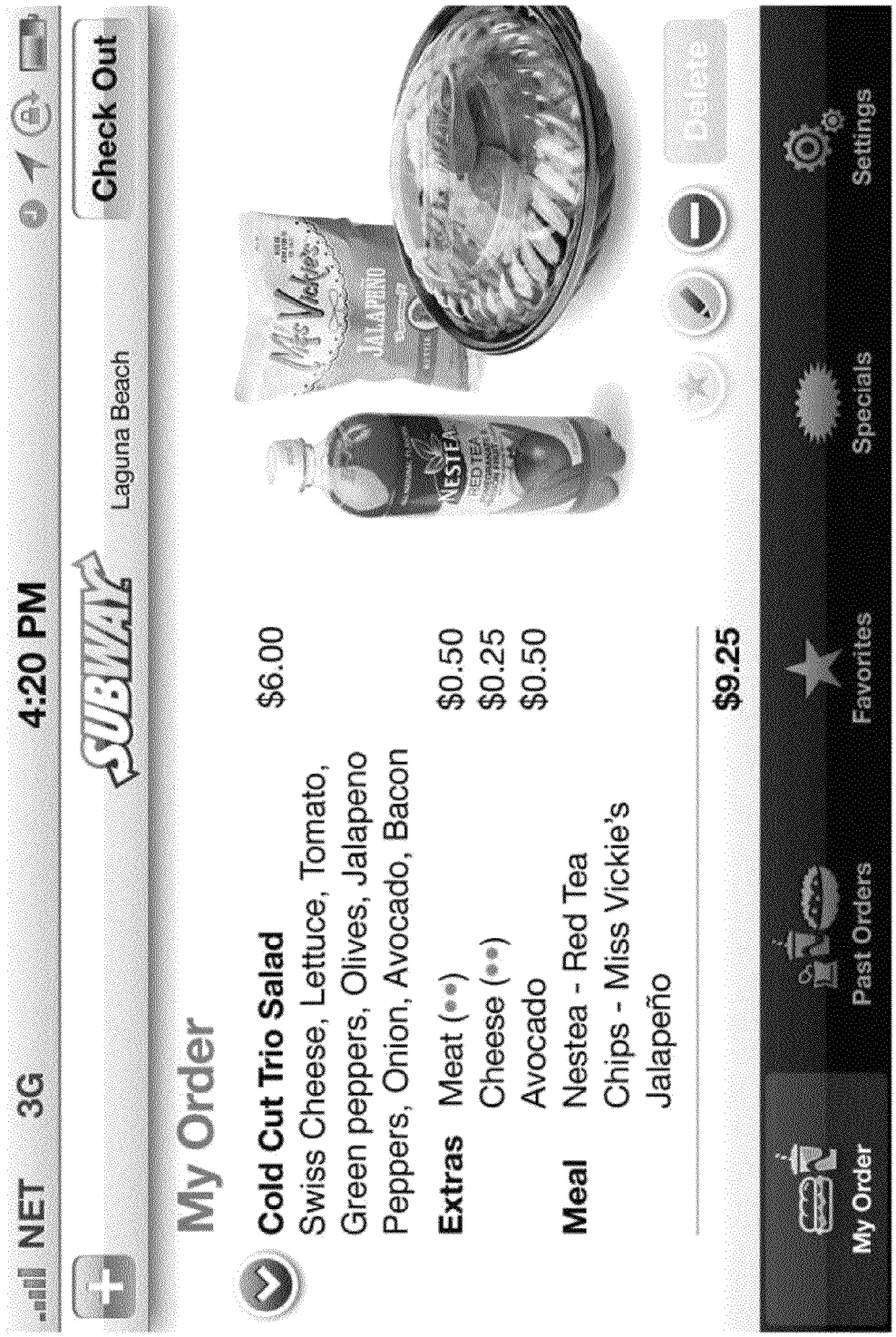
FIGS. 8E and 8F are exemplary screen shots (landscape orientation) that may be displayed when the order of FIGS. 8A-8D is completed, showing a price breakdown and a caloric breakdown, respectively.
Figure 8F:
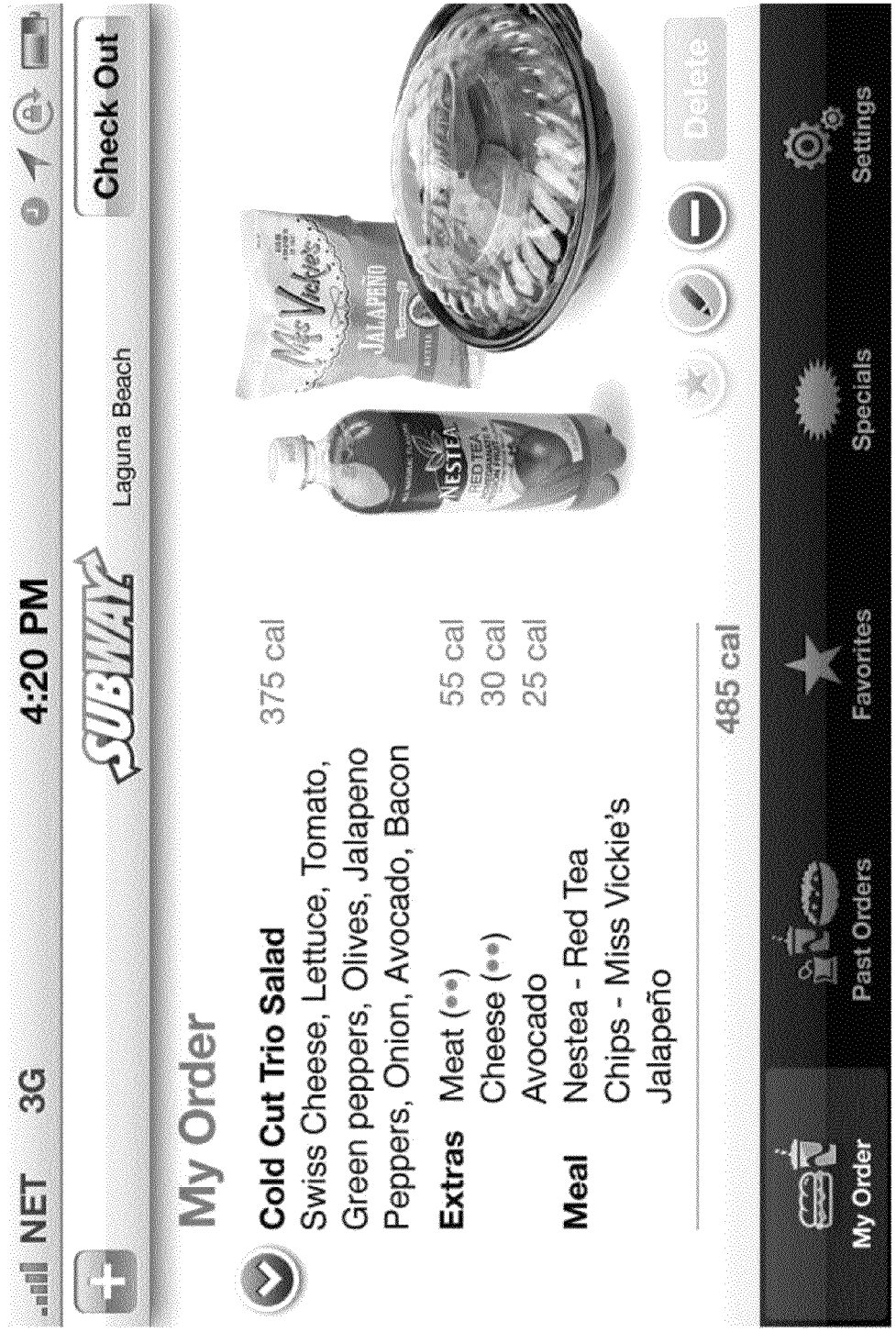

Although only a "tuna" sub and a "melt meatball" sub are shown in FIG. 7A, many different sandwiches may be presented and selected from the menu 212, e.g., by scrolling through the menu 212. It will also be appreciated that many different food products may be provided in addition to or instead of "subs" or sandwiches and that such products may be selected and ordered using similar methods to those described herein. For example, other food products that include a bread item, e.g., burgers, pizzas, tacos, and the like, may be selected and "built to order" in a similar manner to those described herein. In addition or alternatively, other food products may be selected and built to order, e.g., that are provided in a receptacle. For example, as shown in FIGS. 8A and 8B, a salad may be selected and built to order, e.g., after selecting "salad" 131b from the initial menu 131 in FIG. 6A, as described further below.

Along with images of the available subs (or other food products), additional information may be presented to the customer on the display 28a. For example, as shown in FIG. 7A, the menu 212 may include prices, e.g., of different sizes and/or configurations, of the food products available. As shown, a first icon ">" 213a is shown that identifies a 6" sub for $4.99, a second icon 213b is shown that identifies a 12" sub for $6.99, and a third icon 213c is shown that identifies a salad configuration for $6.99. Optionally, an information icon "i" 214 may be associated with each food product on the menu 212, which may be selected by the customer to obtain additional information. For example, if the customer selects icon 213 in FIG. 7A, the processor 22 may access the long-term and/or temporary database in the memory 24 and/or 25, and present another image on the display 28a, including nutritional and/or other information regarding the selected food product, such as that shown in FIG. 7B.

Turning to step 220 in FIG. 4, one of the subs (or other prepared food products) may be selected, e.g., from the menu 212 shown in FIG. 7A, using the input device 28a. In response, at step 220 in FIG. 4, the processor 22 may access the database(s) in memory 24 and/or 25 and present a list or submenu 222 of bread items available on the display 28a, e.g., for making the selected prepared food product. FIGS. 7C and 10A show exemplary images of a first submenu 222 including visual representations of each of the available bread items. The customer may scroll through the available bread items, as desired, similar to the other menus.

Turning to step 240 in FIG. 4, one of the bread items may be selected using the input device 28b, whereupon the processor 22 may access the database(s) and present a visual representation of the selected bread item 224 on the display 28a, e.g., as shown in FIGS. 7D and 10B. Optionally, the processor 22 may access and present an animation of the selected bread item, e.g., being directed to an open orientation for receiving ingredients. For example, as represented by the images in FIGS. 7D-7F and 10B-10D, the animation may show an enlarged image 224 of the selected bread item, e.g., adjacent the menu 222 of available bread items, in an initial closed configuration (FIGS. 7D and 10B), show the selected bread item being cut with a knife in the closed configuration (FIGS. 7E and 10C), and then opened to the open configuration (FIGS. 7F and 10D). Thus, the animation may simulate preparation of the selected bread item, e.g., as if the customer were in a Subway® restaurant and ordering the sub in person.

One or more ingredients may then be selected for the selected food product using the input device 28b. For example, in step 250 of FIG. 4, the processor 22 may access the database(s) and present one or more submenus 242-246 of available ingredients on the display 28a, as shown in FIGS. 7G-7Q and 10E-10L, e.g., adjacent the enlarged image 224 of the selected bread item in the open configuration (which will become the image of the prepared food product being built). Similar to other menus described herein, the submenus 242-246 may be scrolled, e.g., to search and select desired ingredients.

Optionally, a series of submenus may be presented sequentially on the display 28a, may be selected using the shortcut menu 232 (as described further below), or a single long sub-menu may be presented (not shown), and ingredients may be selected, as shown in step 260 of FIG. 4. For example, a second submenu 242 labeled "cheese" may be presented that includes cheese, meat, and/or other initial options, as shown in FIGS. 7G, 7I, and 10E-10G. Thereafter, a third submenu 244 labeled "veggies" of vegetables and/or other toppings may be presented, as shown in FIGS. 7J-7P and 10H-10K, and/or a fourth submenu 246 labeled "sauce" of available sauces, condiments, and the like may be presented, as shown in FIGS. 7Q and 10L.

For example, after selecting a desired bread item, the processor 22 may present the second submenu 242 adjacent the enlarged image 224 of the selected bread item, as shown in FIG. 7G. The second submenu 242 may present available cheese items, as well as other options, such as extra meat, and/or special preparation options, such as toasting the sandwich. As shown in FIG. 7G, the meat of the selected sandwich may be shown in the submenu 242, along with a toggle icon 243, which may show how much meat has been selected. For example, initially only one button on the toggle icon 243 may be highlighted, representing a standard portion of meat, and a first layer of meat may be added to the enlarged image of the selected bread item (not shown). If the customer selects or clicks on the meat image or the icon 243, "extra meat" may be selected to add another portion of meat, e.g., which may result in highlighting the second button of the icon 243 (not shown). Optionally, a second layer of meat may be added to the enlarged image 224, e.g., at least partially over the first layer, to provide a visual representation that an extra portion of meat has been added to the sandwich, in addition to or instead of the icon 243.

Turning to FIG. 7I, an exemplary image is shown that may be presented on the display 28a, e.g., when cheese has been selected from the second submenu 242. As shown, the selected cheese may be added to the enlarged image 224 of the selected bread item. Optionally, a toggle icon 251 (shown in FIG. 10F) may be associated with each cheese item displayed, e.g., if the customer wants to select extra cheese. In addition, FIGS. 7I and 10G show a toasting rack 248 under the selected bread item in the enlarged image 224, e.g., to provide a visual representation that a toasted sandwich has been selected from the submenu 242. FIGS. 7I and 10G also show a "check" icon 249 adjacent the toasting rack, which may be activated when the customer selects toasting to provide a visual confirmation in addition to or instead of the toasting rack added to the enlarged image 224. Optionally, the processor 22 may access an animation file in the database(s), which may be presented on the display 28a when toasting (or other ingredient or procedure) is selected by the customer. For example, the animation may show the toasting rack 248 being slid under the selected bread item in the enlarged image 224, e.g., without moving the selected bread item and selected ingredients, or by lifting them, sliding the toasting rack 248 under them, and lowering them onto the toasting rack 248.

Figure 10F:
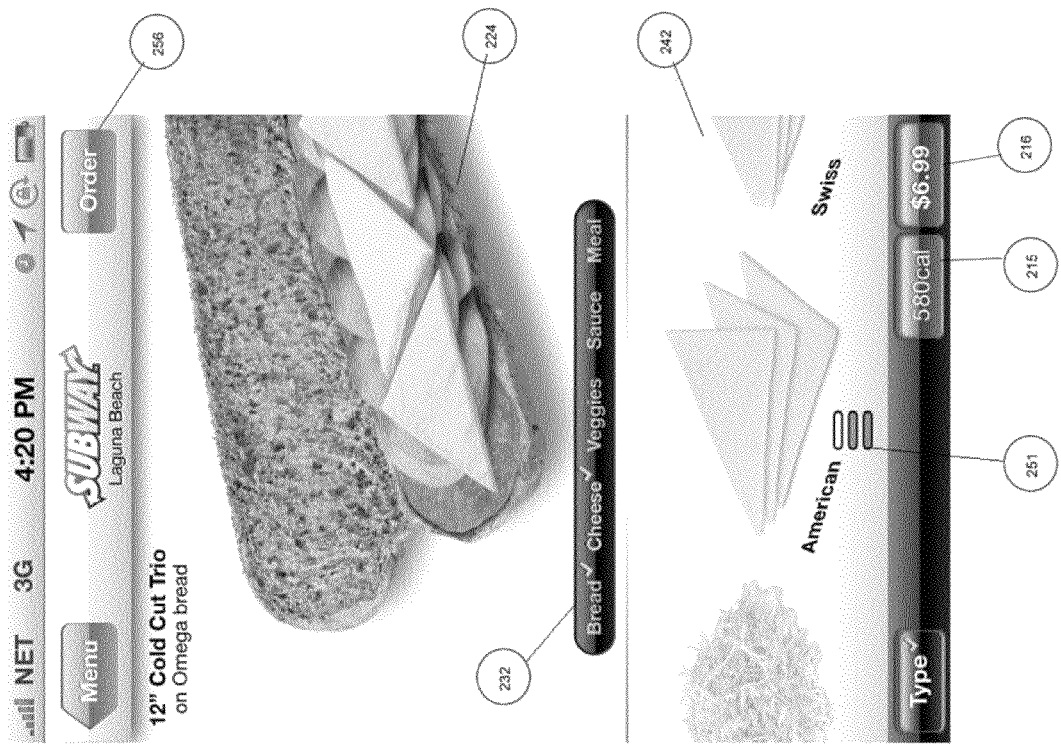
Figure 10E:
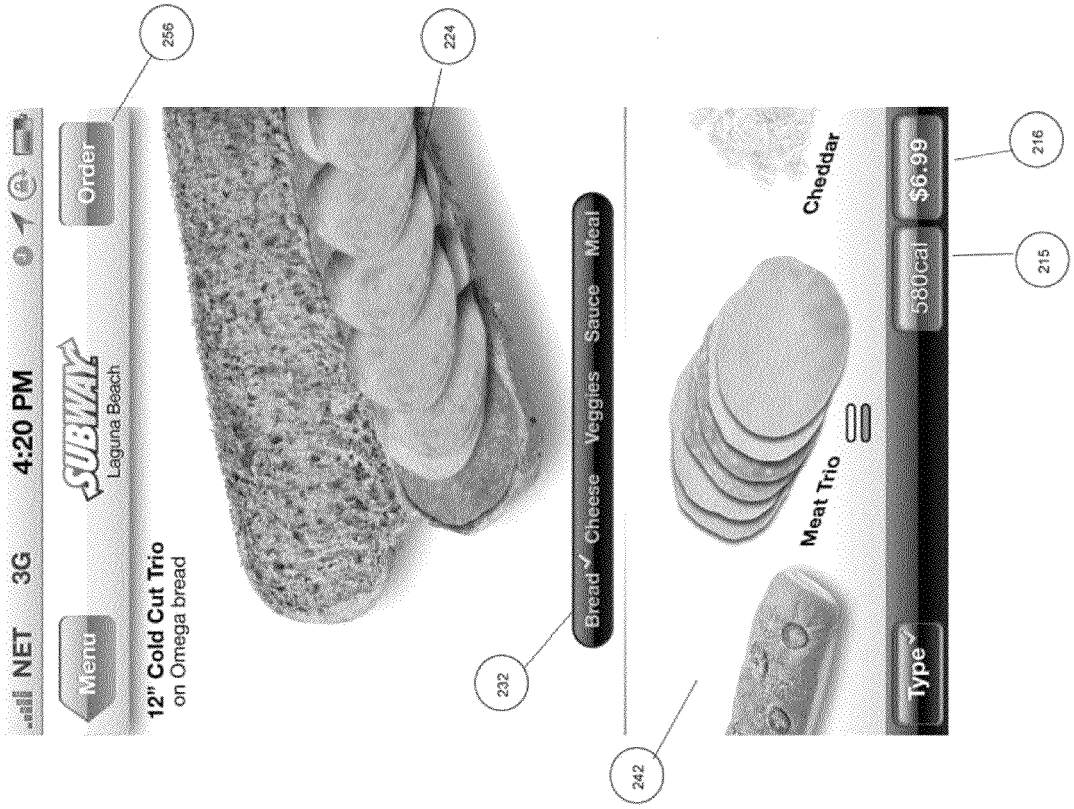

Turning to FIGS. 7J, 10E, and 10F, an exemplary image is shown that may be presented on the display 28a, including the enlarged image 224 showing cheese and meat superimposed on the selected bread item. In one embodiment, the database(s) and/or memory 24 and/or 25 may include separate image files of each available ingredient, in addition to separate enlarged image files for the available bread items. For example, as ingredients are added to the sandwich being selected, the processor 22 may access the database(s) and load the appropriate image files such that the corresponding image(s) are superimposed onto the enlarged image 224 of the selected bread item. In this manner, the image of the sandwich being selected may be customized to reflect the customer's choices by superimposing the images from the image files on top of one another.

In an exemplary embodiment, the processor 22 may superimpose the images in a predetermined layering scheme, e.g., that may enhance identification of the selected ingredients when superimposed onto one another over the image of the selected bread item. For example, the image of selected cheese may be superimposed over the selected meat item, which may, in turn, be superimposed over the selected bread item, e.g., as shown in FIGS. 7J, 10E, and 10F. As shown in FIGS. 7K-7Q and 10H-10L, subsequent ingredients may be superimposed over these images, e.g., in a manner that allows the different layers and/or ingredients to be identified by the customer. One of the advantages of providing separate image files that may be superimposed on one another is that the number and size of image files included in the database(s) of the application may be reduced, e.g., compared to having image files for ever possible combination of sandwiches and ingredients available for purchase.

Turning to FIGS. 7J-7P (and similarly FIGS. 10G-10K), the third submenu 244 labeled "veggies" is shown, e.g., including vegetables and other ingredients that may be added to the sandwich. As vegetable ingredients are added, a corresponding image of the selected vegetable may be superimposed on the enlarged image 224 adjacent the submenu 244. For example, FIGS. 7J and 7K show lettuce being added, FIGS. 7L and 7M show tomatoes being added, FIG. 7N shows cucumbers being added, and FIGS. 7O and 7P show olives being added.

Similar to the toggle icon described above for extra meat, each of the vegetable or other ingredients may include a toggle icon 252-255 (or other button or input) adjacent an image of the vegetable in the submenu 244. For example, when a desired vegetable is selected, the default may be to provide an average portion of that vegetable, which may be represented by an image of the selected vegetable on the enlarged image of the sandwich adjacent the submenu 244. Optionally, the customer may select the vegetable again (or its toggle icon), to change the amount of the vegetable added to the sandwich. For example, FIG. 7K shows an average portion of tomato added to the sandwich, as represented by two buttons being highlighted in toggle icon 254, while FIG. 7M shows extra tomato selected, as represented by three buttons being highlighted in the icon 254. Also as shown, a second image file of tomatoes has been superimposed or otherwise added to the enlarged image 224 in FIG. 7M (or a new image file of tomatoes may replace the previous standard image of tomatoes), providing a visual representation that extra tomatoes have been selected.

If the vegetable is selected again, the vegetable may be removed (which may be represented by none of the buttons being highlighted in the associated toggle icon). If selected again, a less than average portion of the vegetable may be selected. For example, FIG. 7O shows average olives, as represented by two buttons being highlighted in toggle icon 255, and FIG. 7P shows "easy" on the olives, as represented by one button being highlighted in the icon 255, and fewer olives being included in the enlarged image 224.

After selecting desired vegetables, the processor 22 may present the fourth submenu 246 on the display, e.g., as shown in FIGS. 7Q and 10L, which may allow the customer to select sauces, condiments, and the like to add. For example, the submenu 246 may include options, such as salt and pepper, mustard and mayonnaise, oil and vinegar, and the like. Optionally, similar to the other submenus, toggle icons 257 may be presented to allow the customer to select extra, easy, or none of any of the ingredients, as shown adjacent to Mayonnaise in FIG. 7Q.

To move from one submenu to the next, the customer may select the "Order" icon or button 256, as shown in FIGS. 7B-7Q. For example, when the Order icon 256 is selected using the input device 28b, the processor 22 may replace the previous submenu with the next sequential submenu. Alternatively, the Order icon 256 may be selected to indicate that the selected food product is complete and ready to be added to an order, as described further below.

Optionally, as shown in FIGS. 7C-7Q, the processor 22 may include a shortcut menu 232, e.g., along the bottom of the display 28a while the various submenus 222, 242-246 are displayed, which may facilitate a customer moving between the various menus. If desired, the shortcut menu 232 (or other menus added to images on the display) may fade or otherwise be removed, e.g., as shown in FIGS. 10A and 10B. For example, in the portrait orientation, it may be desirable to remove the shortcut menu 232 when the user is inactive, e.g., to maximize the space on the display 28a available for the enlarged image 224 and/or scrolling submenus 222, 242-246. If the user does not provide any input for a predetermined amount of time, e.g., one to three (1-3) seconds, the shortcut menu 232 may be removed. Once the user selects an item or otherwise inputs any information, the shortcut menu 232 may be displayed again.

For example, to use the shortcut menu 232, a first button 232a may return the customer to the bread submenu 222, as shown in FIG. 7C, e.g., if the customer wants to change the selected bread item except with any ingredients appearing in the enlarged image 224 remaining (rather than showing the selected bread item empty). If the customer selects a different bread item from the submenu 222, any ingredients selected and included in the enlarged image 224 may remain while the selected bread item is replaced. For example, in one embodiment, the processor 22 may access and present an animation showing the images of the selected ingredients being lifted off the selected bread item, moving the image of the previously selected bread item out from under the ingredients, moving an image of the newly selected bread item under the selected ingredients (already in the open configuration, or alternatively in the closed configuration and then cut and opened), and lowering the images of the selected ingredients back onto the newly selected bread item. Thereafter, the application may return to the normal sequence of submenus, or the customer may select one of the shortcut menus to select ingredients, as desired.

Similarly, a second button 232b on the shortcut menu 232 may return the customer to the cheese submenu 242, shown in FIGS. 7G and 7I, a third button 232c may return the customer to the veggies submenu 244, and a fourth button 232d may return the customer to the sauce submenu 246. In this option, the "Order" icon 256 may be used to indicate the selected food product is complete or that the current submenu selections are complete, as desired by the vendor(s) distributing the application.

In addition, the shortcut menu 232 (or other icons presented on the display 28a during the building process) may include one or more displays of information related to the selected prepared food product being built. For example, as shown in FIGS. 7A-7I (and FIGS. 10A-10L), button or icon 215 may include the total calories of the sandwich being selected and button or icon 216 may include a current total price for the sandwich. In an exemplary embodiment, as ingredients are added to or removed from the sandwich, the processor 22 may access the database(s) and add or subtract any calorie or price changes based on the selected items. For example, some vegetables and sauces may increase the calorie total but not change the price, while some ingredients (e.g., extra meat or cheese, bacon, avocado, not shown) may increase the calorie total and price total. Thus, the icons 215 and 216 may provide a running total to the customer of the calories and price.

Optionally, if the customer selects the icons 215 or 216, they may be presented with a breakdown of the numbers and/or other information related to the selected ingredients, e.g., subtotals of calories and/or prices. For example, FIG. 7H shows an exemplary image of nutritional information for a six inch "cold cut trio" sub, itemizing ingredients added to the sandwich, and the calories associated with each of the base food product and added ingredients.

Turning to step 270 in FIG. 4, once the selected prepared food product is complete, the customer may provide an indication via the input device 28b. For example, the customer may select the "Order" button or icon 256 included in the images presented on the display 28a, e.g., as shown in FIGS. 7C-7Q and 10A-10L. The processor 22 may then add the completed food product to the customer's order.

In addition or alternatively, the processor 22 may present a visual representation of the completed food product. In one embodiment, the processor 22 may access the database(s) and present an animation showing the completed food product being packaged. For example, the animation may show the selected bread item being closed around the selected ingredients and/or a wrapper or other package may be applied around the food product, e.g., similar to the enlarged image 224 in FIGS. 7R and 10M.

Optionally, the processor 22 may present other options to the customer on the display 28a. For example, the customer may be asked whether they want to save the selected food product to their favorites, as described above. In addition or alternatively, the customer may be asked whether they want to select another prepared food product. If the customer selects that they want to select another food product, the method of FIG. 4 and similar images and menus may be presented to the customer, as described above.

Figure 7R:
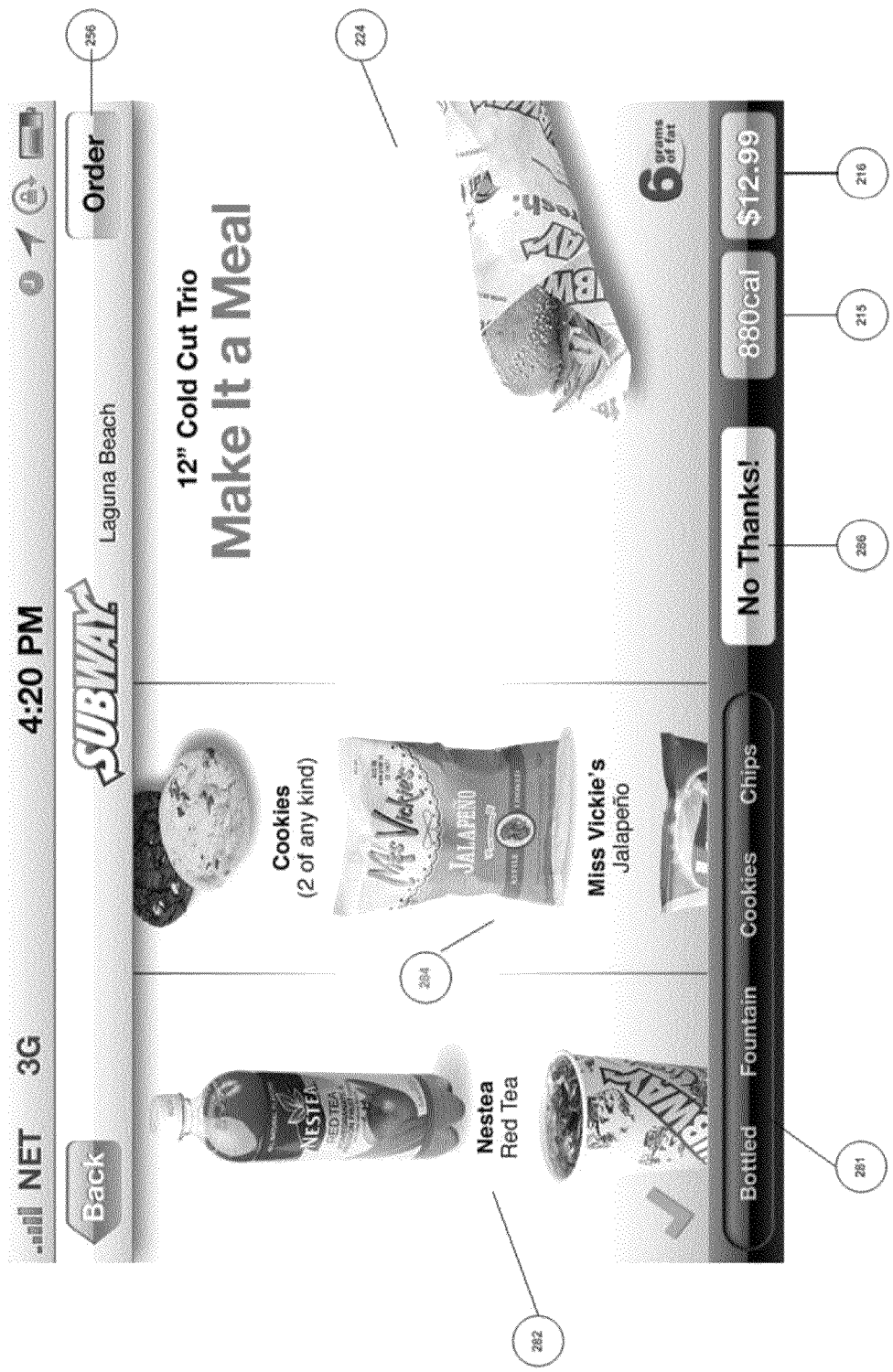

In addition or alternatively, the processor 22 may prompt the customer to inquire whether the customer would like to order a combo and/or other food items to include in their order. For example, as shown in FIGS. 7R and 10M, the enlarged image 224 of the packaged food product may be presented along with one or more submenus 282, 284, e.g., of food items that may be added to create a "combo" or "meal." As shown, submenu 282 may include a variety of beverages that may be available, while submenu 284 may include a variety of sides, e.g., cookies, chips, soups, and the like that may be added to the order.

Figure 7S:
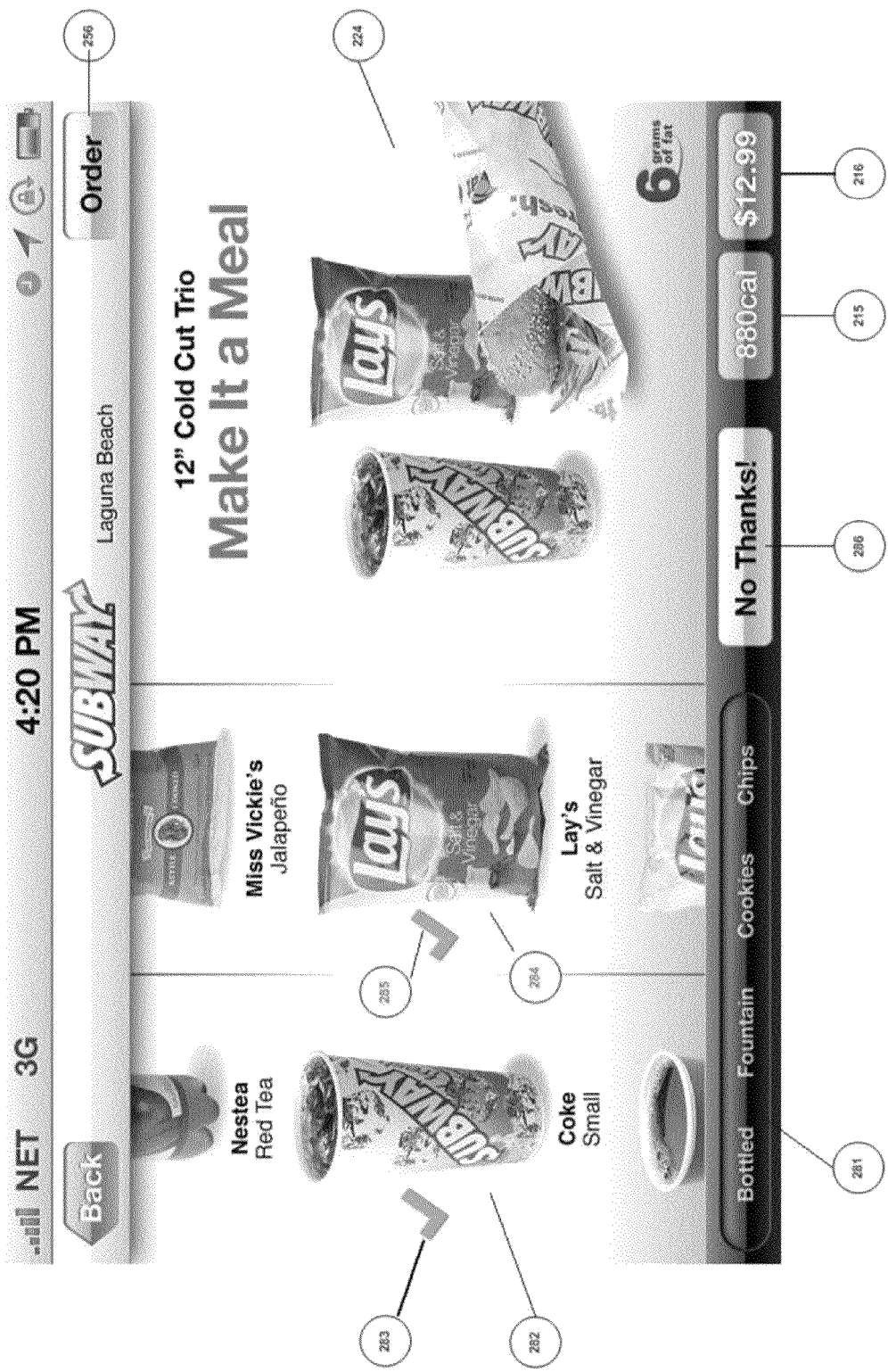

As shown in FIGS. 7S and 10N, a small Coke beverage has been selected from the beverage submenu 282 and a bag of Lay's chips has been selected from the sides submenu 284, as indicated by the checks 283, 285 shown adjacent the submenus 282, 284. In addition, when the customer selects a desired beverage and side, the processor 22 may access the database(s) and add images of the items to the enlarged image 224 adjacent the submenus 224, thereby providing a visual representation to the customer of the selected order. It will be noted that the processor 22 may update the information in the calorie and price icons 215, 216 to reflect the addition of the beverage and side, as shown in FIGS. 7S and 10N. FIGS. 11A and 11B show similar images and submenus 282, 284, except that the selected food product is a salad rather than a sandwich.

If satisfied with the items selected, the customer may select the "Order" icon 256, whereupon the selected items will be added to the current order. Alternatively, if the customer does not want a beverage or side, the customer may select a "No Thanks!" icon or button 286, e.g., displayed on the shortcut menu or bar 281 along the bottom of the display 28a.

Figure 7T:
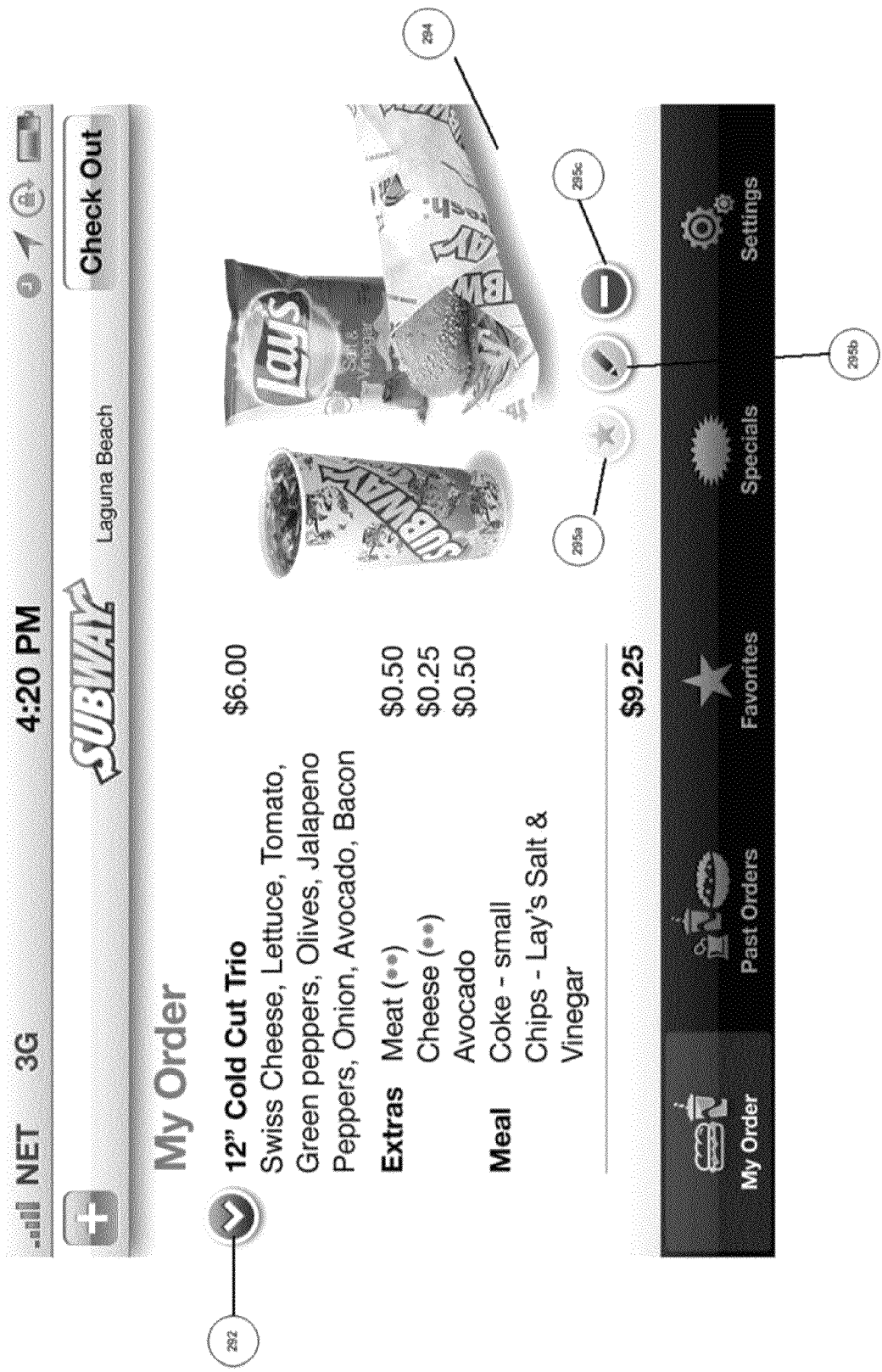
Figure 7U:
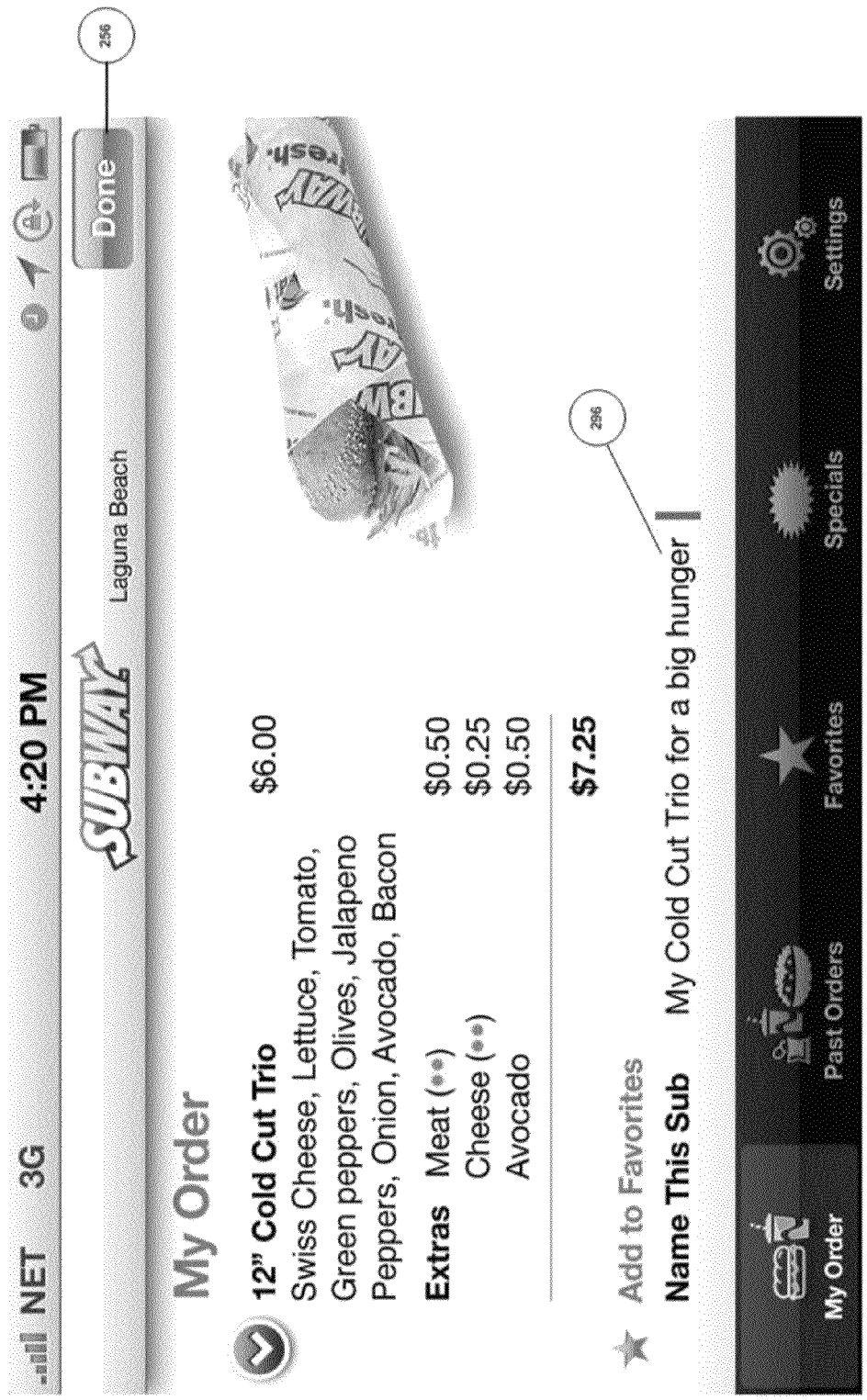

Turning to FIG. 7T, when the Order icon 256 is selected, the processor 22 may present an image including a summary of the items included in the order, e.g., a text summary 292, which may be expandable to present ingredient and/or price breakdowns, and an image 294 providing a visual representation of the food items. Optionally, the customer may select the "Star" icon 295 an to add the order to their favorites, the "Pencil" icon 295b to edit the order, or the "–" icon to delete the order. For example, if the icon is selected to add the sandwich to the customer's favorites, the processor 22 may present an image, such as that shown in FIG. 7U, which includes an active field 296 into which the customer may enter a name for the order. The customer may then select the "Order" icon 256, whereupon the processor 22 may save the sandwich and/or order in the database(s) for future reference. In another option, as shown in FIGS. 12A and 12B, the summary of the order may be toggled between a price breakdown and a caloric breakdown, if desired.

Figure 7V:
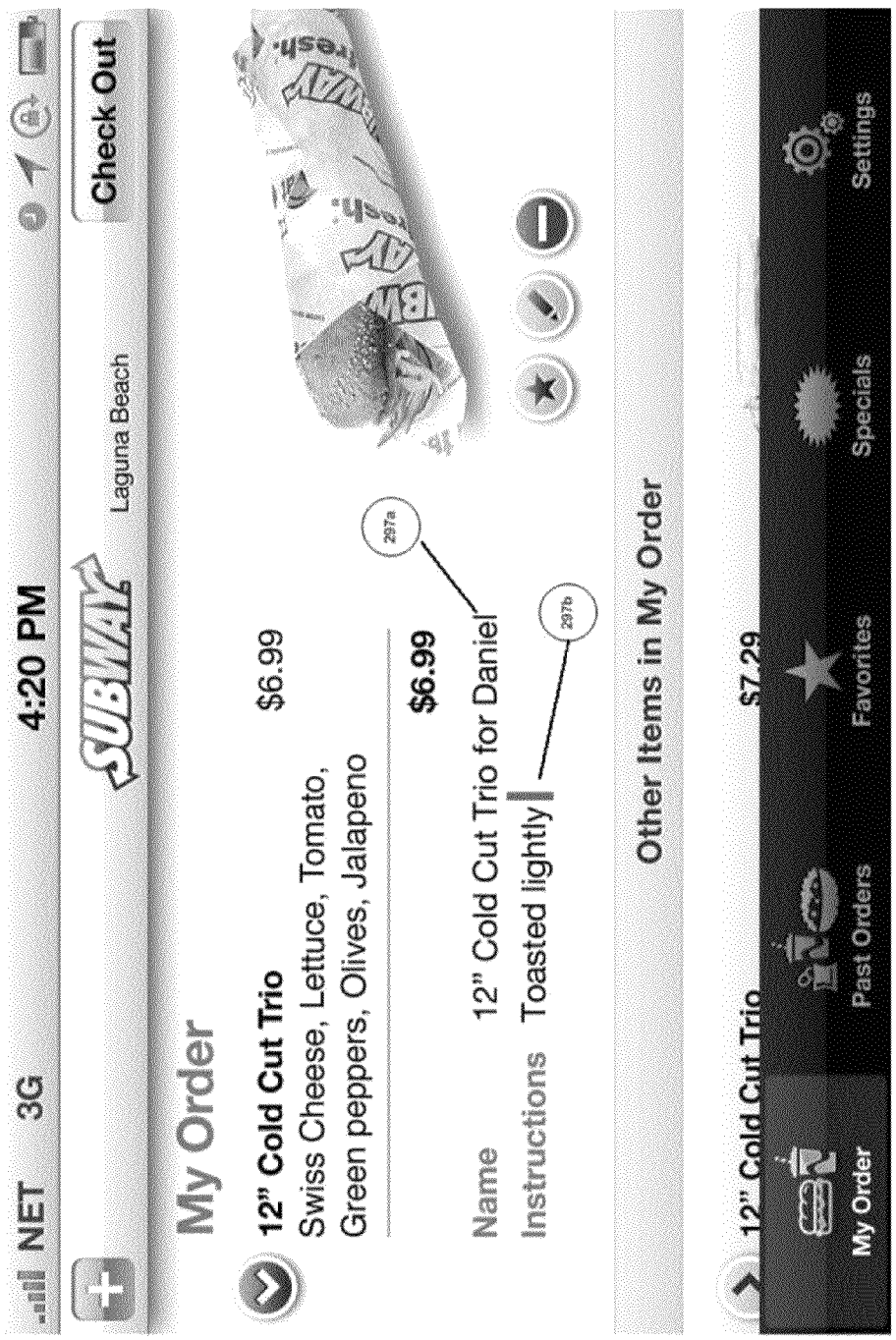

Turning to FIG. 7V, before the order is transmitted, e.g. to the vendor server 12, as described above, the processor 22 may present a screen, such as that shown, which may include one or more active fields, such that the customer may include comments or special instructions in the order. For example, as shown, a first active field 297a may be used to provide a name for a selected prepared food product, and a second active field 297b may be used to provide special instructions to the vendor.

Turning to FIGS. 8A and 8B, exemplary screen shots are shown that may be presented by the processor 22 on the display 28a when the customer has selected a salad configuration, e.g., from one of the menus 131 or 212. Generally, the submenus and shortcut menus, e.g., menus 252 and 232 may function similarly to those described above. Unlike the procedure for selecting a sandwich, an enlarged image 224' of the salad receptacle or container may be presented adjacent the submenu(s) 252, e.g., with the receptacle in an open configuration, as shown in FIG. 8A. Ingredients may be selected to add to the salad, whereupon the processor 22 may superimpose images of the selected ingredients into the receptacle in the enlarged image 224' as shown. When the selection is complete, an animation (or still image) may be presented, e.g., showing a lid of the receptacle being closed over the salad, as shown in FIG. 8B.

Figures 12C, 12D:
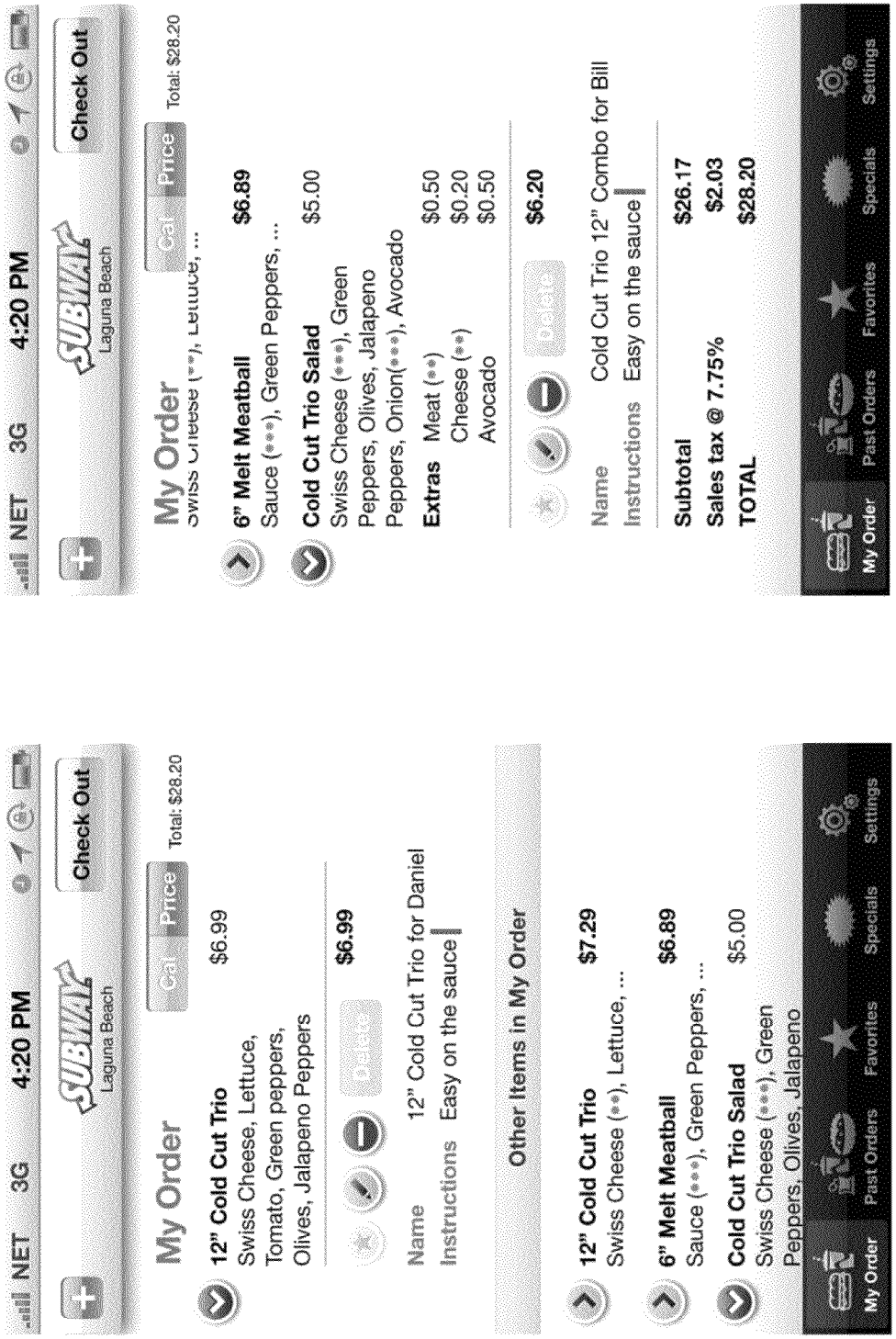
FIGS. 12C and 12D are exemplary screen shots (portrait orientation) that may be displayed when an order including multiple prepared food items is complete.

FIG. 9 shows an exemplary screen shot (FIG. 9(1) being an upper portion and FIG. 9(2) being a lower portion of the single scrollable image) of an order including several salads, as well as sandwiches and beverages, similar to the single item order shown in FIG. 7T. FIGS. 12C and 12D show alternate exemplary screen shots of an order including several prepared food products, which may be displayed before an order is finalized and transmitted to the vendor server 12.

Turning to FIGS. 13A-13E and 14A-14B, exemplary screen shots are shown that may be presented on the display to allow selection of additional food items. For example, FIGS. 13A-13E show alternate configurations of beverage menus that may be presented to a user before completing an order. Generally, these images include an enlarged image 324 showing selected beverages included in the current order, and one or more scrolling submenus 382 from which beverages may be selected. For example, a first submenu 382a may be provided for prepackaged beverages, and a second submenu 382b may be provided for "fountain" drinks.

Figure 13A:
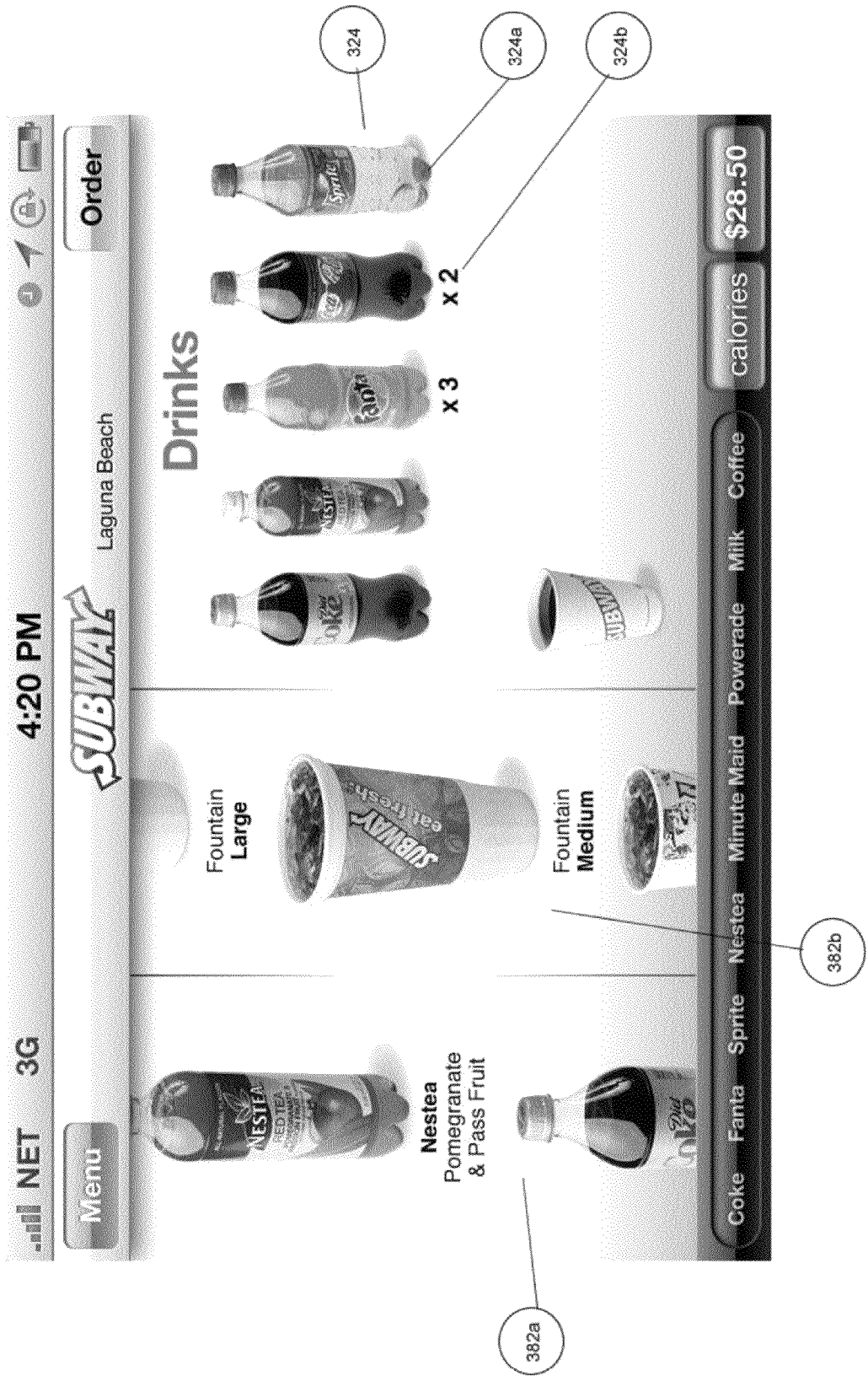
FIGS. 13A-13E are exemplary screen shots (landscape orientation) that may be displayed showing alternate vertically scrolling beverage submenus that may be displayed.
Figure 13B:
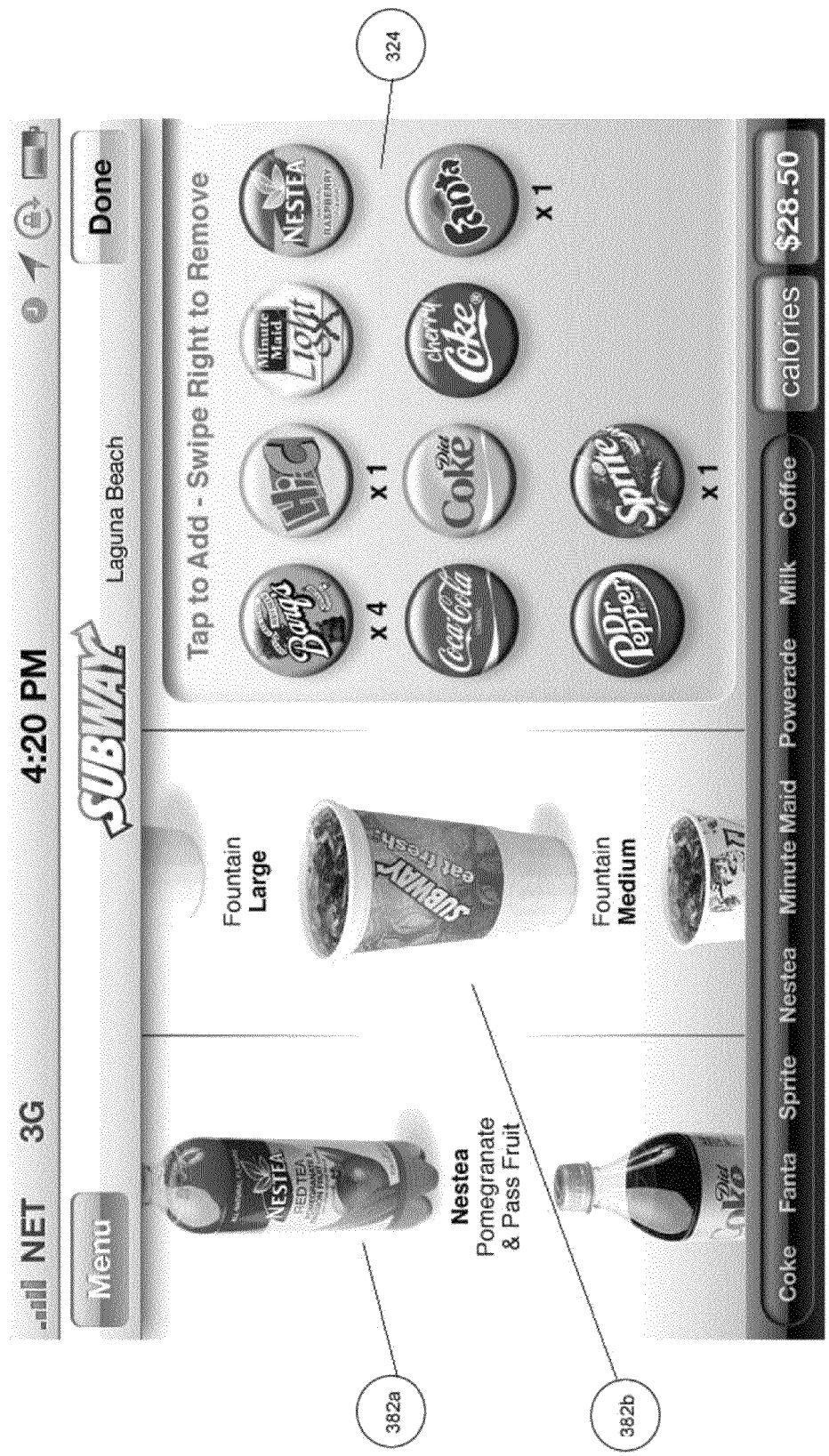
Figure 13C:
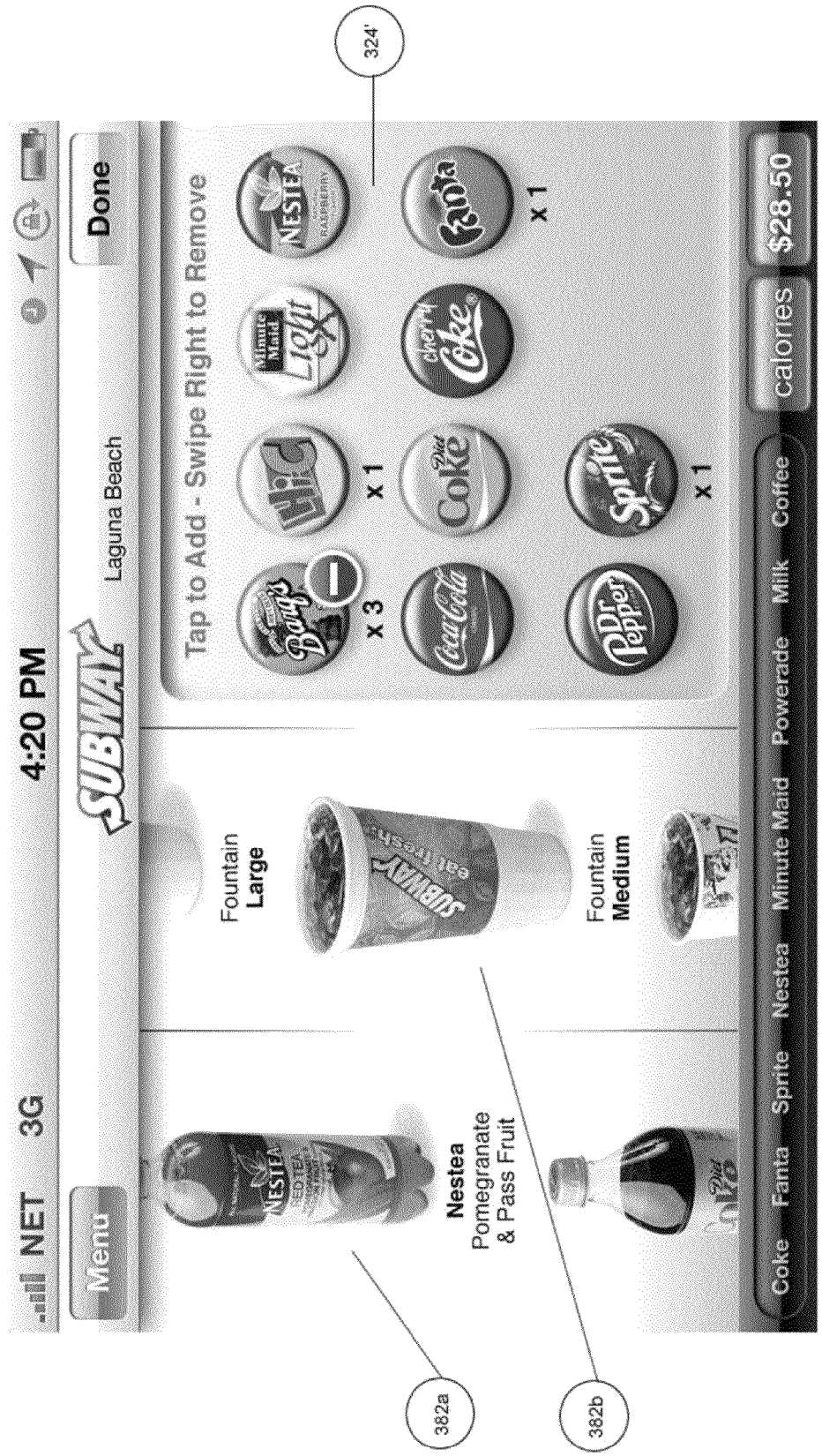
Figure 13D:
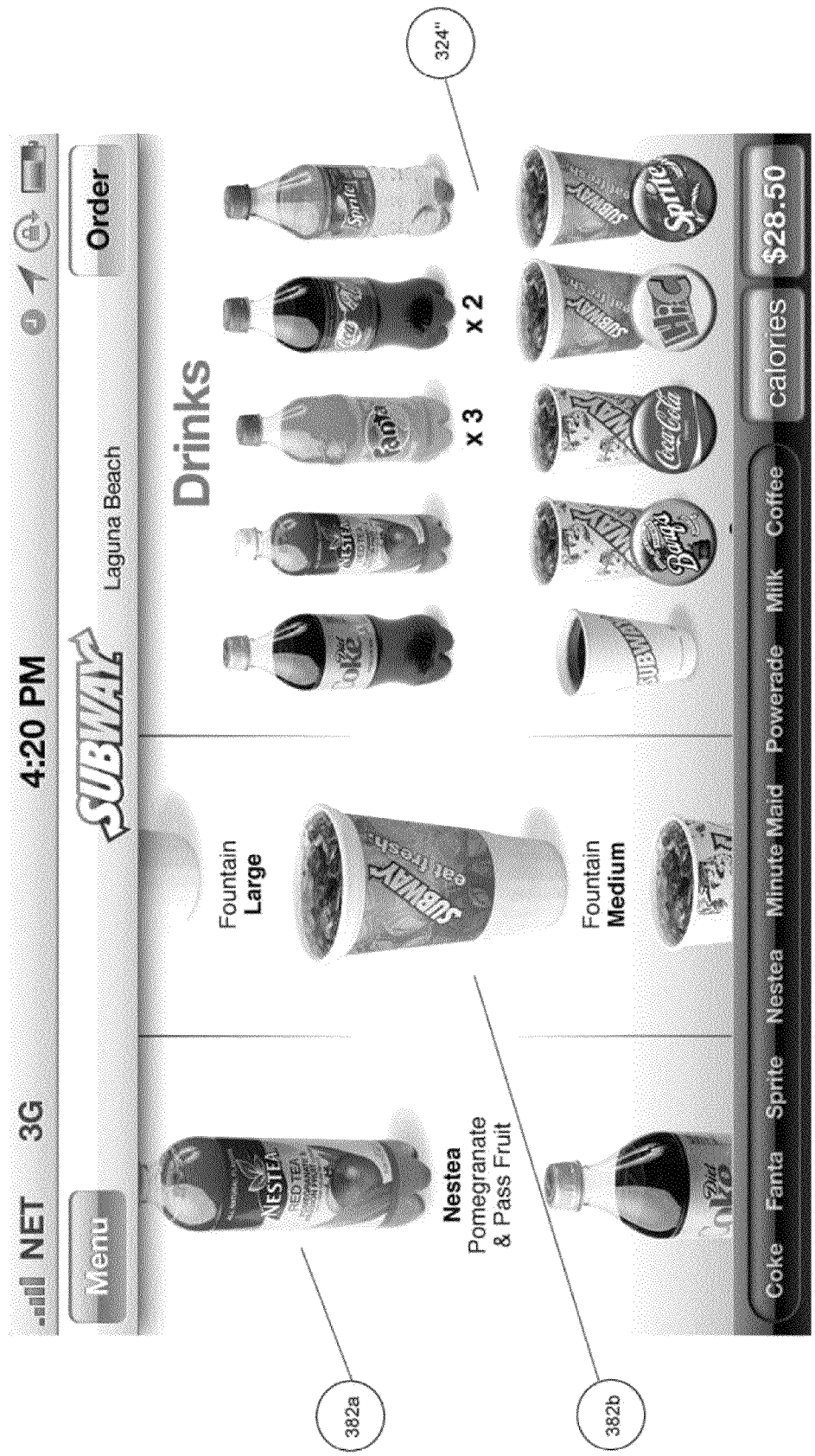
Figure 13E:

In the exemplary image of FIG. 13A, an enlarged image 324 is shown that includes actual images of each of the beverages (and their containers) that have been selected for inclusion in an order. Rather than provide duplicate images of multiple items, the enlarged image includes a single image of each of the types of included beverages 324a with a number 324b being provided under displayed types where more than one has been included in the order. FIGS. 13B and 13C show an alternative configuration for the enlarged image 324, where bottle caps are shown to represent each type of beverage included. In FIG. 13C, a "−" icon has been superimposed on a cap of a Barq's, where the user has swiped the cap to remove one of the selected items. The user may then confirm the removal by selecting the "−" icon again. FIGS. 13D and 13E show another alternative configuration for the enlarged image 324" that includes a hybrid of actual bottles and cups, along with caps to identify types of beverages selected for fountain drinks. In FIG. 13E, some of the beverages have been highlighted, where the user has swiped the items to remove them from the order. The user may then confirm the removal by selected the highlighted items again.

Figure 14A:
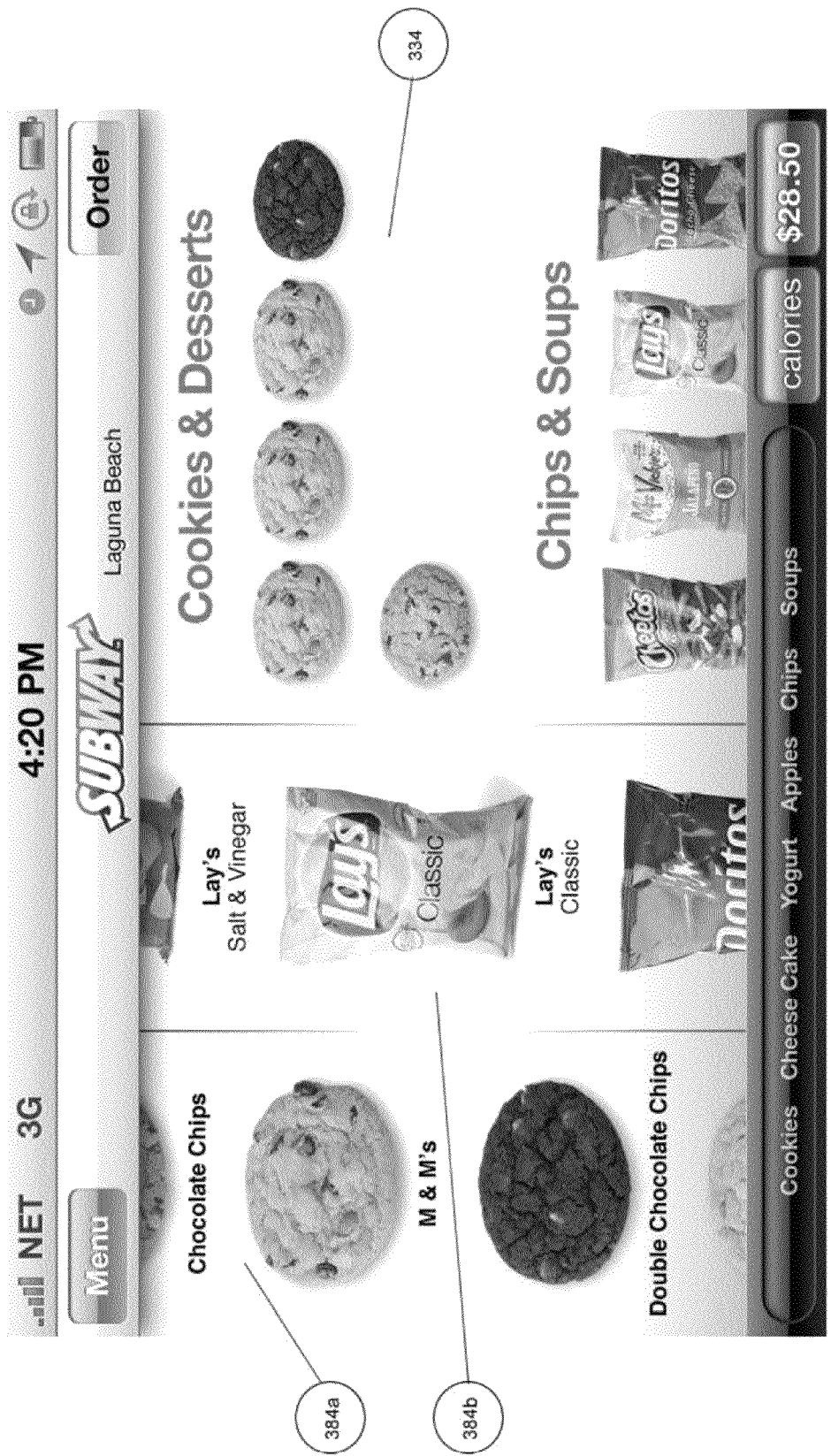
FIGS. 14A and 14B are exemplary screen shots (landscape orientation) that may be displayed showing vertically scrolling cookie and dessert submenus that may be displayed.
Figure 14B:
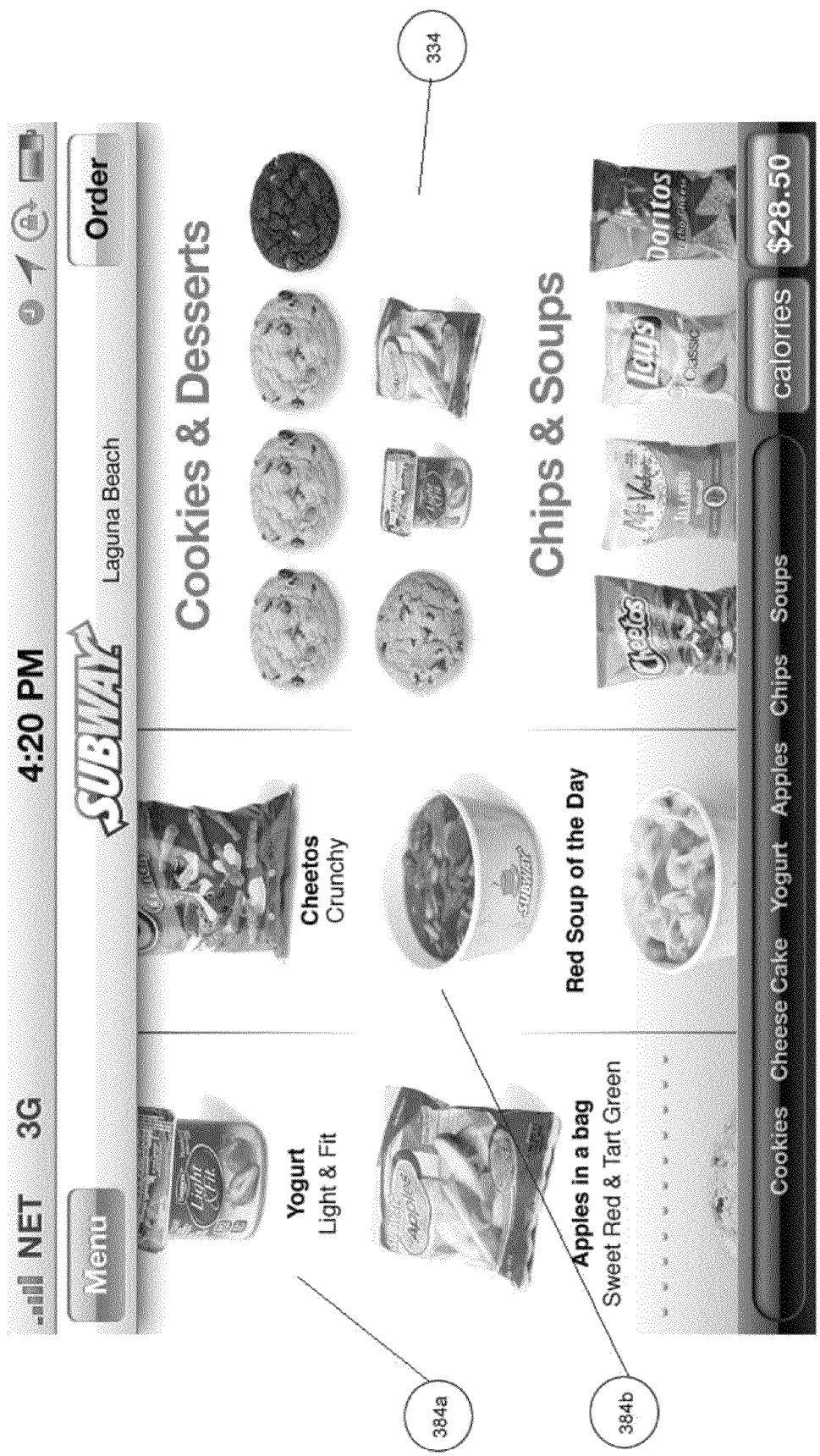

Similarly, FIGS. 14A and 14B show menus that may be presented for cookies, chips, or other food items that may be selected for inclusion in an order. Similar to the beverage menu, an enlarged image 334 may be shown that includes food items added to the order, and one or more scrolling submenus 384 (two shown) may be presented to allow the user to select additional items for inclusion in the order.

Figure 15A:
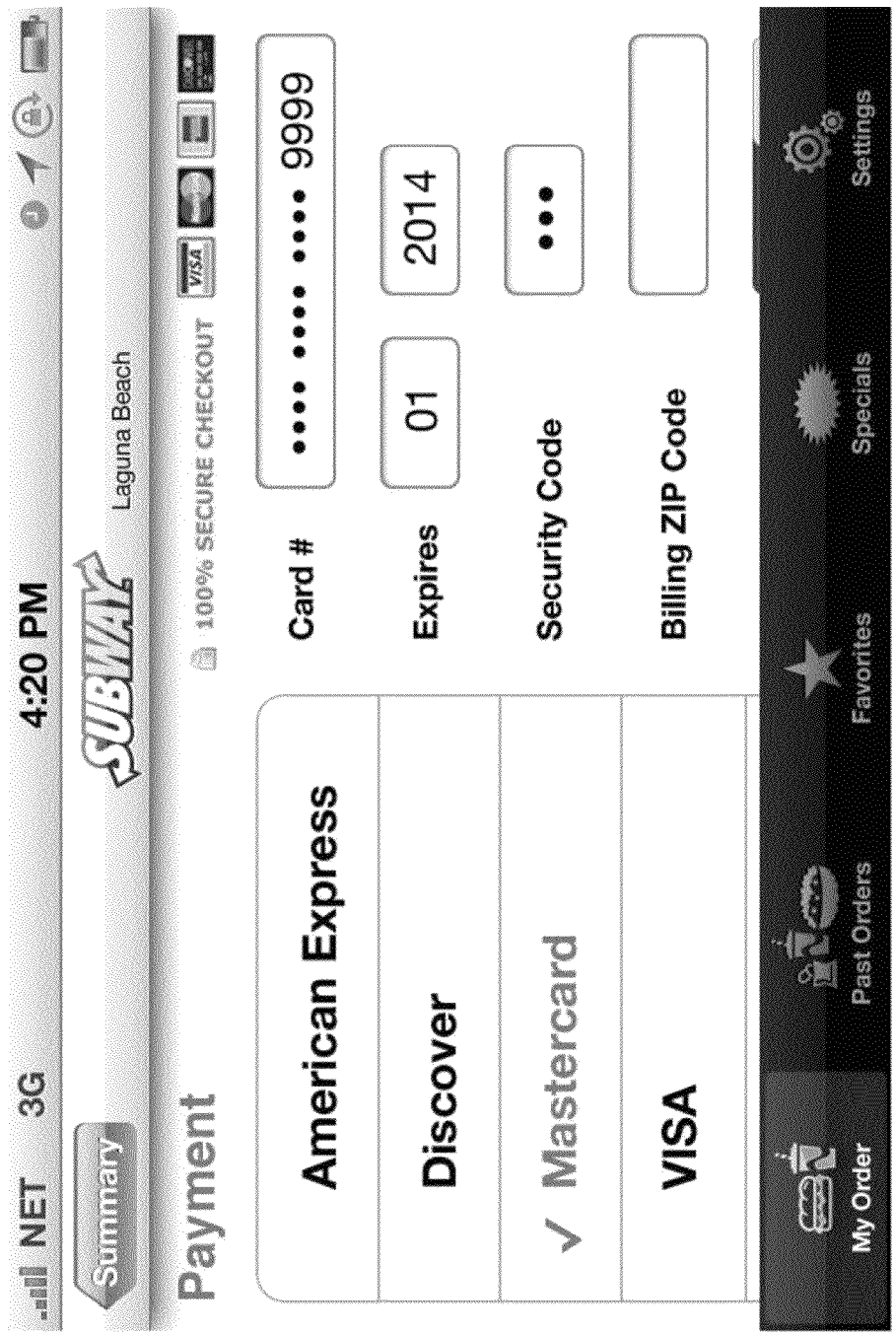
FIGS. 15A and 15B are exemplary screen shots (landscape orientation) that may be displayed, showing final "Checkout" including confirmation of payment and scheduling for the completed order.
Figure 15B:
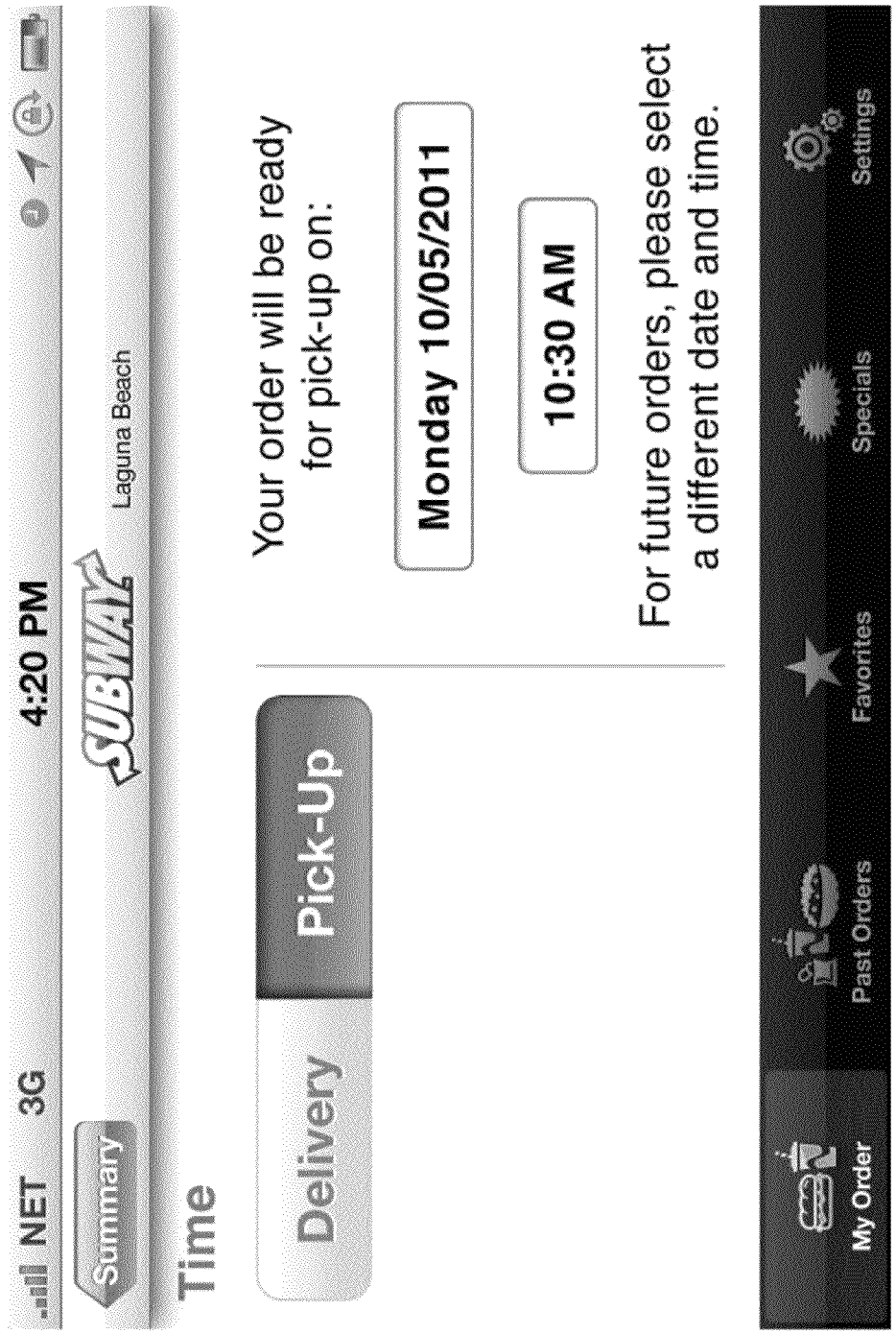

Turning to FIGS. 15A and 15B, exemplary images are shown that may be displayed when an order has been completed. For example, FIG. 15A includes a final summary of the order, including the location of the selected vendor location, the total order amount, scheduled time for the order, and payment information. FIG. 15B includes a reminder after payment has been confirmed.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for ordering prepared food products via a network using a wireless electronic device, comprising:
   presenting a menu of available prepared food products on a display of the electronic device;
   selecting one of the prepared food products using an interface of the electronic device, whereupon the electronic device presents a bread menu including visual representations of bread items available for making the selected prepared food product on the display, the menu including visual representations of each of the available bread items;
   selecting one of the bread items using the interface, whereupon the electronic device presents an animation in a product image field that shows the selected bread item on the display being opened from a closed configuration to an open orientation for receiving ingredients;
   presenting an ingredients menu on the display adjacent the product image field including visual representations of available ingredients for the selected prepare food product, wherein the ingredients menu is a scrollable menu including visual representations of the available ingredients presented adjacent the product image field on the display, and wherein the one or more ingredients are selected by scrolling the ingredients menu and touching the display over selected ingredients;
   selecting one or more ingredients for the selected food product using the interface, whereupon the electronic device presents visual representations of the one or more ingredients superimposed on the visual representation of the selected bread item in the product image field, the one or more ingredients superimposed in a predetermined layering scheme that enhances identification of the selected ingredients when superimposed onto one another over the visual representation of the selected bread item;
   inputting into the interface that the selected food product is complete, whereupon the electronic display presents a visual representation of the selected food product in a packaged configuration; and
   transmitting an order including the selected food product via a network to a vendor server for fulfillment.

2. The method of claim 1, wherein the visual representations of the available bread items and ingredients are stored in separate files in memory of the electronic device.

3. The method of claim 1, wherein the visual representations of the one or more ingredients includes an animation.

4. The method of claim 1, wherein the selected bread item comprises a roll or bun, and wherein the visual representation of the selected bread item comprises an animation that shows the roll or bun being cut with a knife in the closed configuration, and opened to the open configuration.

5. The method of claim 1, wherein the menu of available ingredients includes a sub-menu including different amounts of the available ingredients, the method further comprising selecting a desired amount of selected ingredients, whereupon a visual representation of the desired amount of the selected ingredients are superimposed on the selected bread item.

6. The method of claim 1, further comprising touching the display a second time over one or more of the selected ingredients, whereupon a visual representation of an increased amount of selected ingredients are superimposed on the visual representation of the selected bread item.

7. The method of claim 6, wherein the visual representation of the increased amount of selected ingredients comprises a second image file that is superimposed on a first image file of the selected ingredients, a first set of ingredients included in the first image file being offset from a second set of ingredients in the second image file such that at least portions of both sets of ingredients are visible on the display.

8. The method of claim 1, wherein selecting one of the prepared food products using an interface of the electronic device comprises selecting a meat product, and wherein, when one of the bread items is selected, the electronic device presents a visual representation of the selected meat product on the selected bread item in the open orientation.

9. The method of claim 8, wherein, after selecting one or more ingredients, the method comprises: selecting a new meat product different than that shown on the selected bread item, whereupon the display presents an animation in which the selected ingredients are lifted from the selected bread item, the previously selected meat product is removed, the new meat product is placed on the selected bread item, and the selected ingredients are lowered onto the new meat product.

10. The method of claim 1, wherein the selected prepared food product is a sandwich and wherein the available bread items comprise a sandwich roll.

11. The method of claim 1, wherein the selected prepared food product is a burger and wherein the available bread items comprise a bun.

12. The method of claim 1, further comprising adding one or more additional food items to the order before transmitting the order to the vendor server.

13. The method of claim 1, further comprising:
launching an application on the electronic device to perform the steps of claim 1, wherein launching the application comprises:
presenting one or more vendor locations on the display;
selecting a vendor location;
communicating with a vendor server associated with the selected vendor location; and
receiving any menu updates from the vendor server before performing the steps recited claim 1.

14. The method of claim 13, wherein the menu updates are included in a database stored in memory of the electronic device, the database comprising a list of available food products and ingredients, and one or more of image files associated with respective food products and ingredients, animation files associated with respective food products and ingredients, prices associated with respective food products and ingredients, and nutritional information associated with respective food products and ingredients.

15. The method of claim 1, wherein presenting a menu of available prepared food products on a display of the electronic device comprises presenting a scrollable menu including visual representations of the available prepared food products.

16. The method of claim 15, wherein selecting one of the prepared food products comprises scrolling the scrollable menu and touching the display over selected prepared food product.

17. A method for ordering prepared food products via a network using a wireless electronic device, comprising:
presenting a menu of available prepared food products on a display of the electronic device;
selecting one of the prepared food products using an interface of the electronic device, whereupon the electronic device presents an animation that shows a receptacle in an open configuration for receiving ingredients of the selected prepared food product on the display in a product image field on the display;
presenting an ingredients menu on the display adjacent the product image field including visual representations of available ingredients for the selected prepare food product, wherein the ingredients menu is a scrollable menu including visual representations of the available ingredients presented adjacent the product image field on the display, and wherein the one or more ingredients are selected by scrolling the ingredients menu and touching the display over selected ingredients;
selecting one or more ingredients for the selected food product using the interface, whereupon the electronic device presents visual representations of the one or more ingredients superimposed on the visual representation of the receptacle in the product image field, the one or more ingredients superimposed in a predetermined layering scheme that enhances identification of the selected ingredients when superimposed onto one another over the visual representation of the receptacle;
inputting into the interface that the selected food product is complete, whereupon the electronic display presents a visual representation of the selected food product with the receptacle in a closed configuration; and
transmitting an order including the selected food product via a network to a vendor server for fulfillment.

18. An electronic device for ordering prepared food products via a network, comprising:
an interface;
a display;
one or more processors coupled to the interface and display for:
presenting a menu of available prepared food products on the display;
selecting one of the prepared food products using the interface, whereupon the electronic device presents a bread menu including visual representations of bread items available for making the selected prepared food product on the display, the menu including visual representations of each of the available bread items;
selecting one of the bread items using the interface, whereupon the electronic device presents an animation in a product image field that shows selected bread item on the display being opened from a closed configuration to an open orientation for receiving ingredients;
presenting an ingredients menu on the display adjacent the product image field including visual representations of available ingredients for the selected prepare food product, wherein the ingredients menu is a scrollable menu including visual representations of the available ingredients presented adjacent the product image field on the display, and wherein the interface comprises a touchscreen for scrolling the ingredients menu and touching the display over selected ingredients;
selecting one or more ingredients for the selected food product using the interface, whereupon the electronic device presents visual representations of the one or more ingredients superimposed on the visual representation of the selected bread item in the product image field, the one or more ingredients superimposed in a predetermined layering scheme that enhances identification of the selected ingredients when superimposed onto one another over the visual representation of the selected bread item; and inputting into the interface that the selected food product is complete, whereupon the electronic display presents a visual representation of the selected food product in a packaged configuration; and a transmitter for transmitting an order including the selected food product via a network to a vendor server for fulfillment.

19. The device of claim 18, wherein the interface comprises a keyboard or keypad.

20. The device of claim 18, wherein the transmitter comprises a wireless transceiver.

21. The device of claim 18, further comprising memory coupled to the one or more processors, wherein the visual representations of the available bread items and ingredients are stored as separate files in the memory such that the one or more processors selectively access desired files corresponding to the visual representations to superimpose on one another on the display.

22. The device of claim 18, further comprising memory comprising a database including a list of available food products and ingredients, and one or more of image files associated with respective food products and ingredients, animation files associated with respective food products and ingredients, prices associated with respective food products and ingredients, and nutritional information associated with respective food products and ingredients.

* * * * *